(12) United States Patent
Hill et al.

(10) Patent No.: US 7,493,333 B2
(45) Date of Patent: Feb. 17, 2009

(54) SYSTEM AND METHOD FOR PARSING AND/OR EXPORTING DATA FROM ONE OR MORE MULTI-RELATIONAL ONTOLOGIES

(75) Inventors: Robin Duncan Hill, Cambs (GB); Conor McMenamin, Cambridge (GB); Stephen Philip Gardner, Royston Herts (GB); Benjamin Davis, Cambs (GB); Matthew David Eldridge, Cambs (GB); Neil Andrew Miller Blue, Cambs (GB)

(73) Assignee: BioWisdom Limited, Harston, Cambridge (GB)

( * ) Notice: Subject to any disclaimer, the term of this patent is extended or adjusted under 35 U.S.C. 154(b) by 158 days.

(21) Appl. No.: 11/121,965

(22) Filed: May 5, 2005

(65) Prior Publication Data
US 2006/0053170 A1 Mar. 9, 2006

Related U.S. Application Data

(60) Provisional application No. 60/607,072, filed on Sep. 3, 2004.

(51) Int. Cl.
G06F 7/00 (2006.01)
G06F 17/00 (2006.01)
(52) U.S. Cl. .................. 707/102; 707/10; 707/104.1
(58) Field of Classification Search .......... 707/1, 707/3, 9, 10, 101, 102, 104.1; 709/202, 217, 709/224; 715/513, 769, 804, 863, 866; 717/106, 717/120, 146; 704/4, 9; 706/45
See application file for complete search history.

(56) References Cited

U.S. PATENT DOCUMENTS

| | | | |
|---|---|---|---|
| 4,642,762 A | 2/1987 | Fisanick | 364/300 |
| 4,811,217 A | 3/1989 | Tokizane et al. | 364/300 |
| 4,884,217 A | 11/1989 | Skeirik et al. | 364/513 |
| 5,025,388 A | 6/1991 | Cramer, III et al. | 364/496 |
| 5,249,137 A | 9/1993 | Wilson et al. | 364/496 |
| 5,263,167 A | 11/1993 | Conner, Jr. et al. | 395/700 |
| 5,333,237 A | 7/1994 | Stefanopoulos et al. | 395/12 |
| 5,379,234 A | 1/1995 | Wilson et al. | 364/496 |
| 5,379,366 A | 1/1995 | Noyes | 395/54 |
| 5,386,507 A | 1/1995 | Teig et al. | 395/161 |
| 5,418,944 A | 5/1995 | DiPace et al. | 395/600 |
| 5,481,647 A | 1/1996 | Brody et al. | 395/51 |

(Continued)

FOREIGN PATENT DOCUMENTS

EP 1 211 627 6/2002

(Continued)

OTHER PUBLICATIONS

Kohler et al., The Semantic Metadatabase (SEMDA): Ontology based integration of federated molecular biological data sources., Mar. 19, 2002, In Silicio Biology, [http://www.bioinfo.de/isb/2002/02/0021/main.html].*

(Continued)

*Primary Examiner*—Pierre M. Vital
*Assistant Examiner*—Christopher P Nofal

(57) ABSTRACT

The invention relates to a system and method for parsing and/or exporting one or more multi-relational ontologies. The system may apply a set of export constraints to one or more master ontologies to produce a redacted data subset. The redacted data subset may then be exported to a specified location or application.

45 Claims, 44 Drawing Sheets

U.S. PATENT DOCUMENTS

| | | | |
|---|---|---|---|
| 5,574,828 A | 11/1996 | Hayward et al. | 395/50 |
| 5,577,239 A | 11/1996 | Moore et al. | 395/603 |
| 5,594,638 A | 1/1997 | Iliff | 395/203 |
| 5,594,837 A | 1/1997 | Noyes | 395/63 |
| 5,627,979 A | 5/1997 | Chang et al. | 395/335 |
| 5,720,007 A | 2/1998 | Hekmatpour | 395/54 |
| 5,729,730 A | 3/1998 | Wlaschin et al. | 395/603 |
| 5,794,050 A | 8/1998 | Dahlgren et al. | 395/708 |
| 5,802,499 A | 9/1998 | Sampson et al. | 705/35 |
| 5,822,780 A | 10/1998 | Schutzman | 711/165 |
| 5,832,224 A | 11/1998 | Fehskens et al. | 395/200.53 |
| 5,862,381 A | 1/1999 | Advani et al. | 395/704 |
| 5,878,406 A | 3/1999 | Noyes | 706/55 |
| 5,893,087 A | 4/1999 | Wlaschin et al. | 707/3 |
| 5,910,107 A | 6/1999 | Iliff | 600/300 |
| 5,950,190 A | 9/1999 | Yeager et al. | 707/3 |
| 5,953,716 A | 9/1999 | Madnick et al. | 707/4 |
| 5,970,482 A | 10/1999 | Pham et al. | 706/16 |
| 5,991,751 A | 11/1999 | Rivette et al. | 707/1 |
| 5,999,931 A | 12/1999 | Breitbart et al. | 707/10 |
| 6,038,560 A | 3/2000 | Wical | 707/5 |
| 6,057,101 A | 5/2000 | Nandabalan et al. | 435/6 |
| 6,057,839 A | 5/2000 | Advani et al. | 345/341 |
| 6,061,675 A * | 5/2000 | Wical | 706/45 |
| 6,094,650 A | 7/2000 | Stoffel et al. | 707/3 |
| 6,094,652 A | 7/2000 | Faisal | 707/5 |
| 6,108,670 A | 8/2000 | Weida et al. | 707/203 |
| 6,115,701 A | 9/2000 | Thaler | 706/16 |
| 6,199,034 B1 * | 3/2001 | Wical | 704/9 |
| 6,263,335 B1 | 7/2001 | Paik et al. | 707/5 |
| 6,272,479 B1 | 8/2001 | Farry et al. | 706/13 |
| 6,289,338 B1 | 9/2001 | Stoffel et al. | 707/3 |
| 6,298,327 B1 | 10/2001 | Hunter et al. | 705/1 |
| 6,327,593 B1 | 12/2001 | Goiffon | 707/102 |
| 6,339,767 B1 | 1/2002 | Rivette et al. | 707/2 |
| 6,363,378 B1 * | 3/2002 | Conklin et al. | 707/5 |
| 6,405,190 B1 | 6/2002 | Conklin | 707/3 |
| 6,410,239 B1 | 6/2002 | Nandabalan et al. | 435/6 |
| 6,424,973 B1 | 7/2002 | Baclawski | 707/102 |
| 6,487,545 B1 | 11/2002 | Wical | 706/45 |
| 6,499,026 B1 | 12/2002 | Rivette et al. | 707/2 |
| 6,539,347 B1 | 3/2003 | Paterson et al. | 703/22 |
| 6,598,043 B1 | 7/2003 | Baclawski | 707/3 |
| 6,606,622 B1 | 8/2003 | Sorace et al. | 707/4 |
| 6,633,886 B1 | 10/2003 | Chong | 707/102 |
| 6,640,231 B1 | 10/2003 | Andersen et al. | 707/102 |
| 6,654,731 B1 | 11/2003 | Mahesh | 706/45 |
| 6,678,677 B2 | 1/2004 | Roux et al. | 707/3 |
| 6,687,696 B2 | 2/2004 | Hofmann et al. | 707/6 |
| 6,925,432 B2 | 8/2005 | Lee et al. | 704/5 |
| 7,027,974 B1 | 4/2006 | Busch et al. | 704/4 |
| 7,093,200 B2 * | 8/2006 | Schreiber et al. | 715/835 |
| 7,099,885 B2 * | 8/2006 | Hellman et al. | 707/103 R |
| 7,428,517 B2 | 9/2008 | Brands et al. | 706/45 |
| 2001/0017622 A1 | 8/2001 | Patel et al. | 345/418 |
| 2001/0029322 A1 | 10/2001 | Lliff | 600/300 |
| 2001/0047353 A1 | 11/2001 | Talib et al. | 707/3 |
| 2002/0035619 A1 | 3/2002 | Dougherty et al. | 709/219 |
| 2002/0072997 A1 | 6/2002 | Colson et al. | 705/27 |
| 2002/0078090 A1 * | 6/2002 | Hwang et al. | 707/513 |
| 2002/0087275 A1 * | 7/2002 | Kim et al. | 702/19 |
| 2002/0107844 A1 | 8/2002 | Cha et al. | 707/3 |
| 2002/0111824 A1 | 8/2002 | Grainger | 705/1 |
| 2002/0116363 A1 | 8/2002 | Grainger | 707/1 |
| 2002/0161733 A1 | 10/2002 | Grainger | 706/45 |
| 2002/0169771 A1 | 11/2002 | Melmon et al. | 707/5 |
| 2002/0173971 A1 | 11/2002 | Stirpe et al. | 705/1 |
| 2002/0184085 A1 | 12/2002 | Lindia et al. | 705/11 |
| 2002/0194181 A1 | 12/2002 | Wachtel | 707/10 |
| 2002/0194201 A1 | 12/2002 | Wilbanks et al. | 707/104.1 |
| 2003/0004958 A1 | 1/2003 | Russell | 707/100 |
| 2003/0014383 A1 | 1/2003 | Cho et al. | 707/1 |
| 2003/0033126 A1 | 2/2003 | Lincoln et al. | 703/11 |
| 2003/0033295 A1 | 2/2003 | Adler et al. | 707/3 |
| 2003/0050915 A1 | 3/2003 | Allemang et al. | 707/1 |
| 2003/0088481 A1 * | 5/2003 | Elias | 705/26 |
| 2003/0110055 A1 | 6/2003 | Chau | 705/1 |
| 2003/0115189 A1 | 6/2003 | Srinivasa et al. | 707/3 |
| 2003/0120662 A1 | 6/2003 | Vishik | 707/100 |
| 2003/0120681 A1 | 6/2003 | Baclawski | 707/103 R |
| 2003/0126136 A1 | 7/2003 | Omoigui | 707/10 |
| 2003/0163597 A1 | 8/2003 | Hellman et al. | 709/316 |
| 2003/0171876 A1 | 9/2003 | Markowitz et al. | 702/20 |
| 2003/0177143 A1 | 9/2003 | Gardner | 707/104.1 |
| 2003/0179228 A1 | 9/2003 | Schreiber et al. | 345/738 |
| 2003/0182160 A1 | 9/2003 | Lahteenmaki | 705/2 |
| 2003/0182310 A1 | 9/2003 | Charnock et al. | 707/104.1 |
| 2003/0218634 A1 | 11/2003 | Kuchinsky et al. | 345/764 |
| 2003/0226109 A1 | 12/2003 | Adamson et al. | 715/513 |
| 2003/0233365 A1 | 12/2003 | Schmit et al. | 707/100 |
| 2004/0010483 A1 | 1/2004 | Brands et al. | 706/45 |
| 2004/0024720 A1 | 2/2004 | Fairweather | 706/46 |
| 2004/0024739 A1 | 2/2004 | Copperman et al. | 707/1 |
| 2004/0030687 A1 | 2/2004 | Hidaka et al. | 707/3 |
| 2004/0054672 A1 | 3/2004 | Tsuchitani et al. | 707/3 |
| 2004/0117346 A1 * | 6/2004 | Stoffel et al. | 707/1 |
| 2004/0126840 A1 * | 7/2004 | Cheng et al. | 435/69.1 |
| 2004/0230572 A1 | 11/2004 | Omoigui | 707/3 |
| 2004/0243595 A1 | 12/2004 | Cui et al. | 707/100 |
| 2005/0034107 A1 | 2/2005 | Kendall et al. | 717/136 |
| 2005/0038608 A1 * | 2/2005 | Chandra et al. | 702/19 |
| 2005/0108217 A1 | 5/2005 | Werner et al. | 707/3 |
| 2005/0131649 A1 | 6/2005 | Larsen et al. | 702/19 |
| 2005/0160080 A1 | 7/2005 | Dawson | 707/3 |
| 2005/0171931 A1 | 8/2005 | Baxter et al. | 707/3 |
| 2006/0015843 A1 * | 1/2006 | Sabbouh | 717/106 |
| 2006/0259442 A1 | 11/2006 | Iqbal | 705/400 |
| 2007/0038609 A1 | 2/2007 | Wu | 707/3 |
| 2008/0077598 A1 | 3/2008 | Wilmering et al. | 707/100 |

FOREIGN PATENT DOCUMENTS

| | | |
|---|---|---|
| EP | 1 260 916 | 11/2002 |
| EP | 1 353 288 | 10/2003 |
| EP | 1 510 941 | 3/2005 |
| WO | WO 01/15042 | 3/2001 |
| WO | WO 02/21259 | 3/2002 |
| WO | WO 02/35376 | 5/2002 |
| WO | WO 02/44992 | 6/2002 |
| WO | WO 02/073331 | 9/2002 |
| WO | WO 02/099725 | 12/2002 |
| WO | WO 03/030025 | 4/2003 |
| WO | WO 03/042872 | 5/2003 |
| WO | WO 03/067504 | 8/2003 |
| WO | WO 03/070751 | 8/2003 |
| WO | WO 03/077079 | 9/2003 |
| WO | WO 2005/027012 | 3/2005 |

OTHER PUBLICATIONS

E.W. Dijkstra, "A Note on Two Problems in Connexion with Graphs," 1959, Numerische Mathematik 1, pp. 269-271.*

BIO001—Alani, Harith et al., "Web Based Knowledge Extraction and Consolidation for Automatic Ontology Instantiation", International Conference Knowledge Capture KCAP'03—Workshop on Knowledge Markup and Semantic Annotation, Oct. 26, 2003, XP-002397995, 8 pages.

BIO002—Nahm, Un Yong et al., "Text Mining with Information Extraction", Proceedings of the AAAI 2002 Spring Symposium on Mining Answers from Texts and Knowledge Bases, Mar. 31, 2002, XP-002397996, 8 pages.

BIO003—Bechhofer, Sean et al., "OilEd: a Reason-able Ontology Editor for the Semantic Web", Proceedings of Joint Austrian/German Conference on Artificial Intelligence, Sep. 21, 2001, XP-002397997, pp. 1-9.

BIO004—Bechhofer, Sean et al., "OilEd: a Reason-able Ontology Editor for the Semantic Web", Proceedings of Joint Austrian/German Conference on Artificial Intelligence, Sep. 21, 2001, 13 pages.

BIO005—Noy, Natalya F. et al., "Creating Semantic Web Contents with Protégé-2000", IEEE Intelligent Systems, IEEE Service Center, Apr. 30, 2001, XP-002388809, pp. 60-71.

BIO006—Horrocks, Ian, "DAML+OIL: a Description Logic for the Semantic Web", IEEE Data Engineering Bulletin, vol. 25, No. 1, Mar. 31, 2002, XP-002397998, pp. 1-7.

BIO007—Horridge, Matthew et al., "A Practical Guide to Building OWL Ontologies Using the Protégé-OWL Plugin and CO-ODE Tools", Edition 1.0, Tutorial, Aug. 27, 2004, XP-002397999, pp. 1-117.

BIO008—De Clercq, Paul A. et al., "Design and Implementation of a Framework to Support the Development of Clinical Guidelines", *International Journal of Medical Informatics*, vol. 64, No. 2-3, Dec. 2001, XP-004329218, pp. 285-318.

BIO009—Uhlir, Jan et al., "Creation of Architectural Ontology: User's Experience", *Proceedings of the 14th International Workshop on Database and Expert Systems Applications (DEXA'03)*, IEEE, Sep. 1, 2003, XP-010658085, pp. 65-69.

BIO010—Noy et al., "Smart: Automated Support for Ontology Merging and Alignment", Stanford Medical Informatics, Stanford University, Stanford, CA, 1999, 24 pages.

BIO011—Noy et al., "The Knowledge Model of Protégé-2000: Combining Interoperability and Flexibility", Stanford Medical Informatics, Stanford University, Stanford, CA, 2001, 20 pages.

BIO012—Li et al., "Ontology Acquisition from On-Line Knowledge Sources", Stanford Medical Informatics, Stanford University, Stanford, CA, May 2000, 5 pages.

BIO013—Musen et al., "Component-Based Support for Building Knowledge-Acquisition Systems", Stanford Medical Informatics, Stanford University, Stanford, CA, May 25, 2000, 5 pages.

BIO014—University of Texas at Austin, "Data Modeling: Entity-Relationship Model", Feb. 29, 2004, http://www.utexas.edu/its/windows/database/datamodeling/dm/erintro/html, 6 pages.

BIO015—Seo et al., "Feature Selection for Extracting Semantically Rich Words", Robotics Institute, Carnegie Mellon University, Pittsburgh, Pennsylvania, Mar. 2004, 14 pages.

BIO016—Ankolekar et al., "Investigating Semantic Knowledge for Text Learning", Carnegie Mellon University, Pittsburgh, PA, 2003, 9 pages.

BIO018—Sussna, Michael, "Word Sense Disambiguation for Free-Text Indexing Using a Massive Semantic Network", Department of Computer Science and Engineering, University of California, San Diego, California, 1993, 8 pages.

BIO019—McGuinness, Deborah L., et al., "The Chimaera Ontology Environment", Knowledge Systems Laboratory, Stanford University, Stanford, California, 2000, 2 pages.

BIO020—Willett et al., "Chemical Similarity Searching", American Chemical Society, Journal of Chemical Information and Computer Science, vol. 38, Jul. 21, 1998, pp. 983-996.

BIO021—Law Technology News Advertisement, Dolphin Search, Concept Search, The Best Remedy for the Terrible Too's of eDiscovery, Dec. 15, 2004, 2 pages.

BIO022—Bard, Jonathan B. L., et al., "Ontologies in Biology: Design, Applications and Future Challenges", *Nature Reviews: Genetics*, vol. 5, Mar. 2004, 213-222.

BIO023—Lambrix, Patrick, et al., "Evaluation of Ontology Development Tools for Bioinformatics", *Bioinformatics*, vol. 19, No. 12, 2003, pp. 1564-1571.

BIO024—Hyman, Steven E., "The Needs for Database Research and for Privacy Collide", *American Journal of Psychiatry*, vol. 157, No. 11, Nov. 2000, pp. 1723-1724.

BIO025—Arens, Yigal, et al., "SIMS: Retrieving and Integrating Information from Multiple Sources", USC/Information Science Institute, 1993, pp. 562-563.

BIO026—Del Villar, Rafael, et al., "Regulation of Personal Data Protection and of Reporting Agencies: *a Comparison of Selected Countries of Latin America, the United States and European Union Countries*", Feb. 2001, pp. 1-4.

BIO027—Eriksson et al., "Generation of Knowledge-Acquisition Tools from Domain Ontologies", Medical Computer Science Group, Knowledge Systems Laboratory, 1994, pp. 1-15 and 19-35.

BIO028—Musen, Mark A., et al., "Component-Based Support for Building Knowledge-Acquisition Systems", Stanford Medical Informatics, 2000, 5 pages.

BIO029—Clark, Tim, "Industry Makes Its Case on Privacy", CNET News.com, Jan. 2, 2002, 3 pages.

BIO030—Voorhees, Ellen, "Database Merging Strategies for Searching Public and Private Collections", National Institute of Standards and Technology, 1997, pp. 1-4.

BIO031—Van Harmelen, Frank, et al., "Ontology-Based Information Visualization", Proceedings of the 5th International Conference on Information Visualisation, Jul. 2001, pp. 546-554.

BIO032—Mahalingam, Kuhanandha et al., "Representing and Using Ontologies", *USC-CIT Technical Report 98-01*, Jan. 1998, 13 pages.

BIO033—Mutton, Paul, et al., "Visualization of Semantic Metadata and Ontologies", Proceedings of the 7th International Conference on Information Visualization (IV'03), Jul. 2003, pp. 300-305.

BIO034—Alani, Harith, "TGVizTab: An Ontology Visualisation Extension for Protégé", eprints.ecs.soton.ac.uk, Jan. 2003, 6 pages.

BIO035—Martucci, Dario, et al., "Gene Ontology Application to Genomic Functional Annotation, Statistical Analysis and Knowledge Mining", *Ontologies in Medicine*, vol. 102, IOS Press, May 2004, pp. 110-133.

In U.S. Appl. No. 11/122,026, a final office action issued on Jan. 25, 2008.

In U.S. Appl. No. 11/122,121, a final office action issued on Jan. 25, 2008.

In U.S. Appl. No. 11/122,067, a final office action issued on Feb. 27, 2008.

In U.S. Appl. No. 11/122,066, a non-final office action issued on Mar. 17, 2008.

In U.S. Appl. No. 11/122,056, a non-final office action issued on Mar. 17, 2008.

In U.S. Appl. No. 11/122,069, a non-final office action issued on Mar. 18, 2008.

In U.S. Appl. No. 11/122,055, a non-final office action issued on Mar. 26, 2008.

In U.S. Appl. No. 11/122,068, a non-final office action issued on Feb. 13, 2008.

In U.S. Appl. No. 11/122,026, a non-final office action issued on May 1, 2007.

In U.S. Appl. No. 11/122,066, a non-final office action issued on Jun. 11, 2007.

In U.S. Appl. No. 11/122,056, a non-final office action issued on Jun. 22, 2007.

In U.S. Appl. No. 11/122,069, a non-final office action issued on Jun. 27, 2007.

In U.S. Appl. No. 11/122,067, a non-final office action issued on Jul. 17, 2007.

In U.S. Appl. No. 11/122,121, a non-final office action issued on Aug. 6, 2007.

In U.S. Appl. No. 11/122,021, a non-final office action issued on Oct. 3, 2007.

In U.S. Appl. No. 11/122,022, a non-final office action issued on Oct. 5, 2007.

In U.S. Appl. No. 11/122,022, a final office action issued on May 30, 2008.

In U.S. Appl. No. 11/122,021, a final office action issued on Jun. 25, 2008.

In U.S. Appl. No. 11/122,066, a non-final office action issued on Oct. 2, 2008 by Examiner Christyann R. Pulliam.

In U.S. Appl. No. 11/122,026, a non-final office action issued on Oct. 15, 2008 by Examiner Christyann R. Pulliam.

In U.S. Appl. No. 11/122,121, a non-final office action issued on Oct. 15, 2008 by Examiner Christyann R. Pulliam.

BIO037 - Goble, C.A., et al., "Transparent Access to Multiple Bioinformatics Information Sources", *IBM Systems Journal*, vol. 40, No. 2, 2001, pp. 532-551.

In U.S. Appl. No. 11/122,056, a final office action issued on Dec. 9, 2008 by Examiner Christyann R. Pulliam.

In U.S. Appl. No. 11/122,068, a final office action issued on Dec. 8, 2008 by Examiner Michael C. Colucci.

* cited by examiner

| | Concept | Normalized Relationship | Concept | Derivative Relationship |
|---|---|---|---|---|
| 739 | DISORDER | IS CAUSED BY | COMPOUND | has been described as a complication of |
| 740 | DISORDER | IS CAUSED BY | DISORDER | is markedly increased if complicated by |
| 741 | DISORDER | IS CAUSED BY | COMPOUND | is one of the reported complications of |
| 742 | DISORDER | IS CAUSED BY | DISORDER | occurring during the clinical course of |
| 743 | DISORDER | IS CAUSED BY | COMPOUND | has been implicated in the development of |
| 744 | DISORDER | IS CAUSED BY | COMPOUND | with an unclear cause should be screened for |
| 745 | DISORDER | IS CAUSED BY | COMPOUND | is a well-documented and potentially dangerous side effect of |
| 746 | COMPOUND | DEVELOPS FROM | COMPOUND | the most potent metabolite of |
| 747 | DISORDER | DEVELOPS FROM | DISORDER | may develop in female carriers of |
| 748 | DISORDER | DEVELOPS INTO | DISORDER | developed |
| 749 | DISORDER | DEVELOPS INTO | DISORDER | may develop |
| 750 | DISORDER | DEVELOPS INTO | DISORDER | turned into |
| 751 | DISORDER | DEVELOPS INTO | DISORDER | converted to |
| 752 | DISORDER | DEVELOPS INTO | DISORDER | can progress to |
| 753 | DISORDER | DEVELOPS INTO | DISORDER | can progress into |
| 754 | DISORDER | IS FEATURE OF | DISORDER | can cause |
| 755 | DISORDER | IS FEATURE OF | DISORDER | indicates |
| 756 | CLINICAL OBSERVATION | IS FEATURE OF | DISORDER | indicates |
| 757 | PROCESS | IS FEATURE OF | DISORDER | occurs in |
| 758 | DISORDER | IS FEATURE OF | DISORDER | occurs in |
| 759 | ENDOGENOUS SUBSTANCE | IS FEATURE OF | DISORDER | can mediate |
| 760 | PROTEIN | IS FEATURE OF | PROCESS | involved in |
| 761 | PROTEIN | IS FEATURE OF | DISORDER | observed in |
| 762 | DISORDER | IS FEATURE OF | DISORDER | symptoms of |
| 763 | ENDOGENOUS SUBSTANCE | IS FEATURE OF | DISORDER | has a role in |
| 764 | PROCESS | IS FEATURE OF | DISORDER | manifesting a |
| 765 | CLINICAL OBSERVATION | IS FEATURE OF | DISORDER | for diagnosing |
| 766 | COMPOUND | IS FEATURE OF | DISORDER | is involved in |
| 767 | DISORDER | IS FEATURE OF | DISORDER | presented with |
| 768 | PROCESS | IS FEATURE OF | DISORDER | are involved in |

FIG. 6A

Free text, e.g. scientific journal, patent, review etc.

Rhabdomyolysis is a common disorder which may result from a large variety of diseases, trauma, or toxic insults to skeletal muscle. It may be defined as a clinical and biochemical syndrome resulting from an injury which damages the integrity of the sarcolemma of skeletal muscle, leading to the release of potentially toxic muscle cell components into the circulation.(1,2,3) This may result in potential life-threatening complications including myoglobinuric acute renal failure, hyperkalaemia and cardiac arrest, disseminated intravascular coagulation, and more locally, compartment syndrome.

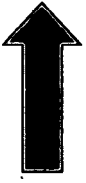

| Text | Baseform | Phrase syntax and part-of-speech |
|---|---|---|
| Rhabdomyolysis | rhabdomyolysis | nominal head, noun, single-word noun phrase |
| is | be | main verb, indicative present |
| a | a | premodifier, determiner |
| common | common | premodifier, adjective, noun phrase begins |
| disorder | disorder | nominal head, noun, noun phrase ends |
| which | which | nominal head, pro-nominal |
| may | may | auxiliary verb, indicative present |
| result | result | main verb, infinitive |
| from | from | preposed marker, preposition |
| a | a | premodifier, determiner |
| large | large | premodifier, adjective, noun phrase begins |
| variety | variety | nominal head, noun, noun phrase continues |
| of | of | postmodifier, preposition, noun phrase continues |
| diseases | disease | nominal head, plural noun, noun phrase ends |
| , | , | |
| trauma | trauma | nominal head, noun, single-word noun phrase |
| , | , | |
| or | or | coordination marker |
| toxic | toxic | premodifier, adjective, noun phrase begins |
| insults | insult | nominal head, plural noun, noun phrase continue |
| to | to | postmodifier, preposition, noun phrase continues |
| skeletal | skeletal | premodifier, adjective, noun phrase continues |
| muscle | muscle | nominal head, noun, noun phrase ends |
| | | sentence boundary |

FIG. 6B

- Using relationships, heuristics and inferencing patterns to identify concept types

| CleanedConcept | N= | ANATOMICAL STRUCTURE | DISORDER | SUBSTANCE | PROTEIN | PROCESS | BIOMED_TECH | PHYSIOLOGICAL PHENOMENON |
|---|---|---|---|---|---|---|---|---|
| acute myeloid leukemia | 149 | 0 | 9050 | 400 | 0 | 0 | 0 | 0 |
| hepatocellular carcinoma | 52 | 400 | 4080 | 0 | 0 | 0 | 0 | 0 |
| breast cancer | 113 | 10 | 3600 | 200 | 0 | 20 | 0 | 0 |
| AML | 353 | 810 | 3400 | 400 | 600 | 40 | 0 | 0 |
| multiple myeloma | 56 | 400 | 2840 | 0 | 0 | 0 | 0 | 0 |
| acquired resistance | 52 | 0 | 2600 | 0 | 0 | 60 | 0 | 0 |
| ulcerative colitis | 15 | 0 | 2350 | 0 | 0 | 0 | 0 | 0 |
| acute myeloid leukaemia | 31 | 0 | 1950 | 0 | 0 | 0 | 0 | 0 |
| ovarian carcinoma | 33 | 0 | 1720 | 400 | 0 | 0 | 0 | 0 |
| gastric carcinoma | 22 | 10 | 1680 | 0 | 0 | 0 | 0 | 0 |
| renal cell carcinoma | 27 | 0 | 1480 | 400 | 0 | 0 | 0 | 0 |
| breast carcinoma | 25 | 400 | 1400 | 0 | 0 | 0 | 0 | 0 |
| multidrug resistance | 1621 | 30 | 1400 | 80 | 0 | 1180 | 0 | 0 |
| chronic lymphocytic leukaemia | 19 | 0 | 1350 | 0 | 0 | 0 | 0 | 0 |
| acute myelogenous leukemia | 25 | 0 | 1250 | 0 | 0 | 0 | 0 | 0 |

High rule score

Reviewer: John Zhaolong Gene                                                       NDA No. 21,366

Clinical studies:
Absorption of rosuvastatin in man is in excess of 20% of the dose. In-vitro studies indicate that absorption across the intestinal epithelium is a complex process involving simple diffusion and active transport.

In blood, rosuvastatin was distributed in favor of plasma, with 35% of blood concentration being associated with blood cells. Eighty-eight percent of the plasma concentration was bound to plasma proteins (principally albumin). Binding was reversible and independent of concentration.

Rosuvastatin was only slowly metabolized in human hepatocytes (in vitro). Rosuvastatin did not induce cytochrome P450s in animals – nor inhibit the P450 isoforms in human hepatic microsomes (in vitro). CYP2C9 was the principal P450 involved in rosuvastatin metabolism (2C19,3A4, and 2D6 were implicated to a lesser extent). These data indicate little potential for interaction of rosuvastatin with co-administered drugs that are metabolized by cytochrome P450s.

- In vivo, rosuvastatin was not extensively metabolized and was excreted predominantly as parent compound; metabolism was a minor route of clearance. N-desmethyl rosuvastatin was identified in excreta and plasma, and rosuvastatin-lactone was identified in plasma. both metabolites have also been observed in toxicology species, and therefore form part of the safety assessment of the compound. Rosuvastatin was the principal circulating drug-related species and was responsible for all circulating active HMG-CoA reductase inhibitor activity, and over 85% of circulating total HMG-CoA reductase inhibitor activity.

One hundred percent of a 20-mg dose of [14C]-rosuvastatin was recovered in excreta: 90% in feces and 10% in urine. The fecal route is, therefore, the most important route of elimination.

Rosuvastatin was cleared by both renal and non-renal routes. Renal clearance accounted for approximately 28% of total plasma clearance (48.9 L/h), with tubular secretion the dominant renal process. The volume of distribution at steady state was estimated as 134 L; hepatic-extraction ratio was estimated as 0.63. The absolute bioavailability of rosuvastatin in man was 20.1%.

Typical rosuvastatin pharmacokinetic profiles exhibited a Tmax of 3- to 5-h post-dose. Following peak plasma concentration, there was a bi-exponential decline with a terminal T½ of approximately 18.6 h. Both Tmax and T½ were independent of dose. Dose proportionality of Cmax and AUC(0-t) was established in healthy volunteers over the dose range 10 to 80 mg. However, marked variation in exposure was observed in all dose levels and overlaps of concentration were noted across dose range 10 to 80 mg. On 2003
2001

FIG. 30B

SYSTEM AND METHOD FOR PARSING AND/OR EXPORTING DATA FROM ONE OR MORE MULTI-RELATIONAL ONTOLOGIES

RELATED APPLICATIONS

This application claims the benefit of U.S. Provisional Patent Application No. 60/607,072, filed Sep. 3, 2004, which is hereby incorporated herein by reference in its entirety. This application is related to the following co-pending applications, each of which are hereby incorporated herein by reference in their entirety, and each of which also claim benefit of U.S. Provisional Patent Application No. 60/607,072: U.S. patent application Ser. No. 11/122,066, filed May 5, 2005, entitled "System and Method for Creating, Editing, and Using Multi-Relational Ontologies" (U.S. Patent Application Publication No. 20060053172); U.S. patent application Ser. No. 11/122,023, filed May 5, 2005, entitled "Multi-Relational Ontology Structure" (U.S. Patent Application Publication No. 20060053151); U.S. patent application Ser. No. 11/122,007, filed May 5, 2005, entitled "System and Method for Creating Customized Ontologies" (U.S. Patent Application Publication No. 20060053098); U.S. patent application Ser. No. 11/122,022, filed May 5, 2005, entitled "System and Method for Utilizing an Upper Ontology in the Creation of One or More Multi-Relational Ontologies" (U.S. Patent Application Publication No. 20060074832); U.S. patent application Ser. No. 11/122,021, filed May 5, 2005, entitled "System and Method for Graphically Displaying Ontology Data" (U.S. Patent Application Publication No. 20060074836); U.S. patent application Ser. No. 11/122,068, filed May 5, 2005, entitled "System and Method for Data Extraction and Management in Multi-Relational Ontology Creation" (U.S. Patent Application Publication No. 20060053174); U.S. patent application Ser. No. 11/122,056, filed May 5, 2005, entitled "System and Method for Curating One or more Multi-Relational Ontologies" (U.S. Patent Application Publication No. 20060053171); U.S. patent application Ser. No. 11/122,069, filed May 5, 2005, entitled "System and Method for Creating, Editing, and Utilizing One or More Rules for Multi-Relational Ontology Creation and Maintenance" U.S. Patent Application Publication No. 20060053175); U.S. patent application Ser. No. 11/122,026, filed May 5, 2005, entitled "System and Method for Facilitating User Interaction with Multi-Relational Ontologies" (U.S. Patent Application Publication No. 20060053382); U.S. patent application Ser. No. 11/121,981, filed May 5, 2005, entitled "System and Method for Exploring Paths Between Concepts within Multi-Relational Ontologies" (U.S. Patent Application Publication No. 20060053135): U.S. patent application Ser. No. 11/122.067, filed May 5, 2005, entitled "System and Method for Support of Chemical Data within Multi-Relational Ontologies" (U.S. Patent Application Publication No. 20060053173); U.S. patent application Ser. No. 11/122,055, filed May 5, 2005, entitled "System and Method for Notifying Users of Changes in Multi-Relational Ontologies" (U.S. Patent Application Publication No. 20060074833); and U.S. patent application Ser. No. 11/122, 121, filed May 5, 2005, entitled "System and Method for Capturing Knowledge for Integration into One or More Multi-Relational Ontologies" (U.S. Patent Application Publication No. 20060053099).

FIELD OF THE INVENTION

The invention relates to a system and method for parsing and/or exporting data from one or more multi-relational ontologies.

BACKGROUND OF THE INVENTION

Knowledge within a given domain may be represented in many ways. One form of knowledge representation may comprise a list representing all available values for a given subject. For example, knowledge in the area of "human body tissue types" may be represented by a list including "hepatic tissue," "muscle tissue," "epithelial tissue," and many others. To represent the total knowledge in a given domain, a number of lists may be needed. For instance, one list may be needed for each subject contained in a domain. Lists may be useful for some applications, however, they generally lack the ability to define relationships between the terms comprising the lists. Moreover, the further division and subdivision of subjects in a given domain typically results in the generation of additional lists, which often include repeated terms, and which do not provide comprehensive representation of concepts as a whole.

Some lists, such as structured lists, for example, may enable computer-implemented keyword searching. The shallow information store often contained in list-formatted knowledge, however, may lead to searches that return incomplete representations of a concept in a given domain.

An additional method of representing knowledge is through thesauri. Thesauri are similar to lists, but they further include synonyms provided alongside each list entry. Synonyms may be useful for improving the recall of a search by returning results for related terms not specifically provided in a query. Thesauri still fail, however, to provide information regarding relationships between terms in a given domain.

Taxonomies build on thesauri by adding an additional level of relationships to a collection of terms. For example, taxonomies provide parent-child relationships between terms. "Anorexia is-a eating disorder" is an example of a parent-child relationship via the "is-a" relationship form. Other parent-child relationship forms, such as "is-a-part-of" or "contains," may be used in a taxonomy. The parent-child relationships of taxonomies may be useful for improving the precision of a search by removing false positive search results. Unfortunately, exploring only hierarchical parent-child relationships may limit the type and depth of information that may be conveyed using a taxonomy. Accordingly, the use of lists, thesauri, and taxonomies present drawbacks for those attempting to explore and utilize knowledge organized in these traditional formats.

Additional drawbacks may be encountered when searches of electronic data sources are conducted. As an example, searches of electronic data sources typically return a voluminous amount of results, many of which tend to be only marginally relevant to the specific problem or subject being investigated. Researchers or other individuals are then often forced to spend valuable time sorting through a multitude of search results to find the most relevant results. It is estimated, for example, that scientists spend 20% of their time searching for information existing in a particular area. This is time that highly-trained investigative researchers must spend simply uncovering background knowledge. Furthermore, when an electronic search is conducted, data sources containing highly relevant information may not be returned to a researcher because the concept sought by the researcher is identified by a different set of terms in the relevant data source. This may lead to an incomplete representation of the knowledge in a given subject area. These and other drawbacks exist.

SUMMARY OF THE INVENTION

The invention addresses these and other drawbacks. According to one embodiment, the invention relates to a system and method for parsing and/or exporting data from one or more multi-relational ontologies. As described below, one or more ontologies may be subject to one or more export constraints to produce a redacted set of ontology data. This redacted set of data may be packaged, formatted, and exported to any number of locations such as, for instance, a file, a database, an application, and/or other location. This export function may enable a user to focus navigation or use to a constrained portion or portions of one or more ontologies. Furthermore, this export function may enable a service provider to leverage the value of complex data contained in one or more ontologies by providing "slices" of one or more ontologies to clients.

According to one aspect of the invention, the one or more ontologies may be domain-specific ontologies that may be used individually or collectively, in whole or in part, based on user preferences, user access rights, or other criteria. As used herein, a domain may include a subject matter topic such as, for example, a disease, an organism, a drug, or other topic. A domain may also include one or more entities such as, for example, a person or group of people, a corporation, a governmental entity or other entities. A domain involving an organization may focus on the organization's activities. For example, a pharmaceutical company may produce numerous drugs or focus on treating numerous diseases. An ontology built on the domain of that pharmaceutical company may include information on the company's drugs, their target diseases, or both. A domain may also include an entire industry such as, for example, automobile production, pharmaceuticals, legal services, or other industries. Other types of domains may be used.

As used herein, an ontology may include a collection of assertions. An assertion may include a pair of concepts that have some specified relationship. One aspect of the invention relates to the creation of a multi-relational ontology. A multi-relational ontology is an ontology containing pairs of related concepts. For each pair of related concepts there may be a broad set of descriptive relationships connecting them. As each concept within each pair may also be paired (and thus related by multiple descriptive relationships) with other concepts within the ontology, a complex set of logical connections is formed. These complex connections provide a comprehensive "knowledge network" of what is known directly and indirectly about concepts within a single domain. The knowledge network may also be used to represent knowledge between and among multiple domains. This knowledge network enables discovery of complex relationships between the different concepts or concept types in the ontology. The knowledge network also enables, inter alia, queries involving both direct and indirect relationships between multiple concepts such as, for example, "show me all genes expressed-in liver tissue that-are-associated-with diabetes."

In one embodiment, an export manager or export module may enable a service provider to export ontology data to one or more separate files, databases, alternate applications (e.g., various data-mining and display applications), or other suitable data shells for use by a client or other entity. The scope of exported ontology data may be constrained by an administrative curator or other person with appropriate access rights according to a set of export constraints. In some embodiments, however, export of ontology data may be controlled and administrated by an "end user" of ontology data.

The export constraints used to assemble data for export may include concepts, concept types, relationships, relationship types, properties, property types, data sources (e.g., data sources of particular origin), data source types, confidence levels (e.g., confidence weights), curation history (including curator information), or other criteria. In one embodiment, export constraints may also be defined by a user profile containing information regarding the user's access rights. For instance, an administrative curator may constrain the scope of exported data according to a fee paid by a user. Additionally, the administrative curator may restrict proprietary data or other confidential information from inclusion in exported data.

In some embodiments, a user profile that is used to define export constraints may include user preferences regarding themes. These themes may include a perspective that a user has regarding ontology data, which may depend on the user's job or role in an organization that is exporting the data or receiving exported data. These themes may include the types of data sources the user considers relevant and/or high-quality, as well as the concept, relationship, and/or property types that the user desires to include in an exported data subset.

The imposition of such export constraints onto one or more master ontologies may be used to produce a redacted ontology data subset for export. This redacted data subset may comprise assertions that have been selected by the export constraints. Additionally, evidence and properties may be included in the subset and exported along with assertion data. Exported evidence and its underlying data sources may be displayed by an export application or other data shell and may be accessed by one or more users. Exported data may be formatted according to its destination and may enable access via web services or other methods.

In one embodiment, use of exported data in alternative applications may be bi-directional between a graphical user interface (GUI) directed to ontology navigation, and export applications or other interfaces. For example, a user working with exported data in an export application may arrive at one or more concepts of interest and link to those concepts as they exist in one or more ontologies via an ontology GUI. In one embodiment, this bi-directionality may be accomplished by hooking into the selection event of the export application. This may provide an identification indicator (ID) for a concept selected from the export application. This ID may then be entered into an ontology GUI and used to locate the context surrounding the selected concept.

In one embodiment, a redacted data subset may be prepared for export through "path-finding." Because the structure of ontologies provides a knowledge network, specified constraints may be applied to track paths between nodes/concepts of an ontology. Path-finding may enable an administrative curator or other person with appropriate access rights to select at least two concepts present within an ontology and obtain some or all of the paths (concepts and relationships) that exist between the at least two selected concepts. Because there are potentially millions or more paths between concepts in an ontology, one or more path-finding constraints may be applied to select a smaller number of paths for navigation or analysis. These constraints may include the shortest path, shortest n-paths (where n equals a predetermined number of paths to be displayed), all paths up to a path length of x (where x equals the number of assertions in the path), or the best path (or best n-paths). In some embodiments, other constraints may be applied. In some embodiments, the best path may not be the shortest path. For example, the assertions of the shortest path may have weaker confidence scores than that of a longer path.

The path-finding constraints may be imposed through the use of certain algorithms. For example, to determine the best path, an algorithm may be used which sums weights along the edges of the graph, iteratively pruning paths where the existing minimum score has been exceeded. Other algorithms may be used.

In one embodiment, a user may specify constraints to be imposed on path-finding between two selected concepts. In this embodiment, the user may not only select the initial concepts of interest, but may specify one or more of the concepts, concept types, relationships, relationship types, properties, property types, or other constraints to be imposed on the finding of paths.

In one embodiment, the redacted data subset may be prepared for export by applying a set of expansion parameters to a master ontology. This process may include selecting a starting concept from a master ontology and applying one or more expansion parameters. The expansion parameters may dictate "paths" to be followed within the master ontology which gathers additional concepts and their connecting relationships for addition to redacted data subset. Expansion parameters may include any selectable characteristic of an element of the master ontology such as, for example, concept, concept type, relationship, relationship type, data source, curation history, confidence weight, quantitative value, or other property or characteristic.

In one embodiment, two or more ontologies or portions of ontologies may be merged and exported (or exported separately and then merged). For this merger, two or more sets of ontological data may be mapped against one another. Each of the concepts and relationships from the individual sets of data may be compared to one another for corresponding concepts and relationships. These comparisons may take into account varying linguistic forms and semantic differences in terms used in the constituent sets of data. A single merged ontology representing the total knowledge of the individual sets of data structure may result. This process may occur prior to export, or may be performed after export. An example of when two or more ontologies (or portions thereof) may be merged and/or exported may include a federated ontology environment (e.g., when more than one group contributes to the development of ontological knowledge in an area). For example, "Group A" may assemble a "kinase" ontology, while "Group B" assembles a muscle toxicity ontology, in which a number of kinases are referenced. These two ontologies may be merged and then exported as a single ontology. This single ontology may contain knowledge that was not present in the two separate ontologies by themselves.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 6A is an exemplary illustration of normalized relationships and their accompanying concept types according to an embodiment of the invention.

FIG. 6B is an exemplary illustration of tagged document content according to an embodiment of the invention.

FIG. 6C is an exemplary illustration of the use of inferencing to identify concept types according to an embodiment of the invention.

FIG. 13 illustrates an exemplary interface, according to an embodiment of the invention.

FIG. 18 illustrates an exemplary interface, according to an embodiment of the invention.

FIG. 20 illustrates an exemplary interface, according to an embodiment of the invention.

FIG. 30B is an exemplary illustration of a customizable information interface according to an embodiment of the invention.

DETAILED DESCRIPTION

A computer-implemented system and method is provided for enabling the creation, editing, and use of comprehensive knowledge networks in limitless knowledge domains in the form of more or more multi-relational ontologies. These multi-relational ontologies may be used individually or collectively, in whole or in part, based on user preferences, user access rights, or other criteria.

This invention deals with one or more domain-specific ontologies. As used herein, a domain may include a subject matter topic such as, for example, a disease, an organism, a drug, or other topic. A domain may also include one or more entities such as, for example, a person or group of people, a corporation, a governmental entity, or other entities. A domain involving an organization may focus on the organization's activities. For example, a pharmaceutical company may produce numerous drugs or focus on treating numerous diseases. An ontology built on the domain of that pharmaceutical company may include information on the company's drugs, their target diseases, or both. A domain may also include an entire industry such as, for example, automobile production, pharmaceuticals, legal services, or other industries. Other types of domains may be used.

As used herein, an ontology may include a collection of assertions. An assertion may include a pair of concepts that have some specified relationship. One aspect of the invention relates to the creation of a multi-relational ontology. A multi-relational ontology is an ontology containing pairs of related concepts. For each pair of related concepts, there may be a broad set of descriptive relationships connecting them. Descriptive relationships are one characteristic of the invention that sets multi-relational ontologies apart from other data structures, in that a richer and more complex collection of information may be collected and stored. Each concept within each concept pair may also be paired with other concepts within the ontology (and thus related by multiple descriptive relationships). As such, a complex set of logical connections is formed. These complex connections provide a comprehensive "knowledge network" of what is known directly and indirectly about concepts within a single domain. The knowledge network may also be used to represent knowledge between and among multiple domains. This knowledge network enables discovery of complex relationships between the different concepts or concept types in the ontology. The knowledge network also enables, inter alia, queries involving both direct and indirect relationships between multiple concepts such as, for example, "show me all genes expressed-in liver tissue that-are-associated-with diabetes."

Figure 1:
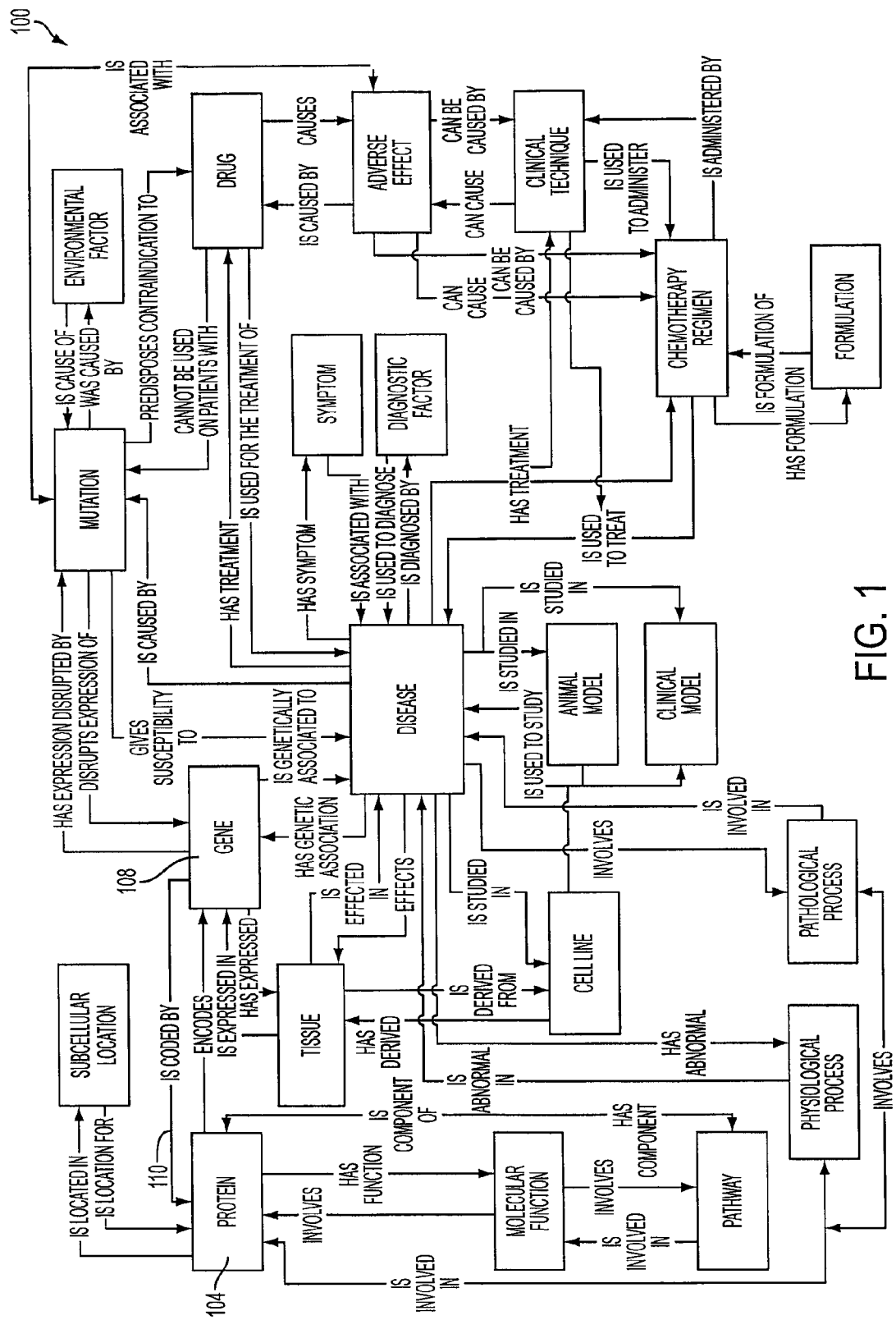
FIG. 1 is an exemplary illustration of a portion of an ontology in the biomedical domain, according to an embodiment of the invention.

FIG. 1 is an exemplary diagram illustrating an ontology 100 in the biomedical domain. Ontology 100 includes various concepts and some of the relationships that connect them. The concepts in exemplary ontology 100 may also represent concept types. For example, a concept 104 represents the concept "protein." However, "protein" is also a concept type in that many different individual proteins may exist in a biomedical ontology.

Accordingly, concept types may themselves be concepts within an ontology (and vice versa). For example, the term "muscle tissue" may exist as a specific concept within an ontology, but may also be considered a concept type within the same ontology, as there may be different kinds of muscle tissue represented within the ontology. As such, a pair of concept types that can be related in one or more ways may be referred to herein as a "concept pair." Thus, reference herein to "concept pairs" and "concepts" does not preclude these objects from retaining the qualities of both concepts and concept types.

As depicted in ontology 100, concept 104 ("protein"), and a concept 108 ("gene") may be connected by a relationship 110, "is-coded-by," because, in general, proteins are coded by genes. When concepts 104 and 108 are regarded simply as concepts, the relationship 110 "is-coded-by" exists. However, when concepts 104 and 108 are regarded as concept types, relationship 110 may only exist when certain pairs of concepts exist simultaneously in concept 104 and concept 108 (as there are a myriad of proteins that may exist as concept 104 and a myriad of genes that may exist as concept 108). For example, because is it known that Human Myoglobin alpha protein is encoded by Human Hemoglobin alpha gene, ontology 100 may contain the relationship "is-coded-by" between concept 104 and concept 108 when concept 104 equals "Human Myoglobin alpha protein" and concept 108 equals "Human Hemoglobin alpha gene."

Given the following qualities of the invention: (1) there may be numerous relationships that can exist between two concept types (ontology 100 illustrates only one relationship and its inverse, many more may exist); (2) there may be numerous concept types included in a single ontology (ontology 100 illustrates only a portion of identified concept types for a biomedical domain); and (3) there can be numerous concepts of each concept type (hundreds, thousands, hundreds of thousands, possibly millions); the wealth of assertions that may exist in a given, multi-relational ontology provides vast organized knowledge networks which may enable any number of uses, some of which are described herein.

Many of the figures and examples used herein (including FIG. 1) illustrate embodiments of the invention directed toward a biomedical domain. It should be understood, however, that the invention enables ontologies to be created and maintained in any contemplated domain.

One aspect of the invention relates to specifying each concept type and relationship type that may exist in the ontology. Typing concepts in an ontology, for example, enables one to understand what the concepts are, what properties they are likely to have, and which relationships can connect them. Another aspect of the invention relates to providing a structured organization for specified concept and relationship types. This structured organization may include defining the possible relationships that may exist for each pair of concept types (e.g., two concept types that can be related in one or more ways).

Figure 2:
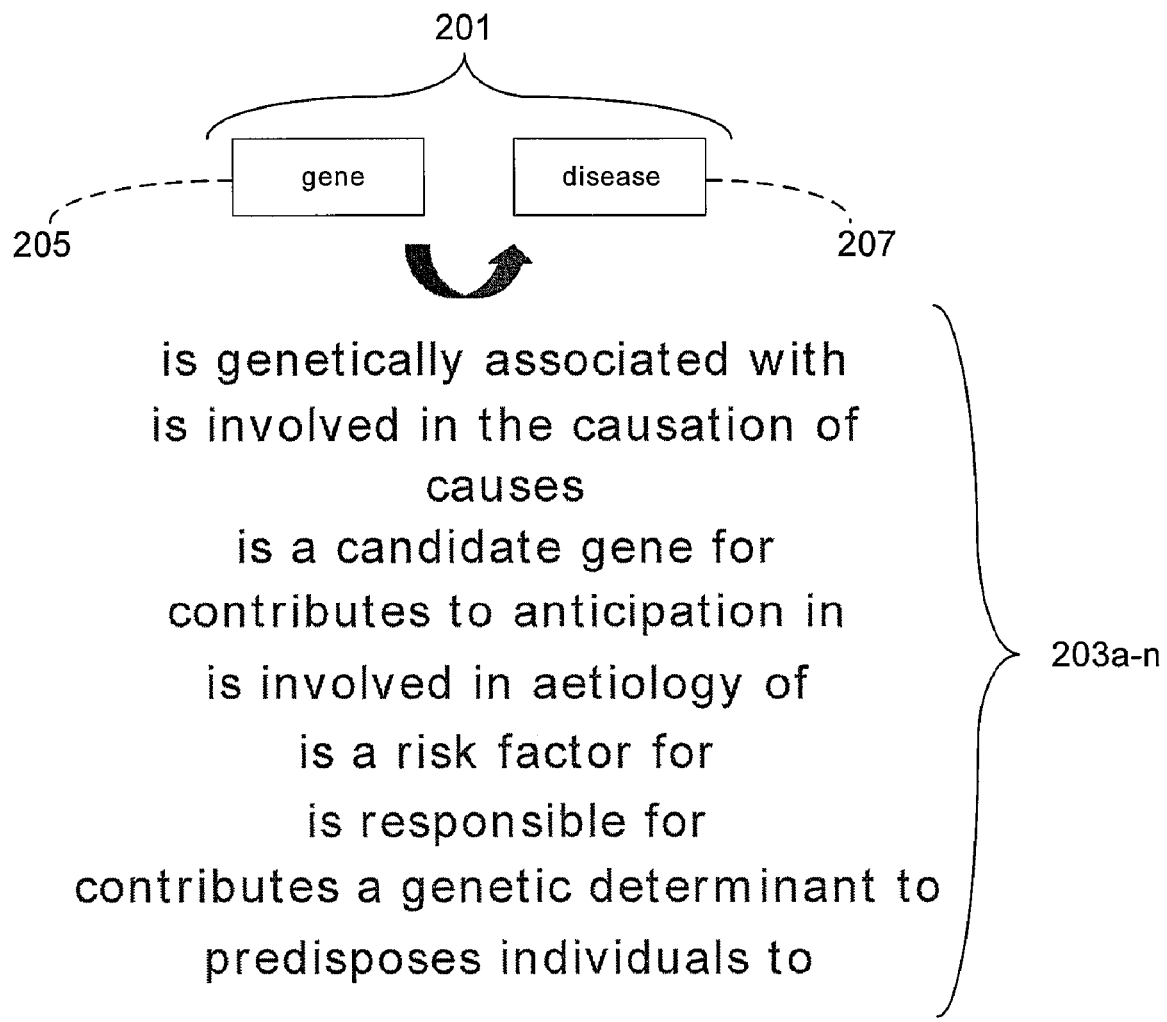
FIG. 2 is an exemplary illustration of a concept pair and a set of relationships according to an embodiment of the invention.

FIG. 2 is an exemplary illustration wherein a concept pair 201 comprises a concept 205 and a concept 207. Concept pair 201 may have possible relationships 203a-n that may exist between the concept types therein. In the example illustrated in FIG. 2, concept 205 is of concept type "gene" and concept 207 is of concept type "disease." The actual relationships that exist between the concepts of concept pair 201 may vary with the identity of the actual concepts that occur as concepts 205 and 207. For example, if concept 205 were "ApoE4" (a specific gene), the actual relationships that exist in an ontology differs depending on whether concept 207 were "Alzheimer's Disease" or "Liver Disease" (both of which are specific diseases).

In some embodiments, the possible relationships for a unique concept pair may be expressed as a relationship hierarchy. A relationship hierarchy may enable an observer, given one specific form of a relationship, to generalize it to its parent to ascertain what other forms that relationship may take (e.g., synonymous relationships), and furthermore aggregate all of the various examples of that type of relationship, even if it can be expressed differently. The hierarchy may include one or more levels of relationships and/or synonyms. These and other features enable novel uses of the multi-relational ontology.

Figure 3A:
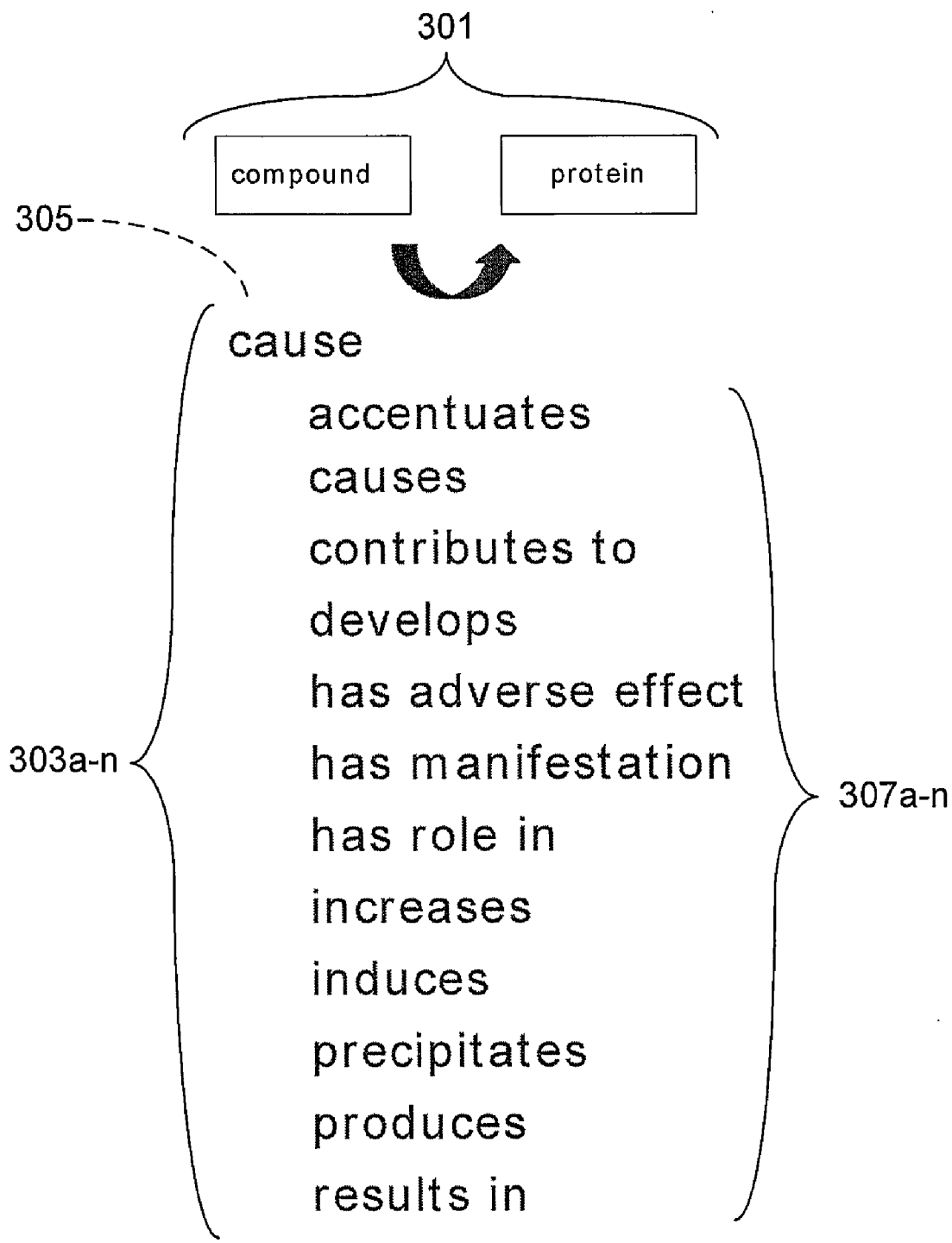
FIG. 3A is an exemplary illustration of a concept pair and a hierarchy of relationships according to an embodiment of the invention.
Figure 3B:
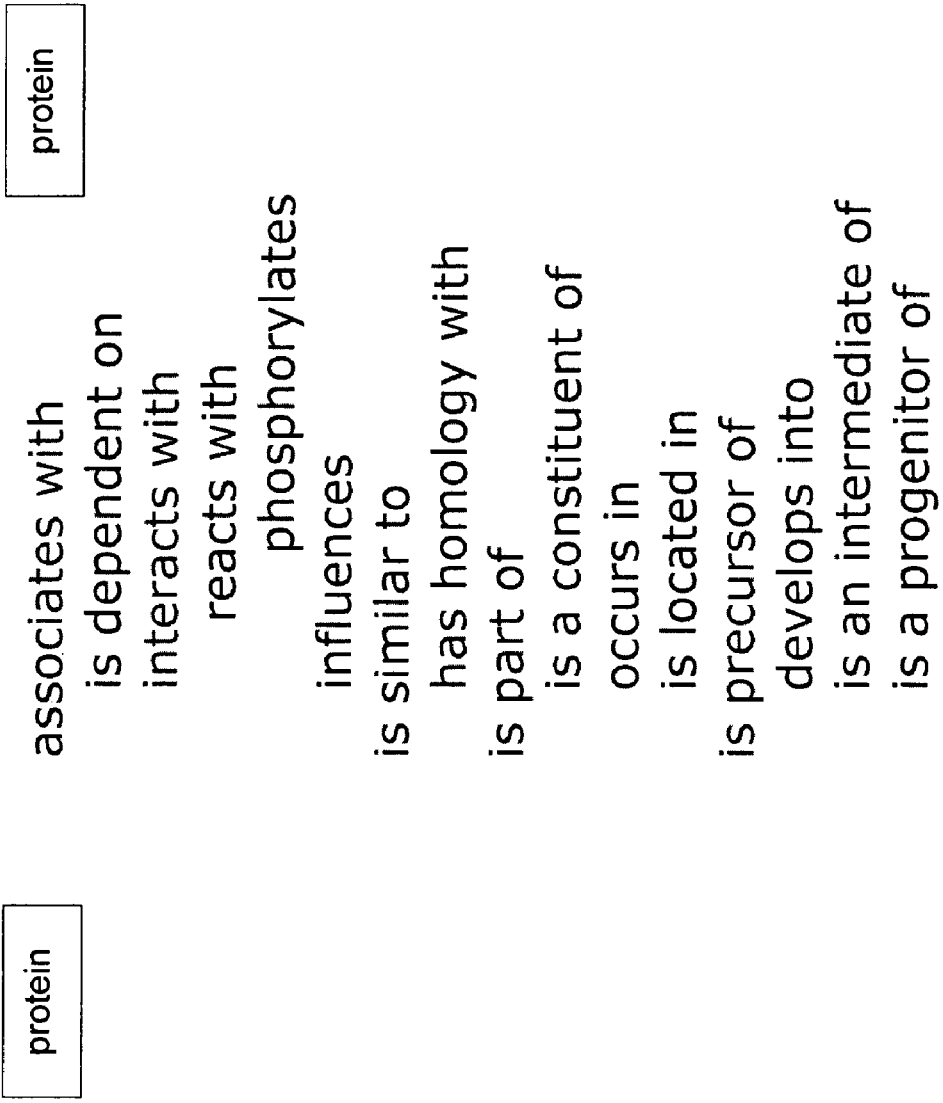
FIG. 3B is an exemplary illustration of a concept pair and a hierarchy of relationships according to an embodiment of the invention.

FIG. 3A is an exemplary illustration of a small portion of a hierarchy of relationships. In FIG. 3A, a concept pair 301 includes the concept types "compound" and "protein." Possible relationships 303a-n may exist between specific concepts of the types "compound" and "protein." In FIG. 3A, a relationship 305 ("cause") is a "top-level" relationship. Each one of the lower level-relationships 307a-n may represent children of the top level relationship. Children of the top level relationship may convey similar information as the top level relationship while also conveying descriptively significant nuances not specified in the top level relationship. Some of lower-level relationships 307a-n may be synonyms of each other. In some instances, these relationships may only be synonyms in the context of the two particular concept types of each concept pair. For example, other pairs of concept types within an ontology, e.g., "compound" and "disease," may also have "cause" as a possible relationship. However, the identity of the specific lower-level relationships and synonym identity may be different. For example, "precipitates" may not be a child relationship of the concept pair "compound" and "disease," as "precipitates" may not be considered relevant to disease. In some embodiments, hierarchies of relationships may have multiple parent-child levels. FIG. 3B. is an exemplary hierarchy of relationships that has multiple levels.

Figure 4:
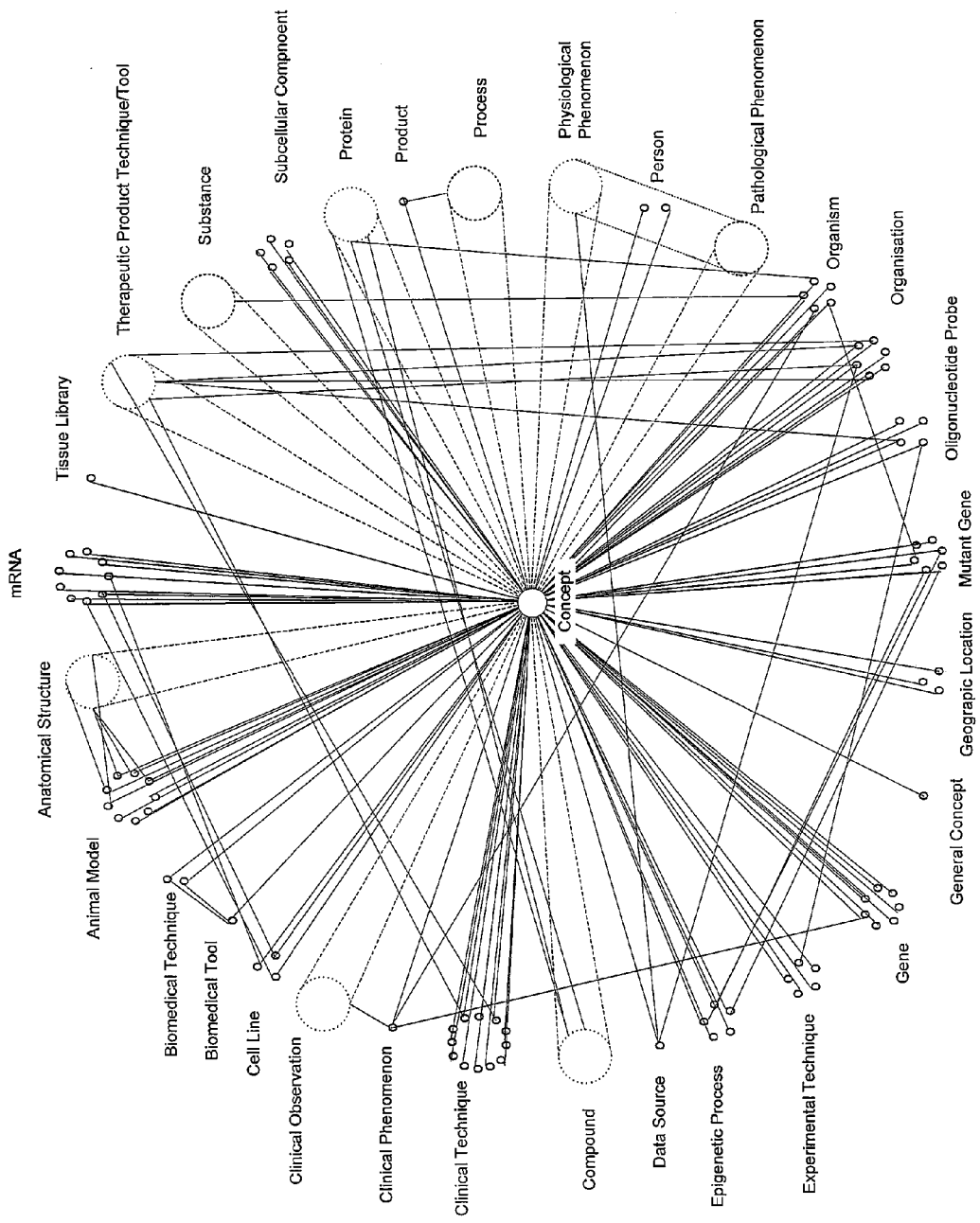
FIG. 4 is an exemplary illustration of an ontological organization of a central concept type and the possible relationships that may exist between the central concept type and other concept types in a domain.

In some embodiments, the set of possible concept types and the set of possible relationships that can be used to relate each pair of concept types may be organized as an ontology. FIG. 4 is an exemplary illustration of an ontological organization of a central concept type and the possible relationships that may exist between the central concept type and other concept types in a domain.

According to one embodiment of the invention, the computer-implemented system may include an upper ontology, an extraction module, a rules engine, an editor module, a chemical support module, one or more databases and servers, and a user interface module. Additionally, the system may include one or more of a quality assurance module, a publishing module, a path-finding module, an alerts module, and an export manager. Other modules may be used.

Figure 5:
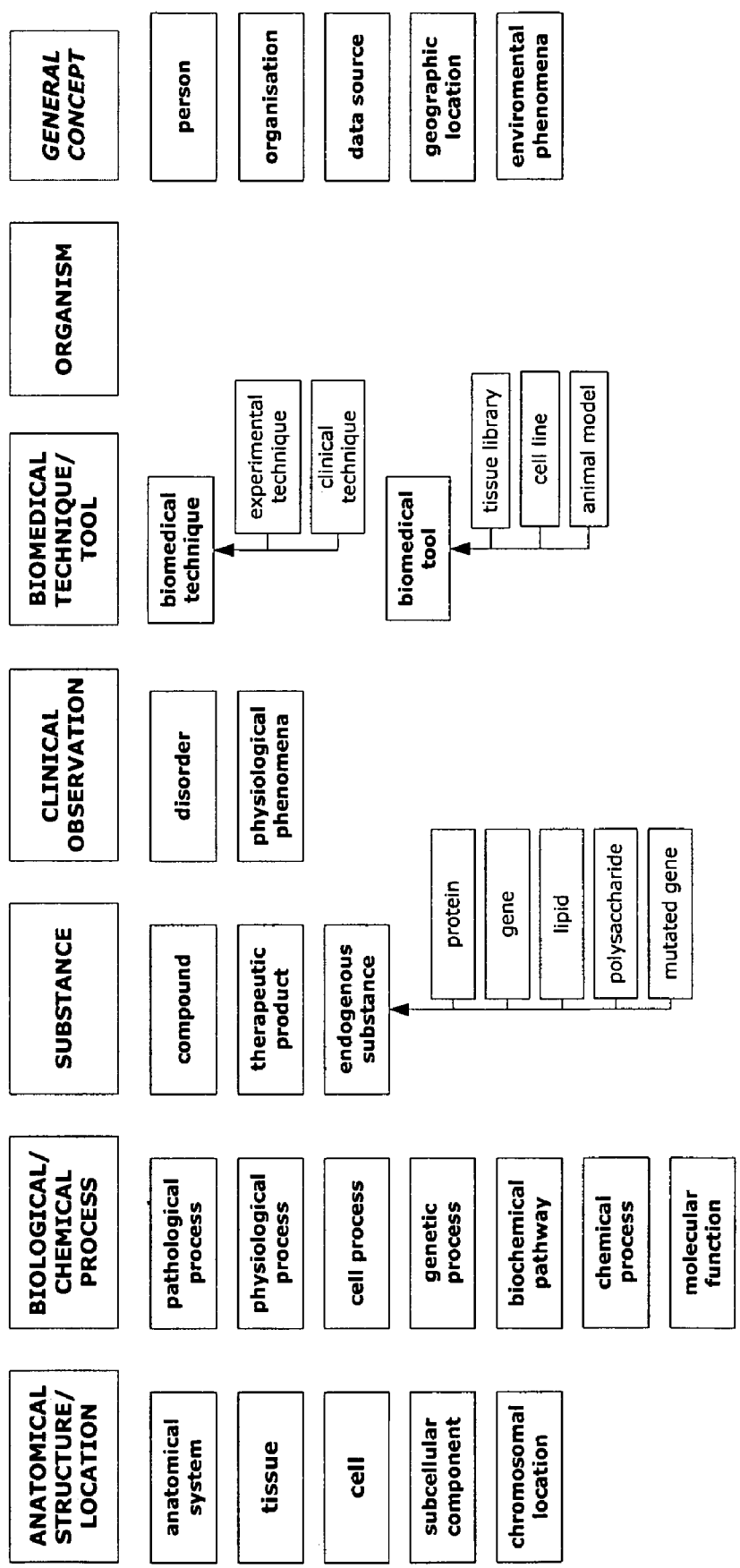
FIG. 5 is an exemplary illustration of an upper ontology containing a hierarchy of concept types according to an embodiment of the invention.

According to one embodiment, the upper ontology may store rules regarding the concept types that may exist in an ontology, the relationship types that may exist in an ontology, the specific relationship types that may exist for a given pair of concept types, the types of properties that those concepts and relationships may have, and/or other information. Separate upper ontologies may be used for specific domains. Information stored within a given upper ontology may be domain-specific. For example, a biomedical ontology may include concept types such as "disease" and "drug," as well as many other predetermined concept types and relationship types, while a legal ontology may contain such concept types as "legal discipline" or "jurisdiction." FIG. 5 is an exemplary illustration of a portion of an upper ontology of concept types for a biomedical domain.

The upper ontology may also store data source information. The data source information may include, for example, information regarding which data source(s) provide evidence for one or more assertions. Data source information may also include one or more of the name of the data source, the data source version, and one or more characteristics of the data source (e.g., is it structured, unstructured, or semi-structured; is it public or private; and other characteristics). The data source information may also include content information that indicates what content is contained in the data source and what can be pulled from the data source. Data source information may also include data regarding licenses (term, renewal dates, or other information) for access to a data source. Other data source information may also be used.

According to an embodiment of the invention, specific concept and relationship types may be predetermined and entered into an upper ontology. Concept and relationship types, the sets of possible relationships for each concept pair, the hierarchy of relationships for each concept pair, and other elements of the upper ontology for a given domain may be selected by an automated method, manually by researchers or administrators, or by a combination of both. The sheer number of linguistic combinations that may represent the same or similar relationships may, however, necessitate methodology for the consolidation of relationships into a number of standard categories. This methodology may produce at least two categories of relationships present within an upper ontology: non-normalized and normalized relationships.

Every assertion in each of the two categories may have at least the original English form associated with it. A first category of relationships may comprise "non-normalized" relationships. Non-normalized relationships may include unique relationships for which a representative or "normalized" version has not yet been used, and may have only the original English form associated with them.

A second category of relationships may comprise "normalized relationships," which may comprise well-characterized relationships representing numerous underlying linguistic forms. In addition to the original English form, normalized relationships also have a normalized form associated with them. For example, the normalized relationship "CA USES" (e.g., "Chemical X CAUSES Disorder Y") may represent specific underlying relationships such as "showed," "led-to," "produces," etc. Normalized relationships may, in certain embodiments, be indicated as such by their storage and/or display in capital letters. FIG. 6A illustrates a small portion of an exemplary list of normalized relationship types designed for use in a biomedical ontology.

A separate ontology of relationships may result from the characterization and normalization of relationship types. This ontology of relationship types may be used in the construction, maintenance, and use of substantive ontologies. In addition to the hierarchical organization of relations in a relations ontology, information may also be stored regarding the reverse form of the relationship "is-caused-by" vs. "causes," as well as whether the relationship is a negative relationship or not (e.g., "is-not-caused-by, does-not-cause"), and/or conditional language (e.g., "may-cause").

The upper ontology may enable flags that factor negation and inevitability of relationships into specific instances of assertions. In some embodiments, certain flags (e.g., negation, uncertainty, or others) may be used with a single form of a relationship to alter the meaning of the relationship. For example, instead of storing all the variations of the relationship "causes" (e.g., does-not-cause, may-cause) the upper ontology may simply add one or more flags to the root form "causes" when specific assertions require one of the variations. For example, a statement from a document such as "compound X does not cause disease Y" may be initially generated as the assertion "compound X causes disease Y." The assertion may be tagged with a negation flag to indicate that the intended sense is "compound X does-not-cause disease Y." Similarly, an inevitability flag may be used to indicate that there is a degree of uncertainty or lack of complete applicability about an original statement, e.g., "compound X may-cause disease Y." These flags can be used together to indicate that "compound X may-cause disease Y." Inverse relationship flags may also be utilized for assertions representing inverse relationships. For example, applying an inverse relationship flag to the relationship "causes" may produce the relationship "is-caused-by." Other flags may be used alone or in combination with one another.

The upper ontology may also include curator information. As detailed below, one or more curators may interact with the system. The upper ontology may store information about the curator and curator activity.

According to an embodiment, the system and method of the invention may access (or have access to) various data sources. These data sources may be structured, semi-structured, or unstructured data sources. The data sources may include public or private databases; books, journals, or other textual materials in print or electronic format; websites; or other data sources. In one embodiment, data sources may also include one or more searches of locally or remotely available information stores including, for example, hard drives, e-mail repositories, shared file systems, or other information stores. These information stores may be useful when utilizing an organization's internal information to provide ontology services to the organization. From this plurality of data sources, a "corpus" of documents may be selected. A corpus may include a body of documents within the specific domain from which one or more ontologies are to be constructed. In some embodiments, a corpus may be selected so as to contain documents that are known to (or thought to) contain information of interest. As used herein, the term "document" should be construed broadly and not be limited to text-based documents. For example, a document may include a database record, a web page, or other objects.

A variety of techniques may be used to select a corpus from a plurality of data sources. For example, the techniques may include one or more of manual selection, a search of metadata associated with documents (metasearch), an automated module for scanning document content (e.g., spider), or other techniques. A corpus may be specified for any one or more ontologies, from the data sources available, through any variety of techniques. For example, in one embodiment, a corpus may be selected using knowledge regarding valid contexts and relationships in which the concepts within the documents can exist. This knowledge may be iteratively supplied by an existing ontology.

In one embodiment, the system may include a rules engine (or rules module). The rules engine may enable creation, organization, validation, modification, storage, and/or application of various rules involved in ontology creation, maintenance, and use. The various types of rules enabled by the rules engine may include linguistic analysis rules, assertion extraction rules, curation rules, semantic normalization rules, inference rules, or other rules. Application of rules to a corpus of one or more documents (including the test-corpus) may generate rule-based products. The type of rule-based product generated may depend on the type of rule applied. Types of rule-based products may include, for example, tagged document content (including tagged or stored structure information for structured data sources), rules-based assertions, reified assertions, identification of semantically divergent assertions, production or identification of semantically equivalent assertions, inferred assertions, or other product or information. In some embodiments, the system of the invention may utilize defined chains of rules or "workflows" for the automated creation of multi-relational ontologies.

In one embodiment, a rule may be tested/validated against a known "test-corpus." The test-corpus may contain documents of varying types, originating from various data sources (e.g., unstructured, structured, etc). Furthermore, the test-corpus may contain known contents, including concepts, relationships, assertions, and other information. Rules may be applied to the test-corpus by the rules engine for the purpose of validating applied rules. Rule-based products obtained by the application of rules to a test-corpus for the purpose of rule validation may be referred to herein as "actual results."

As stated above, the contents of the test-corpus are known. As such, there may be expected rule-based products that "should" result from application of rules to the test-corpus during rule validation. These expected rule-based products may be referred to as herein as "expected results."

In one embodiment, the rules engine may validate at least one rule by comparing the actual results of rule application to the expected results. This comparison may produce information regarding the quality of individual rules such as, for example, the percentage of true positives returned by a particular rule, the percentage of false positives returned by a particular rule, the percentage of false negatives returned by a particular rule, the percentage of true negatives returned by a particular rule, or other information. As used herein, a true positive may include an instance wherein a particular rule "properly" returned an actual result corresponding to an expected result. A false positive may include an instance wherein a particular rule returned an actual result where no expected result was expected. A false negative may include an instance wherein a particular rule did not return an actual result where an expected result was expected. A true negative may include an instance wherein a particular rule "properly" did not return a result where a result was not expected.

In one embodiment, the rules engine may utilize predetermined thresholds for percentages of false positives and false negatives to validate rules. If the percentages of false positives or false negatives exceed the predetermined thresholds for a particular rule, then that rule may be modified, deleted, or replaced by a new rule. Modification of a rule that has exceeded the predetermined threshold for false positives may include "tightening" the rule's constraints, so as to reduce or eliminate the recognition of unexpected actual results. Modification of a rule that has exceeded the predetermined threshold for false negatives may include "relaxing" the rule's constraints, so as to increase the return of actual results where expected results are expected. Other modifications based on other criteria may be made. Modified rules may then be re-validated by the rules engine. In some embodiments, validated rules may then be stored by the rules engine and utilized by the rules engine and/or other modules (as described below) to create rule-based products for use in one or more multi-relational ontologies. While rules may be evaluated or tested using a test-corpus, in some embodiments, "real" data may also be utilized to evaluate rule performance.

In one embodiment, the rules engine may utilize an editor module. A curator or other person with appropriate access rights may utilize the editor module to interface with the rules engine to manually create, validate, apply, modify, and/or manipulate rules.

In one embodiment of the invention, a data extraction module may be used to extract data, including assertions, from one or more specified data sources. According to one embodiment, the data extraction module may perform a series of steps to extract "rules-based assertions" from one or more data sources. These rules-based assertions may be based on concept types and relationship types specified in the upper ontology, rules in the rules engine, or other rules.

Some rules-based assertions may be "virtual assertions." Virtual assertions may be created when data is extracted from certain data sources (usually structured data sources). In one embodiment, one or more structured data sources may be mapped to discern their structure. The resultant "mappings" may be considered rules that may be created using, and/or utilized by, the rules engine. Mappings may include rules that bind two or more data fields from one or more data sources (usually structured data sources). For example, "Data Source A" may have a column containing GENE NAME information, "Data Source B" may have columns containing DATABASE CROSS REFERENCE and PROTEIN NAME information. A rule (e.g., a mapping) may be created that dictates: when a value (e.g., "X") is seen in A:GENE_NAME and B:DATABASE_CROSS_REFERENCE fields, that the corresponding value in B:PROTEIN_NAME (e.g., "Y") exists. The rule then implicitly creates the assertion "gene X encodes protein Y." This specific assertion may not physically exist in the data sources in explicit linguistic form, it is created by applying a mapping to the structured data sources. This is why it is referred to as a "virtual assertion." The underlying structured data that is operated on by the rules involved may be stored in an area of the ontology. Virtual assertions created this way may be subject to the same semantic normalization and quality assurance checks as other assertions.

Virtual assertions and other rules-based assertions extracted by the extraction module may be stored in one or more databases. For convenience, this may be referred to as a "rules-based assertion store." According to another aspect of the invention, various types of information related to an assertion (e.g., properties or other information) may be extracted by the extraction module and stored with the virtual assertions or other assertions within the rules-based assertion store.

In some embodiments, one of several different descriptive labels may be applied to assertions based on a combination of one or more properties. These descriptive labels may include "factual assertions," "strongly evidenced assertions", "weakly evidenced assertions," or "inferred assertions." Other descriptive labels may exist. Factual assertions may include uncontroversial observations based on evidence that has accumulated over many years of discussion among experts. Strongly evidenced assertions may include observations from well-known structured data sources, that may be checked by a committee of experts. Weakly evidenced assertions may include opinions and observations based on evidence from one publication and/or where there may be conflicting evidence. Inferred assertions may include novel associations based on indirect logical reasoning, heuristics or computed evidence.

In one embodiment, rules from the rules engine may enable properties to be extracted from the corpus and stored with concept, relationship and assertion data. Properties may include one or more of the data source from which a concept and/or assertion was extracted, the type of data source from which it was extracted, the mechanism by which it was extracted, when it was extracted, evidence underlying concepts and assertions (e.g., one or more documents that contain information supporting the assertion), confidence weights associated with concepts and assertions, and/or other information. A mechanism by which an assertion was extracted may include the identity of one or more rules used in extraction, a sequence of rules used in extraction, information concerning a curator's role in extraction, and/or other information. In addition, each concept within an ontology may be associated with a label, at least one relationship, at least one concept type, and/or any number of other properties. Other properties may include quantitative values or qualitative information associated with certain concepts. If a given concept is a chemical compound such as, for example, aspirin, it may include a relationship with a quantitative property, such as molecular weight. In some embodiments, quantitative values may also be associated with whole assertions (rather than individual concepts). For example, a statement "gene x is up-regulated in tissue y, by five times" may lead to the assertion "gene x is-up-regulated-in tissue y," which is itself associated with the quantitative value "5x."

Additionally, a concept such as, for example, aspirin may have a qualitative property such as, for example, its chemical structure. Properties of concepts are themselves special concepts that form assertions with their parent concepts. As such, properties may have specific values (e.g., "aspirin has-molecular-weight-of X g/mole"). In some embodiments, properties may also indicate specific units of measurement.

Additionally, concepts in an ontology may further have relationships with their synonyms and/or their related terms. Synonyms and related terms may also be represented as properties. As an illustrative example, "heart" may be a synonym for (or related to) the term "myocardium." Thus, the concept "heart" may have a property relationship of: "heart is-a-synonym-of myocardium." Furthermore, because the invention may subject ontologies to semantic normalization (as discussed below), an ontology containing a relationship between aspirin and heart disease (e.g., "aspirin is-a-treatment-for heart disease") may recognize that there should be a relationship between aspirin and myocardial disease and create the assertion: "aspirin is-a-treatment-for myocardial disease."

Depending on the type of data source, different steps or combinations of steps may be performed to extract assertions (and related information) from the data sources. For example, for documents originating from structured data sources, the data extraction module may utilize rules from the rules engine to discern and/or map the structure of a particular structured data source. The data extraction module may then utilize rules from the rules engine to parse the structured data source, apply mappings, and extract concepts, relationships, assertions, and other information therefrom.

For documents originating from unstructured data and/or semi-structured data sources, a different procedure may be necessary or desired. This may include various automated text mining techniques. As one example, it may be particularly advantageous to use ontology-seeded natural language processing. Other steps may be performed. For example, if the document is in paper form or hard copy, optical character recognition (OCR) may be performed on the document to produce electronic text. Once the document is formatted as electronic text, linguistic analysis may be performed. Linguistic analysis may include natural language processing (NLP) or other text-mining techniques. Linguistic analysis may identify potentially relevant concepts, relationships, or assertions by tagging parts of speech within the document such as, for example, subjects, verbs, objects, adjectives, pronouns, or other parts of speech. FIG. 6B is an exemplary illustration of block of text (e.g., unstructured data), the first sentence of which has been dissected and had its contents tagged during linguistic analysis. In one embodiment, linguistic analysis rules may be used for linguistic analysis. Linguistic analysis rules may be created in, and/or applied by, the rules engine.

In some embodiments, linguistic analysis may include identifying the concept type of terms found in a data source. The context surrounding a term in a document, as well as heuristic analysis, inferencing patterns, and/or other information may be used to identify the concept types of a term. FIG. 6C illustrates several terms and the number of instances in which each been identified as a certain concept type. This information may be used to determine the correct or most appropriate concept type for a term and may also be used for other purposes.

In some embodiments, linguistic analysis may be "seeded" with a priori knowledge from the knowledge domain for which one or more ontologies are to be built. A priori knowledge may comprise one or more documents, an ontology (for ontology-seeded NLP), or other information source that supplies information known to be relevant to the domain. This a priori knowledge may aid linguistic analysis by, for example, providing known meaningful terms in the domain and, in the case of ontology-seeded NLP, the context and connections therebetween. These meaningful terms may be used to search for valid concept, relationship, and assertion information in documents on which linguistic analysis is being performed.

This a priori knowledge may also utilize domain knowledge from an existing ontology to inform the system as to what speech patterns to look for (knowing that these speech patterns will likely generate high quality assertions). For example, a priori knowledge such as, for example, an existing ontology, can be used to identify all instances of a specific pattern (e.g., find all GPCRs that are bound to by neuroleptic drugs), or to find new members of a given concept type. For example, if a certain group of proteins are known in a seed ontology, and all of the forms that a "BINDS TO" relationship may take are also known, one may find all of the things that the proteins bind to. Drawing on knowledge from the ontology improves the precision of extraction (as the members of a class are explicitly defined by the ontology, and not inferred from statistical co-occurrence), as well as its recall (as all of the synonyms of the members of a type may be used in the search as well).

Figure 7:
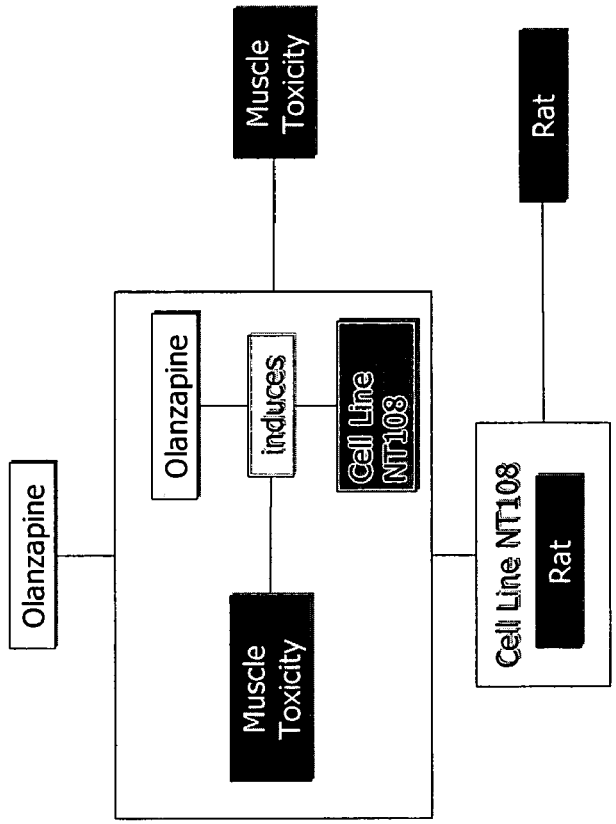
FIG. 7 is an exemplary illustration of a complex linguistic structure associated in a frame according to an embodiment of the invention.

Linguistic analysis, including NLP, may enable recognition of complex linguistic formations, such as context frames, that may contain relevant assertions. A context frame may include the unique relationships that only exist when certain concepts (usually more than two) are considered together. When one concept within a context frame is removed, certain relationships disappear. For example, the text "the RAF gene was up-regulated in rat hepatocyes in the presence of lovastatin" includes three concepts linked by a single frame of reference. If one is removed, all assertions in the frame may cease to exist. The system of the invention enables these and other linguistic structures to be identified, associated together in a frame, and represented in an ontology. FIG. 7 illustrates an example of a complex linguistic context frame 700, wherein a relationship exists between the concepts "Olanzapine," "muscle toxicity," and "rat cell line NT108."

In one embodiment, one or more rules may be utilized along with web crawlers to gather concept, relationship, assertion, and other information from websites or other documents for use in an ontology. Gathering information from websites may include utilizing meta-search engines configured to construct searches against a set of search engines such as, for example, Google, Lycos, or other search engine. A selective "spider" may also be used. This spider may look at a set of web pages for specified terms. If the spider finds a term in a page, it may include the page in the corpus. The spider may be configured to search external links (e.g., a reference to another page), and may jump to and search a linked page as well. Additionally, one or more rules may be used with a hard drive crawler to search hard drives or other information stores in a manner similar to the spider. The hard drive crawler may pull documents such as, for example presentations, text documents, e-mails, or other documents.

Different persons may interact with the ontology creation, maintenance, and utilization processes described herein. An administrative curator, for example, may include an individual with universal access rights, enabling him or her to alter vital parts of the system of the invention such as, for example, one or more rules or the structure and content of the upper ontology. A curator may include an individual with reduced access rights, enabling validation and creation of assertions, or application of constraints for ontology export. A user may include an individual with access rights restricted to use and navigation of part or all of one or more ontologies. Other persons with differing sets of access rights or permission levels may exist.

In one embodiment, one or more assertion extraction rules utilized by the rules engine may be applied to the documents to generate rules-based assertions from tagged and/or parsed concept information, relationship information, assertion information, or other information within the corpus of documents. The upper ontology of concept and relationship types may be used by the assertion extraction rules to guide the generation of assertions.

In various embodiments, disambiguation may be applied as part of rule-based assertion generation. Disambiguation may utilize semantic normalization rules or other rules stored by the rules engine to correctly identify concepts relevant to the ontology. For a term that may have multiple meanings, disambiguation may discern what meanings are relevant to the specific domain for which one or more ontologies are to be created. The context and relationships around instances of a term (or lexical label) may be recognized and utilized for disambiguation. For example, rules used to create a disease-based ontology may create the rules-based assertion "cancer is-caused-by smoking" upon tagging the term "cancer" in a document. However, the same rules may tag the term "cancer," but may recognize that the text "cancer is a sign of the zodiac" does not contain relevant information for a disease-based ontology.

Another example that is closely wed to ontology-seeded NLP may include the text "compound x eradicates BP." BP could be an acronym for Blood Pressure, or *Bacillus pneumoniae*, but since it does not make sense to eradicate blood pressure (as informed by an ontology as a priori knowledge), a rule can disambiguate the acronym properly from the context to be *Bacillus pneumoniae*. This is an example of using the relationships in the multi-relational ontology as a seed as well as the concept types and specific instances. In practical terms, the "eradicates" relation may only occur between the concept pair "COMPOUND" to "ORGANISM," and not between the concept pair "COMPOUND" to "PHYSIOLOGICAL PHENOMENON."

The knowledge that underpins decisions such as these may be based on a full matrix analysis of previous instances of terms and/or verbs. The number of times a given verb connects all pairs of concept types may be measured and used as a guide to the likely validity of a given assertion when it is identified. For example, the verb "activates" may occur 56 times between the concept pair COMPOUND and BIOCHEMICAL PROCESS, but never between the concept pair COMPOUND and PHARMACEUTICAL COMPANY. This knowledge may be utilized by rules and/or curators to identify, disambiguate assertions, and/or for other purposes.

As mentioned above, the application of assertion extraction rules (and/or other rules) may be directed by the upper ontology. In defining relationship types that can exist in one or more domain specific ontologies and the rules that can be used for extraction and creation of rules-based assertions, the upper ontology may factor in semantic variations of relationships. Semantic variations dictate that different words may be used to describe the same relationship. The upper ontology may take this variation into account. Additionally, the upper ontology may take into account the inverse of each relationship type used (as shown in FIG. 1). As a result, the vocabulary for assertions being entered into the system is controlled. By enabling this rich set of relationships for a given concept, the system of the invention may connect concepts within and across domains, and may provide a comprehensive knowledge network of what is known directly and indirectly about each particular concept.

In one embodiment, the system and/or a curator may curate assertions by undertaking one or more actions regarding assertions within the rules-based assertion store. These one or more actions may be based on a combination of one or more properties associated with each assertion. Examples of actions/processes of curation may include, for example, reifying/validating rules-based assertions (which entails accepting individual, many, or all assertions created by a rule or mapping), identifying new assertions (including those created by inferencing methods), editing assertions, or other actions.

In some embodiments, the actions undertaken in curation may be automated, manual, or a combination of both. For example, manual curation processes may be used when a curator has identified a novel association between two concepts in an ontology that has not previously been present at any level. The curator may directly enter these novel assertions into an ontology in a manual fashion. Manually created assertions are considered automatically validated because they are the product of human thought. However, they may still be subject to the same or similar semantic normalization and quality assurance processes as rules-based assertions.

Automated curation processes may be conducted by rules stored by the rules engine. Automated curation may also result from the application of other rules, such as extraction rules. For example, one or more rules may be run against a corpus of documents to identify (extract) rules-based assertions. If a rule has been identified as sufficiently accurate (e.g., >98% accurate as determined by application against a test-corpus), the rules-based assertions that it extracts/generates may be automatically considered curated without further validation. If a rule falls below this (or other) accuracy threshold, the assertions it extracts/generates may be identified as requiring further attention. A curator may choose to perform further validation by applying a curation rule or by validating the assertions manually. Automated curation of virtual assertions may be accomplished in a similar fashion. If a mapping (rule) is identified as performing above a certain threshold, a curator may decide to reify or validate all of the virtual assertions in one step. A curator may also decide to reify them individually or in groups.

In some embodiments, curators may also work with and further annotate reified assertions in the same way as rules-based assertions.

In some embodiments, semantic normalization of assertions may occur during curation. Semantic normalization may include a process wherein semantic equivalences and differences of concepts and assertions are recognized and accounted for. For example, a semantic equivalence may exist for the concept "heart attack." The concept "myocardial infarction" may be semantically equivalent to the concept "heart attack." As such, these concepts, and certain assertions in which they reside, may be considered equivalent. Conversely, certain terms may have semantically divergent meanings. For example, the term "cold" may refer to the temperature of a substance, or may refer to an infection of the sinuses. As such, contextual and other information may be used to recognize the semantic difference in the term "cold" and treat assertions containing that term accordingly. In some embodiments, an analysis of which relationships can be used to join certain pairs of concepts may be used for semantic normalization. This knowledge may be derived from existing ontologies and may be used iteratively during new ontology development. Semantic normalization may be performed manually, by a curator, or in an automated or semi-automated fashion by semantic normalization rules.

In one embodiment, curation may include inferencing. An inference is a new logical proposition based on other assertions. Inferencing may include the automated or manual creation of new assertions using previously known data. Automated inferencing may include rule-based inferencing. Rule-based inferencing may deal with the comparison of properties of two concepts and establishing that where there is a concordance beyond an established threshold, there may be an association between the concepts. Automated inferencing may also include reasoning-based inferencing. Reasoning-based inferencing may include identification of pre-established patterns in primary assertions that can be used to define new, syllogistic-type associations that are based on first order logic. An example of a syllogistic-type reasoning-based inference may include: synoviocytes are involved in rheumatoid arthritis; synoviocytes contain COX-2 (an enzyme); thus, COX-2 may be a target for treatment of rheumatoid arthritis. In some embodiments, rule-based inferencing and/or reasoning-based inferencing may be accomplished by the application of inference rules. In some embodiments, different types of inference patterns such as, for example, constraint-based logic, imperative logic, Booleans, or other inference patterns may be used. Additionally, a weighted voting scheme may be used to determine whether concepts in a purported assertion are of a given concept type (see FIG. 6C), and whether the purported assertion conforms to all of the requirements to form a valid assertion.

Figure 8:
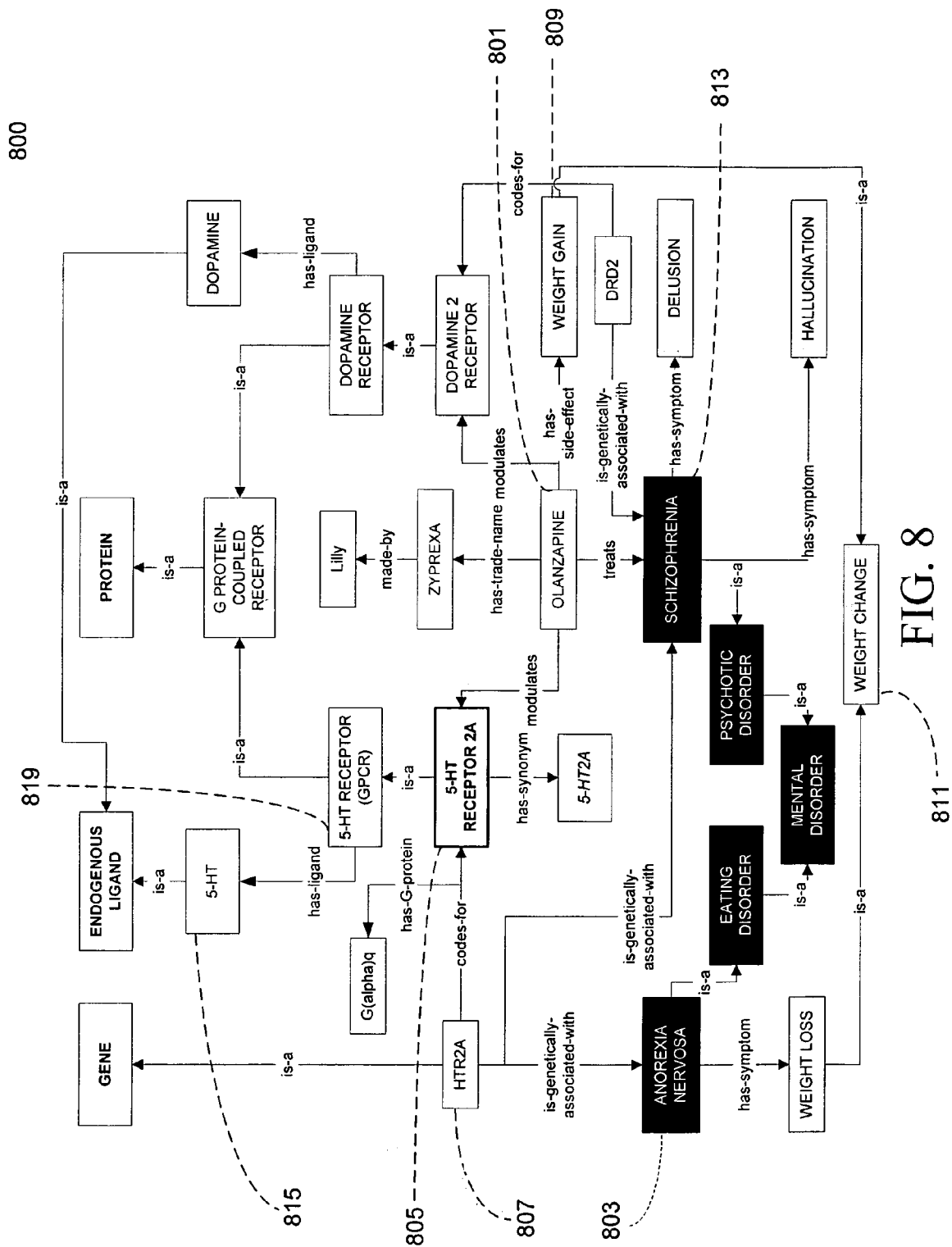
FIG. 8 is an exemplary illustration of a multi-relational ontology according to an embodiment of the invention.

FIG. 8. is exemplary illustration of an ontology 800 which may be used to demonstrate a reasoning-based inferencing process. For example, the invention may enable the creation of an inferred relationship between a concept 801, "olanzapine," and a concept 803, "anorexia nervosa." Note that ontology 800, as shown, does not contain a direct relationship between "olanzapine" and "anorexia nervosa." However, such a relationship may be inferred using the relationships existing in ontology 800 as shown. A first inference route may include the following path of assertions: concept 801, "olanzapine," modulates "5-HT receptor 2A," (a concept 805) which is-coded-by the "HTR2A" gene, (a concept 807) which is-genetically-associated-with concept 803, "anorexia nervosa." A second inference route may include: concept 801, "olanzapine," has the side-effect of "weight gain," (a concept 809) which is-a-type-of "weight change," (a concept 811) which has a sub-class "weight loss," (a concept 813) which is a symptom of concept 803, "anorexia nervosa." As can be seen in the knowledge network of ontology 800, there are numerous other routes one could use to support an inferred relationship between concept 801, "olanzapine," and concept 803, "anorexia nervosa." From the accumulated inferences, the user may postulate that olanzapine may be an effective treatment for anorexia nervosa.

Inference may also provide insight into the aetiology (origins) of disease. For example, there may be an inferred relationship between a concept 813, "schizophrenia," and a concept 815, "5-HT." A first inference route may include: concept 813, "schizophrenia," is-treated-by "olanzapine," (concept 801) which modulates "5-HT receptor 2A," (concept 805) which is-a "5-HT Receptor," (a concept 819) which have the endogenous-ligand of concept 815, "5-HT." A second inference route may include: concept 813, "schizophrenia," is genetically-associated-with "HTR2A," (concept 807) which codes-for "5-HT receptor 2A," (concept 805) which is-a "5-HT Receptor," (concept 819) which have the endogenous-ligand of concept 815, "5-HT."

In addition to demonstrating various qualities of inferencing within the invention, the preceding inference routes also serve as examples of the potential wealth of knowledge provided by the descriptive relationships that may exist in multi-relational ontologies.

The quality of an inference may be based upon relationships comprising the inference and may be dependent upon the type of relationships used in the inference, the number of relationships used in the inference, the confidence weights of assertions used in the inference, and/or the evidence that supports assertions in the inference. Inferencing may be used for several purposes within the system of the invention. For example, inferencing may be used as a consistency check to further authenticate the semantic validity of assertions (e.g., if "A" is a "B," then "B" is a "A" cannot be valid). Another use for inferencing may be to discover knowledge from within the one or more knowledge networks of the invention. This may be accomplished using the logic of the direct and indirect relationships within one or more ontologies (see e.g., FIG. 8). For example, if an ontology were queried to "get drugs that target GPCRs and treat hallucination," the query may have to draw inferences using drug-target, disease-symptom, and disease-drug assertions. Another use for inferencing may include knowledge categorization of an existing assertion into an existing ontology. For example, a concept with a series of properties may be automatically positioned within an existing ontology using the established relationships within the ontology (e.g., a seven trans-membrane receptor with high affinity for dopamine may be positioned in the ontology as a GPCR dopamine receptor).

Throughout the invention, it may be desirable to document through evidence and properties, the mechanisms by which assertions were created and curated. As such, curator information (e.g., who curated and what they did) may be associated with assertions. Accordingly, curators or other persons may filter out some or all assertions based on curator information, confidence scores, inference types, rules, mechanisms, and/or other properties.

In one embodiment, curation may also include identification of new relationship types, identification of new concept types, and identification of new descendents (instances or parts) of concept types. Assuming a curator or administrative curator is authorized, the curator or administrative curator may edit the upper ontology according to the above identifications using the editor module described below. Editing of the upper ontology may take place during curation of one or more assertions, or at another time.

In one embodiment, curation processes may utilize an editor module. The editor module may include an interface through which a curator interacts with various parts of the system and the data contained therein. The editor module may be used to facilitate various functions. For example, the editor module may enable a curator or suitably authorized individual to engage in various curation processes. Through these curation processes, one or more curators may interact with rules-based assertions and/or create new assertions. Interacting with rules-based assertions may include one or more of viewing rules-based assertions and related information (e.g., evidence sets), reifying rules-based assertions, editing assertions, rejecting the validity of assertions, or performing other tasks. In one embodiment, assertions whose validity has been rejected may be retained in the system alongside other "dark nodes" (assertions considered to be untrue), which are described in greater detail below. The curator may also use the editor module to create new assertions. In some embodiments, the editor module may be used to define and coordinate some or all automated elements of data (e.g., concept, relationship, assertion) extraction.

In one embodiment, a curator or other authorized individual may add tags to assertions regarding descriptive, statistical, and/or confidence weights or other factors determined by the curator to be relevant to the purpose of the ontology (collectively "confidence weights"). For instance, confidence weights may provide information indicating how reliable an assertion is or how reliable certain evidence is that supports an assertion. Confidence weights may also be added by the system through an automated process. Automated confidence weights may include a measure of the quality, reliability, or other characteristic of one or more rules, data sources, or other information used in the life cycle of an assertion (e.g., extraction, curation, etc.). For example, GENBANK is a primary source for gene sequence information, but its annotation of tissue types in which a given sequence is found is rather unreliable. Assertions based around gene sequence identifiers using GENBANK as their primary source would therefore likely be scored highly (by a rule), and those based around tissue types using GENBANK information would be scored lower (by a rule) or may be ignored completely. This basic principle may be superseded by manual annotation by an administrator. In some embodiments, a confidence weight or confidence score may be computed by combining confidence weights for combinations of concepts from different sources. In some embodiments, confidence weights may be computed by combining several annotation properties. For example, if an assertion was derived from "primary literature" (e.g., professional journals), it may be given a higher confidence weight. If an assertion was extracted using a rule that is known to have a 99% quality level, the assertion may be given a higher confidence weight. If an assertion was curated manually by a particular person who is highly respected, the assertion may also be given a higher confidence weight. Other factors may be used and any number of factors may be used in combination and/or weighted according to their importance. Furthermore, the factors used to calculate confidence weights and/or the weight given to any of the factors may be altered depending on the goals, purposes, and/or preferences of a particular user.

In one embodiment, the editor module may also enable an authorized individual (e.g., an administrative curator) to create, edit, and/or maintain a domain-specific upper ontology. For example, an administrative curator may specify the set of concept and relationship types and the rules that govern valid relationships for a given concept type. The administrative curator may add or delete concept or relationship types, as well as the set of possible associations between them. The editor module may also enable the management of the propagation of effects from these changes.

In one embodiment, the editor module may also enable an authorized individual, such as an administrative curator, to create, edit, or remove any of the rules associated with the system such as, for example, rules associated with identifying, extracting, curating, inferring assertions, or other rules. The editor module may also enable an authorized individual to manage the underlying data sources or curator information associated with the system. Managing the underlying data sources may include managing what type of data sources can be used for ontology creation, what specific data sources can be used for specific ontology creation, the addition of new rules dictating the formation of rules-based assertions from or among certain data sources, or other data source management. Managing curator information may include specifying the access rights of curators, specifying what curators are to operate on what data, or other curator specific management. Both data source and curator management may be accomplished using rules within the rules engine.

In one embodiment, the editor module may have a multi-curator mode that enables more than one curator to operate on a particular data set. As with any curation process (single or multiple curator, automated or manual), tags may be placed on the data (e.g., as properties of concepts) regarding who worked on the data, what was done to the data, or other information. This tagging process may enable selective use and review of data based on curator information.

In one embodiment of the invention, the editor module may include a document viewer. The document viewer may enable a curator to interface with the documents containing assertion data. The curator may utilize this interface to validate marginal assertions or to extract assertions from complex linguistic patterns. The editor module in conjunction with the document viewer may tag and highlight text (or other information) within a document used to assemble assertions. Suggested assertions may also be highlighted (in a different manner) for curator validation.

Figure 9A:
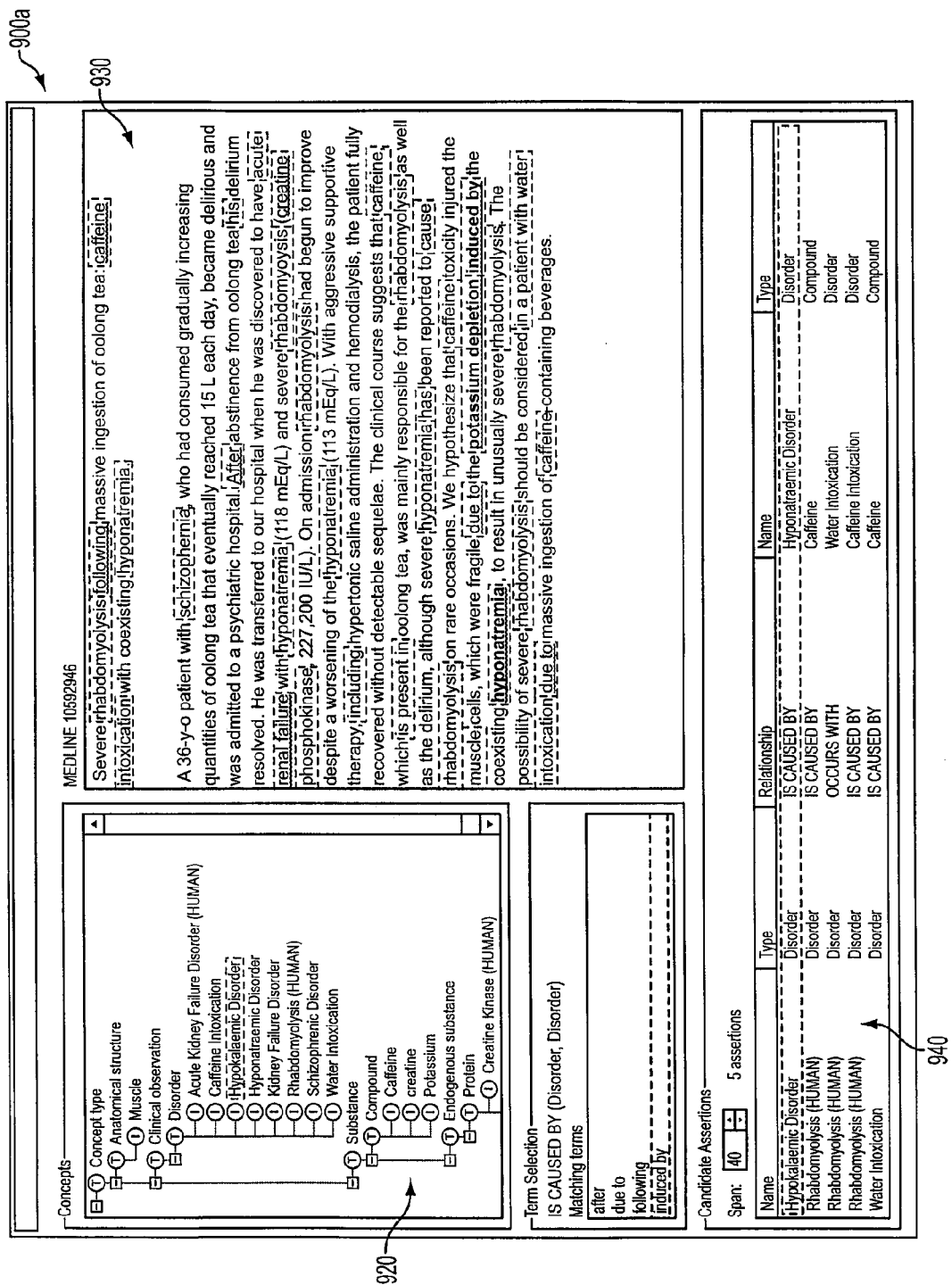
FIG. 9A illustrates an exemplary document viewer interface, according to an embodiment of the invention.

FIG. 9A is an exemplary illustration of a document viewer display or view 900a that is designed to, in conjunction with the editor module or other modules, enable the entry of assertions, concepts, and relationships from text documents. It should be understood that the view in FIG. 9A, as well as those views or displays illustrated in other drawing figures, are exemplary and may differ in appearance, content, and configuration.

According to an embodiment, the document viewer may, for example, enable a user to call up a specific document from a specified corpus that contains a keyword of interest. All of the ontology concepts contained within the document may be presented in a hierarchy pane or display 920, and highlighted or otherwise identified in the text appearing in text display 930. Recognized relationships may also be highlighted or otherwise identified in the text. Where concepts of the correct types are potentially connected by appropriate relationships within a specified distance with a sentence, they may be highlighted or otherwise identified as suggested candidate assertions in a candidate assertion pane or display 940. Existing assertions already in the ontology, and those suggested by the automated text-mining may also be highlighted or otherwise identified.

Curation processes may produce a plurality of reified assertions. Reified assertions may be stored in one or more databases. For convenience, this may be referred to as the reified assertion store. The reified assertion store may also include assertions resulting from manual creation/editing, and other non-rule based assertions. The rules-based assertion store and the reified assertion store may exist in the same database or may exist in separate databases. Both the rules-based assertion store and the reified assertion store may be queried by SQL or other procedures. Additionally, both the rules-based and reified assertions stores may contain version information. Version information may include information regarding the contents of the rules-based and/or reified assertion stores at particular points in time.

In one embodiment, a quality assurance module may perform various quality assurance operations on the reified assertion store. The quality assurance module may include a series of rules, which may be utilized by the rules engine to test the internal and external consistency of the assertions that comprise an ontology. The tests performed by these rules may include, for example, certain "mundane" tests such as, for example, tests for proper capitalization or connectedness of individual concepts (in some embodiments, concepts may be required to be connected to at least one other concept). Other tests may exist such as, for example, tests to ensure that concept typing is consistent with the relationships for individual concepts (upstream process/elements such as, for example, various rules and/or the upper ontology generally ensure that these will already be correct, but they still may be checked). More complex tests may include those that ensure semantic consistency. For example, if an individual concept shares 75% of its synonyms with another individual concept, they may be candidates for semantic normalization, and therefore may be flagged for manual curation.

Figure 9B:
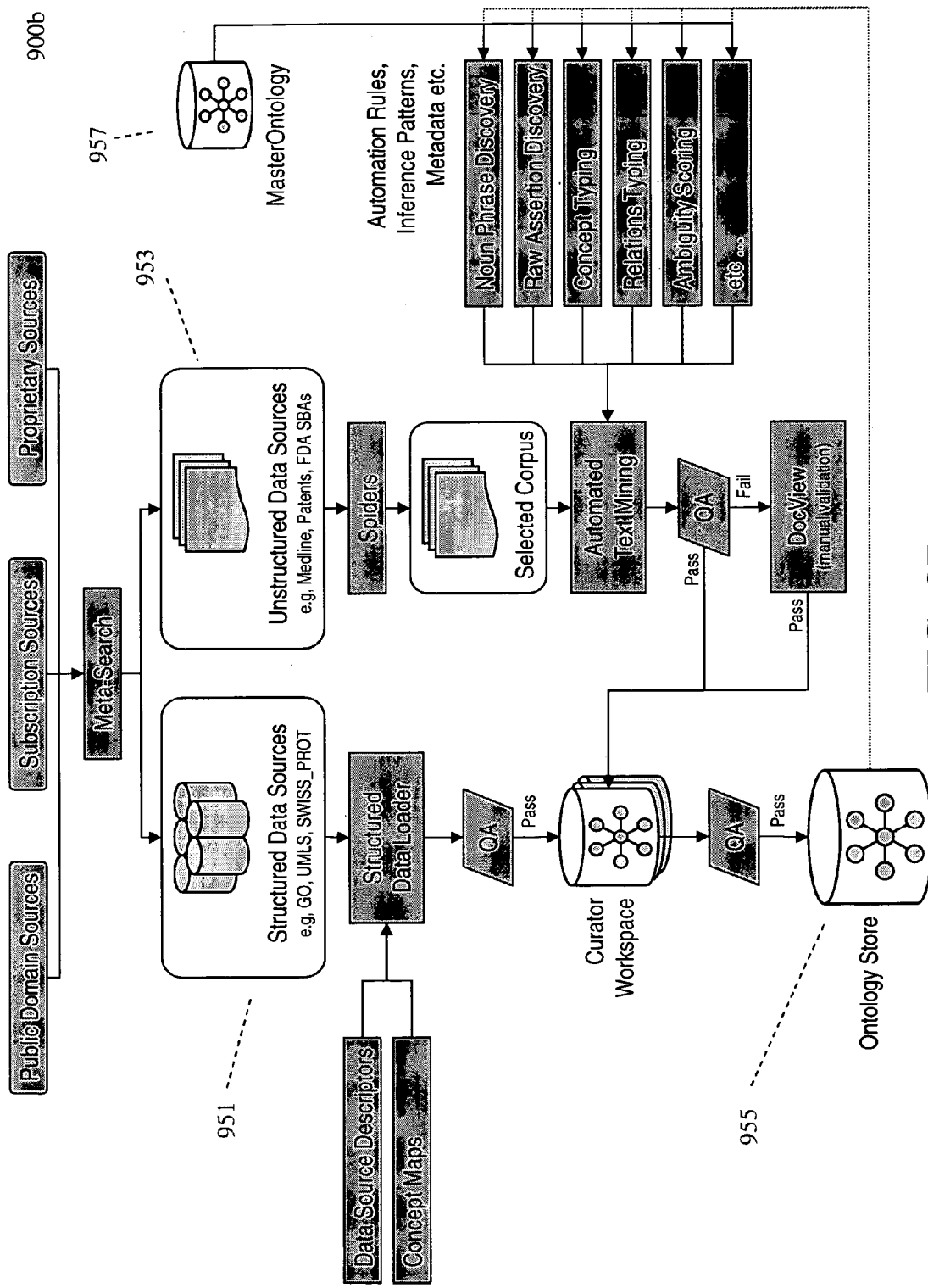
FIG. 9B illustrates an exemplary chart of ontology creation processes according to an embodiment of the invention.

FIG. 9B illustrates an exemplary process 900b, wherein information from various data sources may be used to develop one or more multi-relational ontologies. FIG. 9B illustrates an overview of one embodiment of the invention, which includes: extraction of data from structured data sources 951 and unstructured data sources 953; processing of this data, including curation and one or more quality assurance (QA) processes; and ultimately, storage of the data in an ontology store 955. As illustrated in process 900b and as discussed in detail herein, a master ontology 957 may be utilized in one or more processes of ontology creation/development. Data from ontology store 955 may then be published, as detailed herein.

A publishing module may then publish reified assertions as a functional ontology. In connection with publication of reified assertions, the reified assertion store may be converted from a node-centered edit schema, to a graph-centered browse schema. In some embodiments, virtual assertions derived from structured data sources may not be considered "reified." However, if these virtual assertions are the product of high percentage rules/mappings, they may not require substantive reification during curation and may achieve a nominal "reified" status upon preparation for publication. As such, the conversion from browse schema to edit schema may serve to reify any of the remaining un-reified virtual assertions in the system (at least those included in publication).

Publication and/or conversion (from edit to browse schema) may occur whenever it is desired to "freeze" a version of an ontology as it exists with the information accumulated at that time and use the accumulated information according to the systems and methods described herein (or with other systems or methods). In some embodiments, the publishing module may enable an administrative curator or other person with appropriate access rights to indicate that the information as it exists is to be published and/or converted (from edit to browse schema). The publishing module may then perform the conversion (from edit to browse schema) and may load a new set of tables (according to the browse schema) in a database. In some embodiments, data stored in the browse schema may be stored in a separate database from the data stored in an edit schema. In other embodiments, it may be stored in the same database.

During extraction and curation, assertions may be stored in an edit schema using a node-centered approach. Node-centered data focuses on the structural and conceptual framework of the defined logical connection between concepts and relationships. In connection with publication, however, assertions may be stored in a browse schema using a graph-centered approach.

Figure 10:
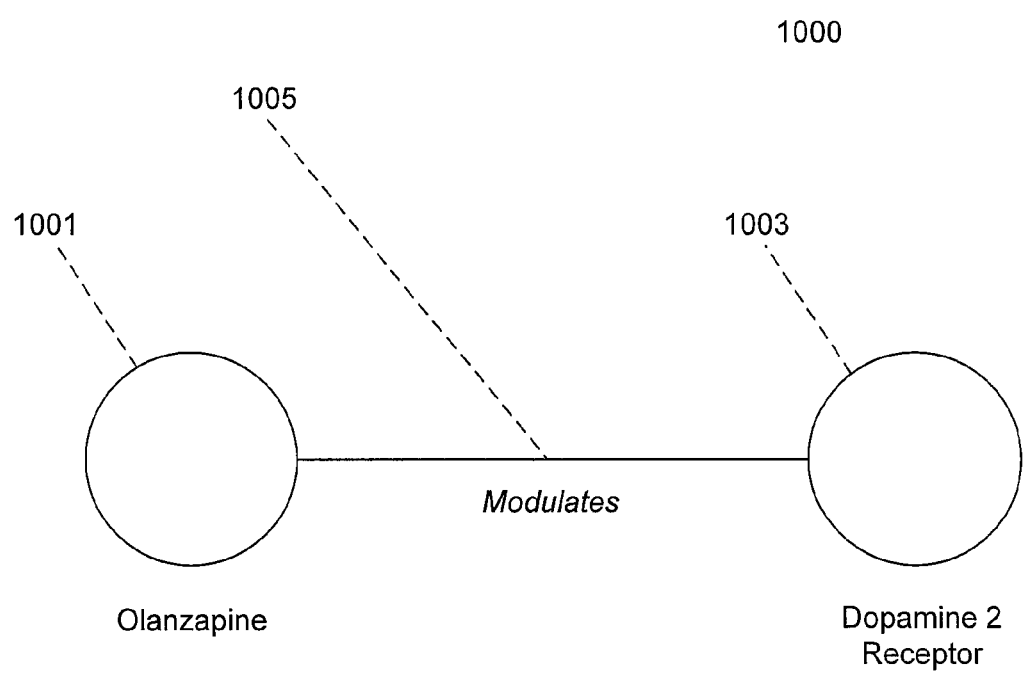
FIG. 10 is an exemplary illustration of a concept-relationship-concept triplet according to an embodiment of the invention.

Graph-centered views of ontology data may include the representation of assertions as concept-relationship-concept (CRC) "triplets." In these CRC triplets, two nodes are connected by an edge, wherein the nodes correspond to concepts and the edge corresponds to a relationship. FIG. 10 illustrates an example of a CRC triplet 1000 representing the assertion: "olanzapine modulates dopamine 2 receptor." Node 1001 represents the concept "olanzapine." Node 1003 represents the concept "dopamine 2 receptor." And edge 1005 represents the connecting relationship "modulates.".

Using a graph centered approach, CRC triplets may be used to produce a directed graph. A directed graph is one form of representing the complex knowledge network contained in one or more ontologies. A directed graph may include two or more interconnected CRC triplets that potentially form cyclic paths of direct and indirect relationships between concepts in an ontology or part thereof. FIG. 8 is an exemplary illustration of a directed graph.

The elements and processes described above may be utilized in whole or in part to generate and publish one or more multi-relational, domain-specific ontologies. In some embodiments, not all elements or processes may be necessary. The one or more ontologies may be then used, collectively or individually, in whole or in part, as described below.

Once one or more ontologies are published, they can be used in a variety of ways. For example, one or more users may view one or more ontologies and perform other knowledge discovery processes via a graphical user interface (GUI) as enabled by a user interface module. A path-finding module may enable the paths of assertions existing between concepts of an ontology to be selectively navigated. A chemical support module may enable the storage, manipulation, and use of chemical structure information within an ontology. Also, as detailed below, the system may enable a service provider to provide various ontology services to one or more entities, including exportation of one or more ontologies (or portions thereof), the creation of custom ontologies, knowledge capture services, ontology alert services, merging of independent taxonomies or existing ontologies, optimization of queries, integration of data, and/or other services.

According to another aspect of the invention, a graphical user interface may enable a user to interact with one or more ontologies.

Figure 11:
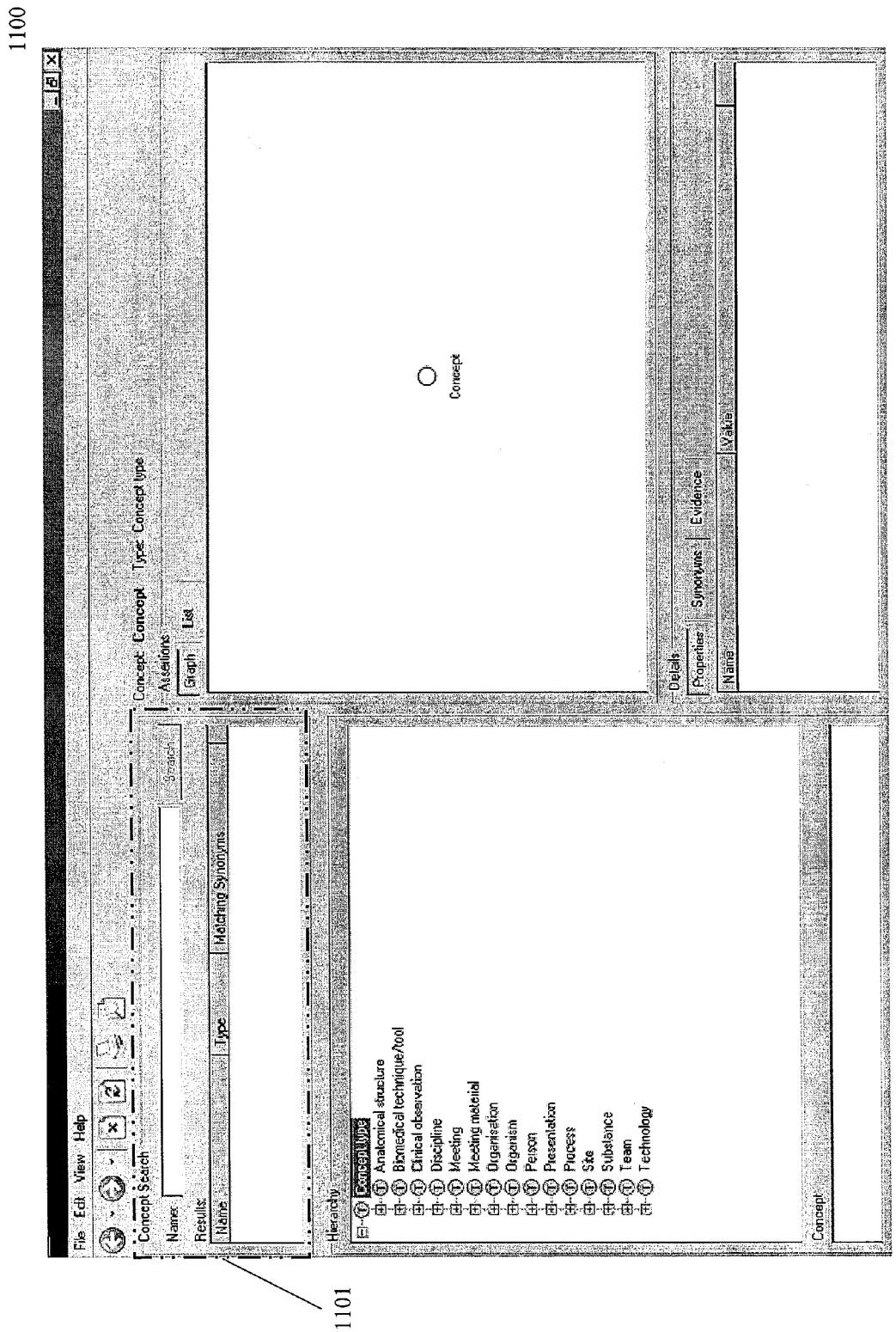
FIG. 11 illustrates an exemplary interface, according to an embodiment of the invention.

In one embodiment, a graphical user interface may include a search pane. FIG. 11 illustrates an exemplary interface 1100 including a search pane 1101. Within search pane 1101, a user may input a concept of interest, term of interest, chemical structure (described in detail below), or relevant string of characters. The system may search one or more ontologies for the concept of interest, term of interest, chemical structure, or the relevant string (including identifying and searching synonyms of concepts in the one or more ontologies). The graphical user interface may then display the results of the search in search pane 1101, including the name of the concepts returned by the search, their concept type, their synonyms, or other information.

Figure 12:
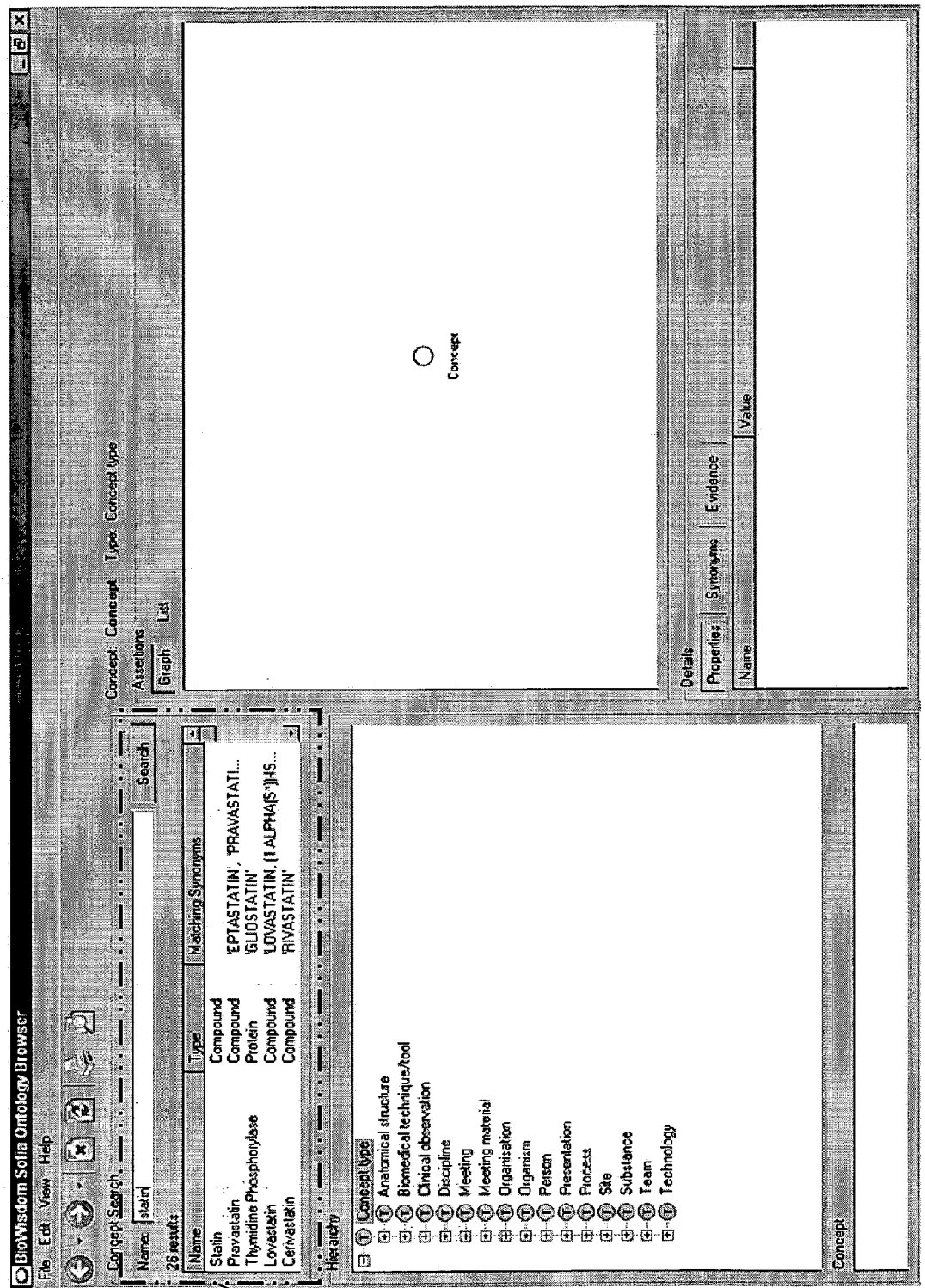
FIG. 12 illustrates an exemplary interface, according to an embodiment of the invention.

FIG. 12 illustrates an exemplary interface 1200, wherein the concept "statin" has been entered into a search pane 1201. After performing a search on the term "statin," all of the concepts contained in the ontology regarding statins may be returned in search pane 1201, along with the concept type for each concept returned, matching synonyms for each returned concept, or other information. A user may select a concept from results displayed in search pane 1201 and utilize the functionality described herein.

In one embodiment, the system may enable a user to add a relationship to a concept or term of interest when conducting a search of one or more ontologies. For example, a user may desire to search for concepts within one or more ontologies that "cause rhabdomyolysis." Instead of searching for "rhabdomyolysis" alone, the relationship "causes" may be included in the search and the search results may be altered accordingly. In another embodiment, the system may enable a search using properties. In this embodiment, a user may search for all concepts or assertions with certain properties such as, for example, a certain data source, a certain molecular weight, or other property.

In one embodiment, the graphical user interface may include a hierarchical pane. A hierarchical pane may display a hierarchy/taxonomy of concepts and concept types as defined by the upper ontology. Within this hierarchy, concept types and specific instances of these concept types that are contained within the ontology may be displayed. Also displayed may be certain relationships between these instances and their parent concept types. In one embodiment, the relationships that may exist here may include "is-a" (for instances), "part-of" (for partonomies), or other relationships. The relationships indicated in a hierarchical pane may be represented by a symbol placed in front of each element in the hierarchy (e.g., "T" for type, "I" for instance, and "P" for part-of).

Certain concepts that are instances or parts of concept types may have additional concepts organized underneath them. In one embodiment, a user may select a concept from the hierarchical pane, and view all of the descendents of that concept. The descendents may be displayed with their accompanying assertions as a list, or in a merged graph (described in detail below).

Figure 13:
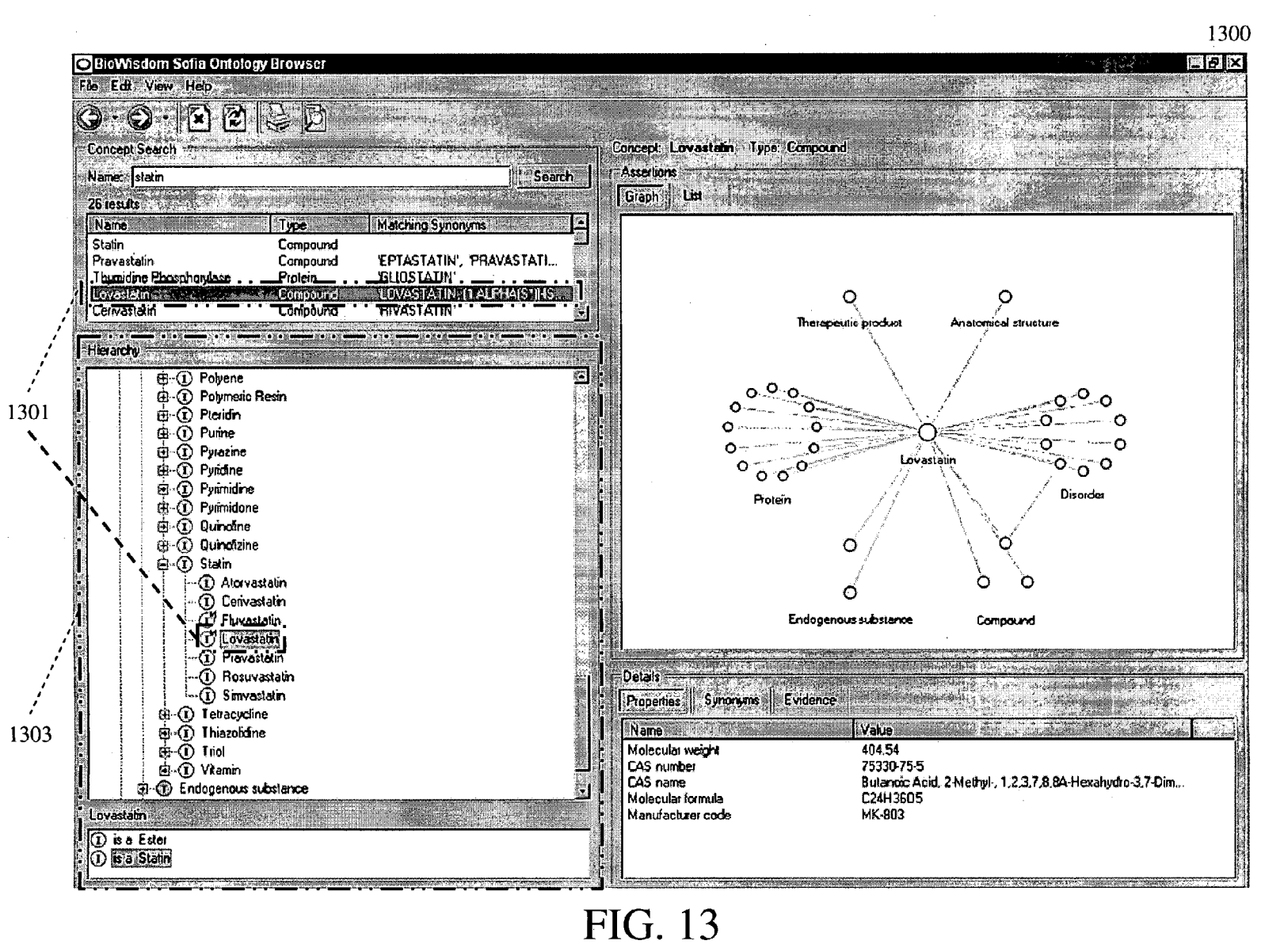

FIG. 13 illustrates an exemplary interface 1300, wherein a search result 1301 is selected, and a hierarchy of an ontology may be displayed in a hierarchical pane 1303. Upon selection of a concept (from the search pane or otherwise), a hierarchical pane may initially focus on a portion of the ontology surrounding a selected search result. For example, as illustrated in FIG. 13, if search result 1301, "Lovastatin," is selected from a batch of results for the concept "statin," the hierarchy displayed in hierarchical pane 1303 may jump to the portion of the hierarchy where Lovastatin exists. Furthermore, a user may navigate through an ontology as a whole by selecting different elements within the hierarchy displayed in a hierarchical pane 1303.

In one embodiment, the graphical user interface according to the invention may include a relationship pane. The relationship pane may display the relationships that are present in the hierarchical pane for a selected concept. For instance, the relationship pane may display the relationship between a selected concept and its parent concepts.

Figure 14:
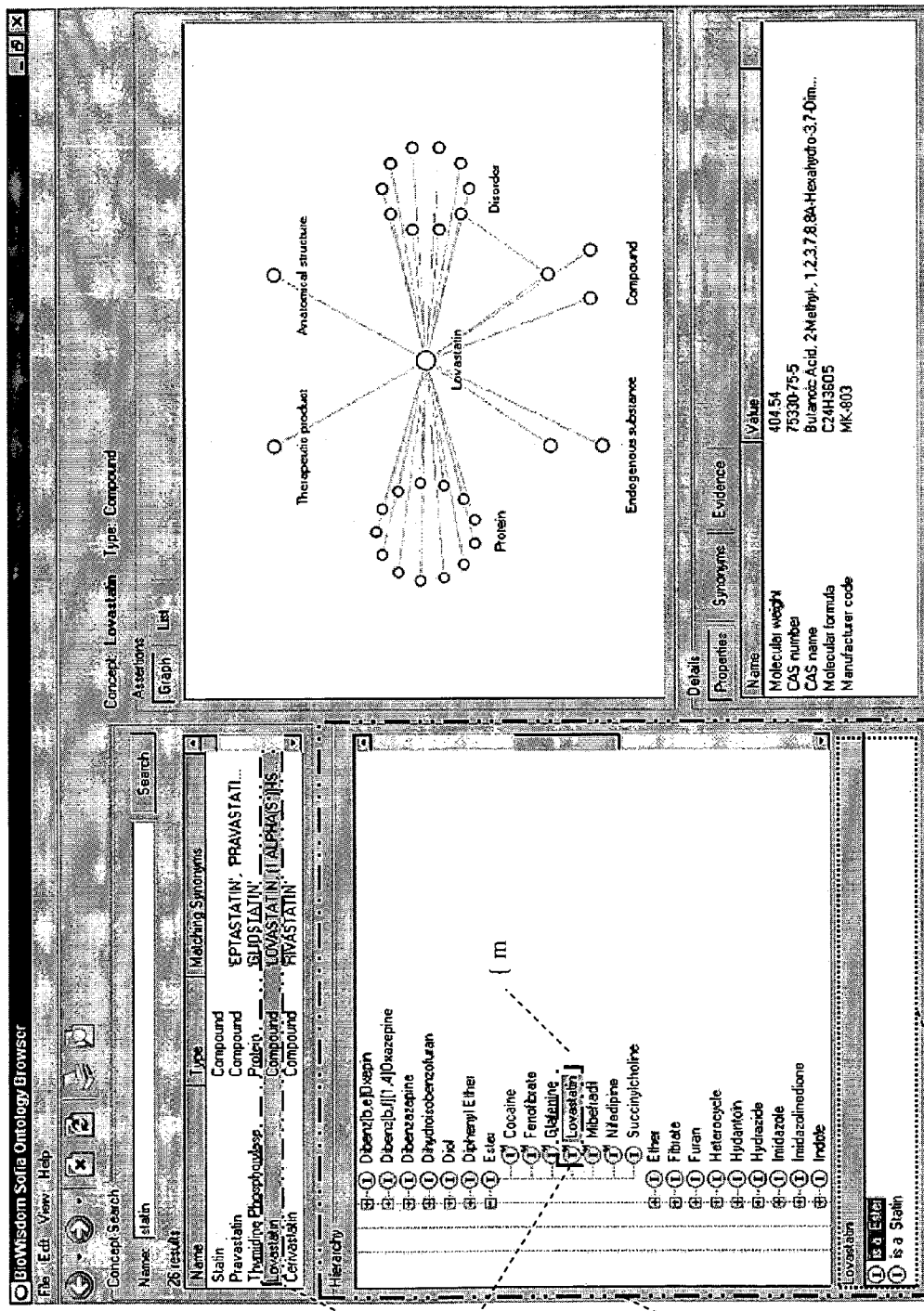
FIG. 14 illustrates an exemplary interface, according to an embodiment of the invention.

FIG. 14 illustrates an exemplary interface 1400. As illustrated in interface 1400, a relationship pane 1403 may be provided in addition to a hierarchical pane 1405. Because of the interconnectedness of an ontology, a given concept may have multiple hierarchical parents. As depicted in interface 1400, search term 1401, "Lovastatin," happens to have two taxonomic parents in the underlying ontology. The two taxonomic parents of the concept Lovastatin in the ontology underlying interface 1400 are "statin" and "ester." A concept with multiple parents may be marked in hierarchical pane 1405 with an "M" or other indicator. Relationship pane 1403 may display relationships up one or more levels in the hierarchy (e.g., parents), down one or more levels in the hierarchy (e.g., children), or sideways in the hierarchy (e.g., synonyms).

In one embodiment, the graphical user interface according to the invention may include a multi-relational display pane. The multi-relational display pane may display multi-relational information regarding a selected concept. For example, the multi-relational display pane may display descriptive relationships or all known relationships of the selected concept from within one or more ontologies. The multi-relational display pane may enable display of these relationships in one or more forms. In some embodiments, the set of known relationships for a selected concept that are displayed in a multi-relational display pane may by filtered according to user preferences, user access rights, or other criteria.

In one embodiment, the multi-relational display pane may display concepts and relationships in graphical form. One form of graphical display may include a clustered cone graph. A clustered cone graph may display a selected concept as a central node, surrounded by sets of connected nodes, the sets of connected nodes being concepts connected by relationships. In one embodiment, the sets of connected nodes may be clustered or grouped by common characteristics. These common characteristics may include one or more of concept type, data source, relationship to the central node, relationship to other nodes, associated property, or other common characteristic.

Figure 15A:
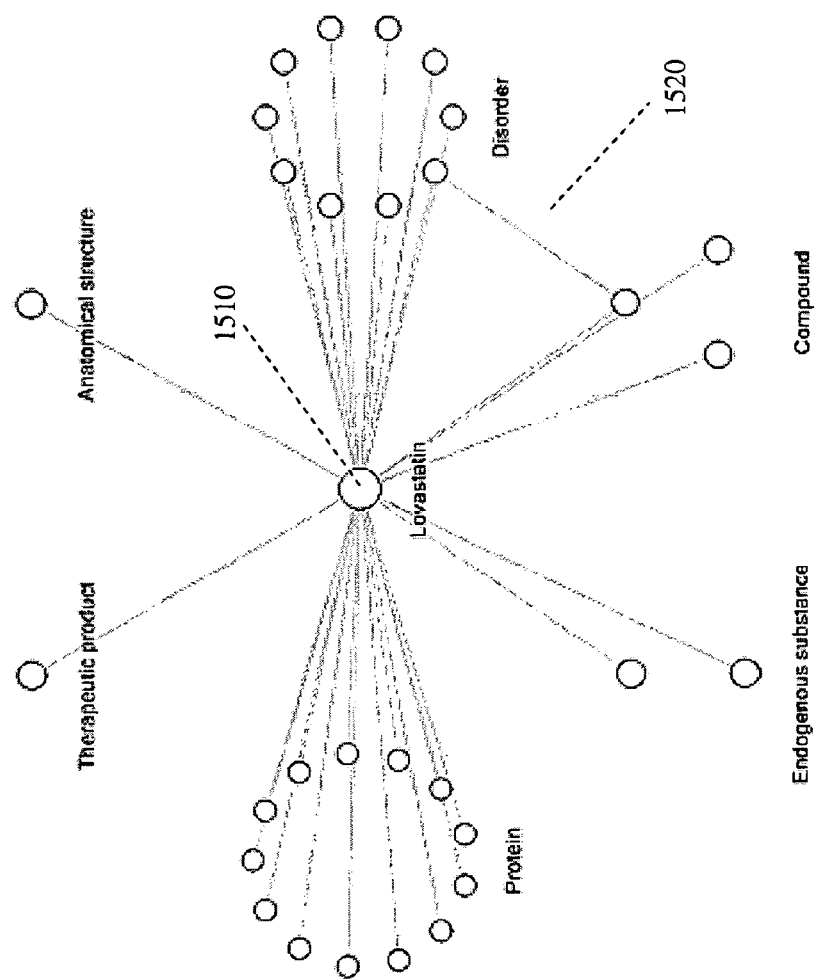
FIG. 15A is an exemplary illustration of a clustered cone graph according to an embodiment of the invention.

FIG. 15A illustrates an exemplary clustered cone graph 1500a, according to an embodiment of the invention. Edges and nodes may be arranged around a central node 1510 forming a clustered cone view of all nodes directly connected around central node 1510. Unlike other graphical representations of data, clustered cone graphs such as graph 1500a may enable the representation of a large amount of data while effectively conveying details about the data and enabling practical use of the data. In clustered cone graph 1500a, all of the nodes directly connected to the central node 1510 may be said to be in the same shell, and may be allocated a shell value of one relative to central node 1510. Each of the nodes with a shell value of one may be connected to other nodes, some of which may be in the same shell, thus having a shell value of one. Those nodes that do not have a shell of one may be said to have a shell value of two (if they are connected directly to nodes that have a shell value of one). As the shell number increases, the number of potential paths by which two nodes may be linked also increases.

Clustered cone graph 1500a illustrates that all of the nodes that have a shell value of one relative to the central node 1510, "Lovastatin," and share the concept type "protein," are clustered in one "protein" group. In one embodiment, groups in which clustered nodes are placed may be manipulated by a user. For example, instead of grouping concepts linked to a central node by concept type, they may be grouped by relationship type or property. Other grouping constraints are contemplated and may be utilized.

In one embodiment, connected nodes in a clustered cone graph may also have relationships with one another, which may be represented by edges connecting the connected nodes (e.g., edge 1520 of clustered cone graph 1500a). Additionally, edges and nodes within a clustered cone graph may be varied in appearance to convey specific characteristics of relationships or concepts (thicker edges for high assertion confidence weights, etc). Alternatively, a confidence score or other information relating to a concept, relationship, or assertion may be presented alphanumerically alongside a graph. The textual information underlying a node or edge in a clustered cone graph may be displayed to a user upon user-selection of a node or edge. Selection of a node or edge may be accomplished, for example, by a user passing a pointer (or other graphical indicator) over a node or edge. Furthermore, a connected node may be selected by a user and placed as the central node in the graph. Accordingly, all concepts directly related to the new central node may be arranged in clustered sets around the new central node.

In one embodiment, more than one concept may be selected and placed as a merged central node (merged graph). Accordingly, all of the concepts directly related to at least one of the two or more concepts in the merged central node may be arranged in clustered sets around the merged central node. If concepts in the clustered sets have relationships to all of the merged central concepts, this quality may be indicated by varying the appearance of these connected nodes or their connecting edges (e.g., displaying them in a different color, etc.). In one embodiment, two or more nodes (concepts) sharing the same relationship (e.g., "causes") may be selected and merged into a single central node. Thus, the nodes connected to the merged central node may show the context surrounding concepts that share the selected relationship.

In one embodiment, more than one concept may be aggregated into a single connected node. That is, a node connected to a central node may represent more than one concept. For example, a central node in a clustered cone graph may be a concept "compound X." Compound X may cause "disease Y" in many different species of animals. As such, the central node of the clustered cone graph may have numerous connected nodes, each representing disease Y as it occurs in each species. If a user is not in need of immediately investigating possible differences that disease Y may have in each separate species, each of these connected nodes may be aggregated into a single connected node. The single merged connected node may then simply represent the fact that "compound X" causes "disease Y" in a number of species. This may simplify display of the graph, while conveying all relevant information.

Figure 15B:
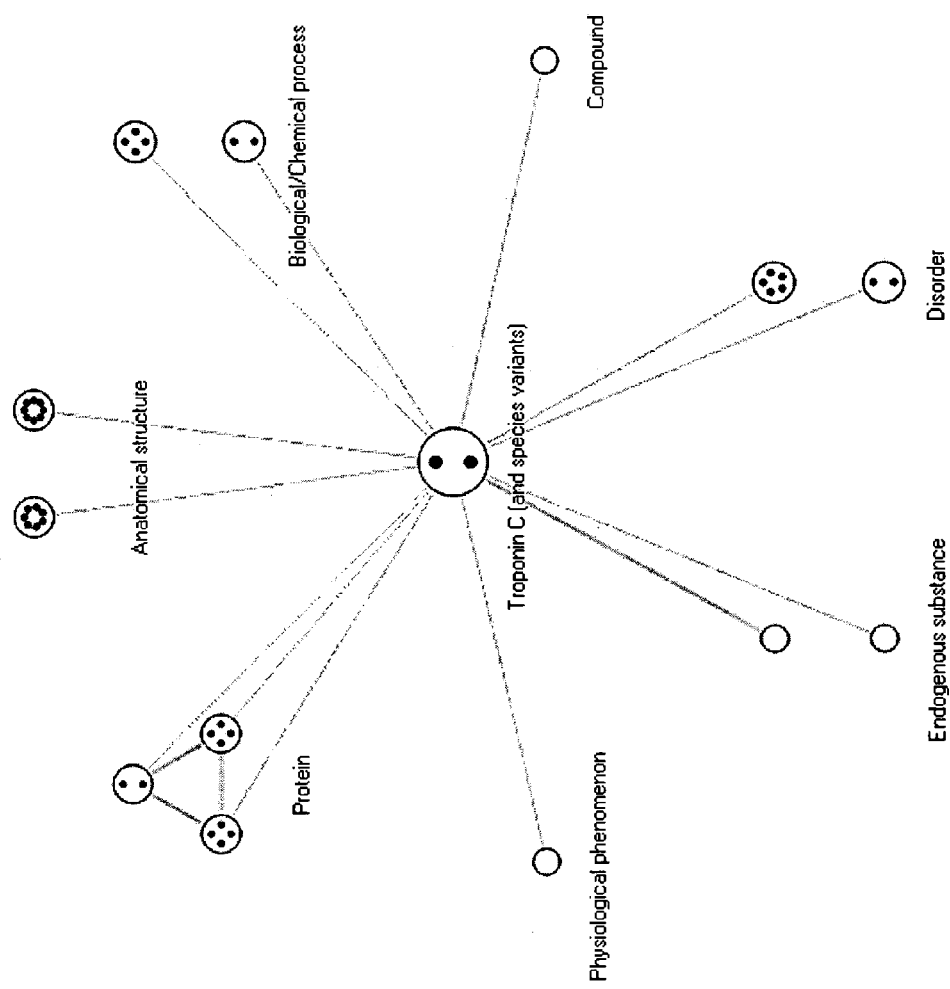
FIG. 15 B is an exemplary illustration of a merged graph according to an embodiment of the invention.

FIG. 15 B illustrates an exemplary merged graph 1500b, which contains a merged central node and several merged connected nodes. As illustrated by merged graph 1500b, the number of concepts present in a merged node may each be displayed as individual dots in the merged node.

Figure 16:
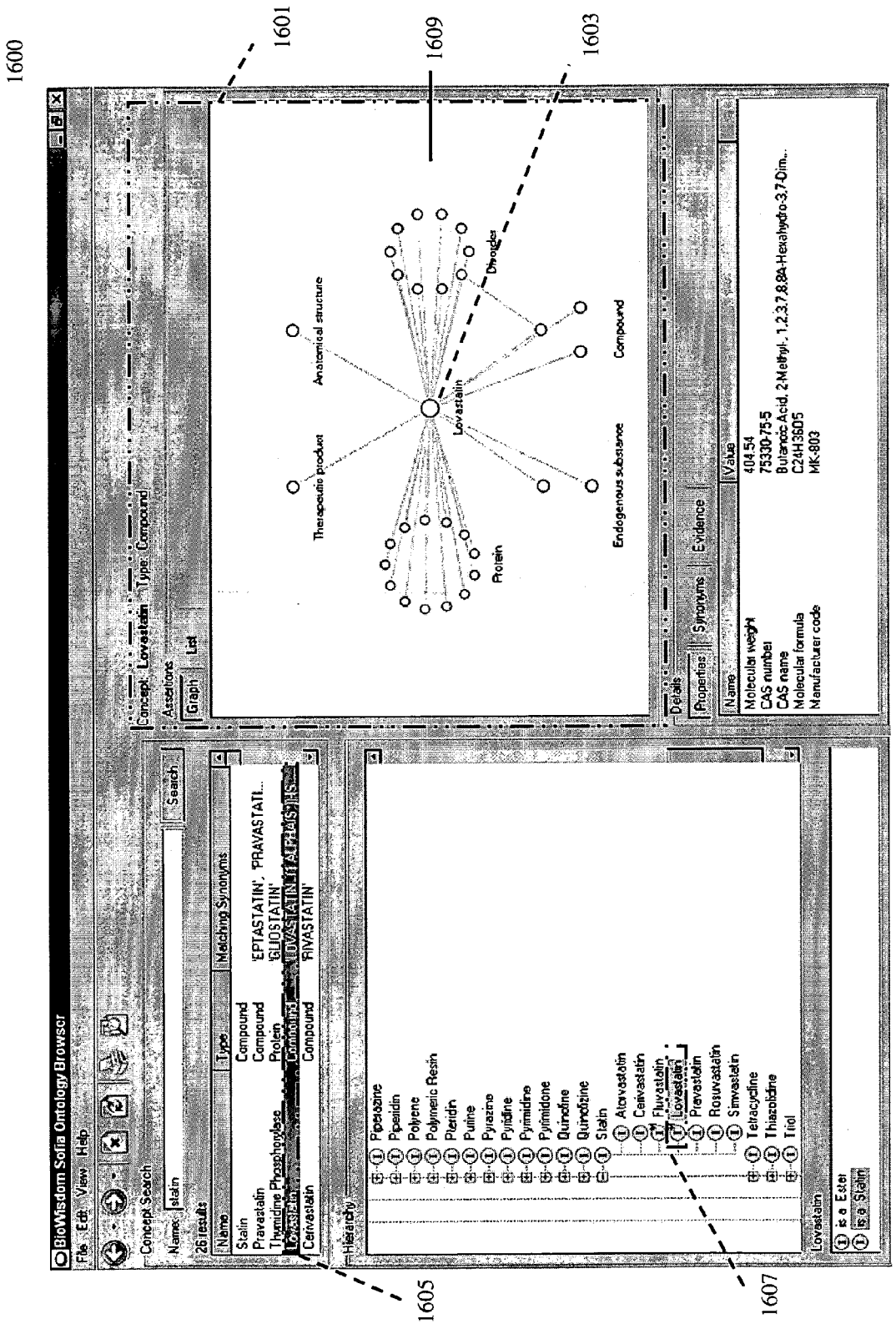
FIG. 16 illustrates an exemplary interface, according to an embodiment of the invention.

FIG. 16 illustrates an exemplary interface 1600 including a multi-relational pane 1601. Multi-relational pane 1601 may display the concepts and relationships of an ontology in a graph representation. A graph representation in multi-relational pane may access the same underlying ontology data as the hierarchical pane, but may show a more complete set of relationships existing therein. This is an example of the use of a "semantic lens." A semantic lens generally refers to presenting a filtered version of the total data set according to certain constraints. In the case of a graph representation versus a hierarchy described above, the underlying ontology content may be identical for both the hierarchical pane and the graph representation, but the hierarchical pane may select only the "is-a," "contains," and "is-a-part-of" assertions (or other assertions) for display. The graph representation may filter some or all of these out and display other, more descriptive, relationships, e.g., "binds," "causes," "treats."

According to an embodiment illustrated in FIG. 16, a graph representation in a multi-relational pane may include a clustered cone graph 1609. As mentioned above, a clustered cone graph may comprise nodes (concepts) and relationships (edges) arranged around a central node 1603. A node may be placed centrally in a graph representation by selecting a search result 1605, choosing a concept 1607 from a hierarchical pane, by selecting a node from a previous graph in a multi-relational pane, or otherwise selecting a concept within an ontology.

In one embodiment, each of the sets of clustered nodes of a clustered cone graph may be faceted. Faceting may include grouping concepts within a clustered set by common characteristics. These common characteristics may include one or more of data source, concept type, common relationship, properties, or other characteristic. Faceting may also include displaying empirical or other information regarding concepts within a clustered group. Faceting within a set of connected nodes may take the form of a graph, a chart, a list, display of different colors, or other indicator capable of conveying faceting information. A user may sort through, and selectively apply, different types of faceting for each of the sets of connected nodes in a clustered cone graph. Furthermore, a user may switch faceting on or off for each of the sets of connected nodes within a clustered cone graph.

Figure 17:
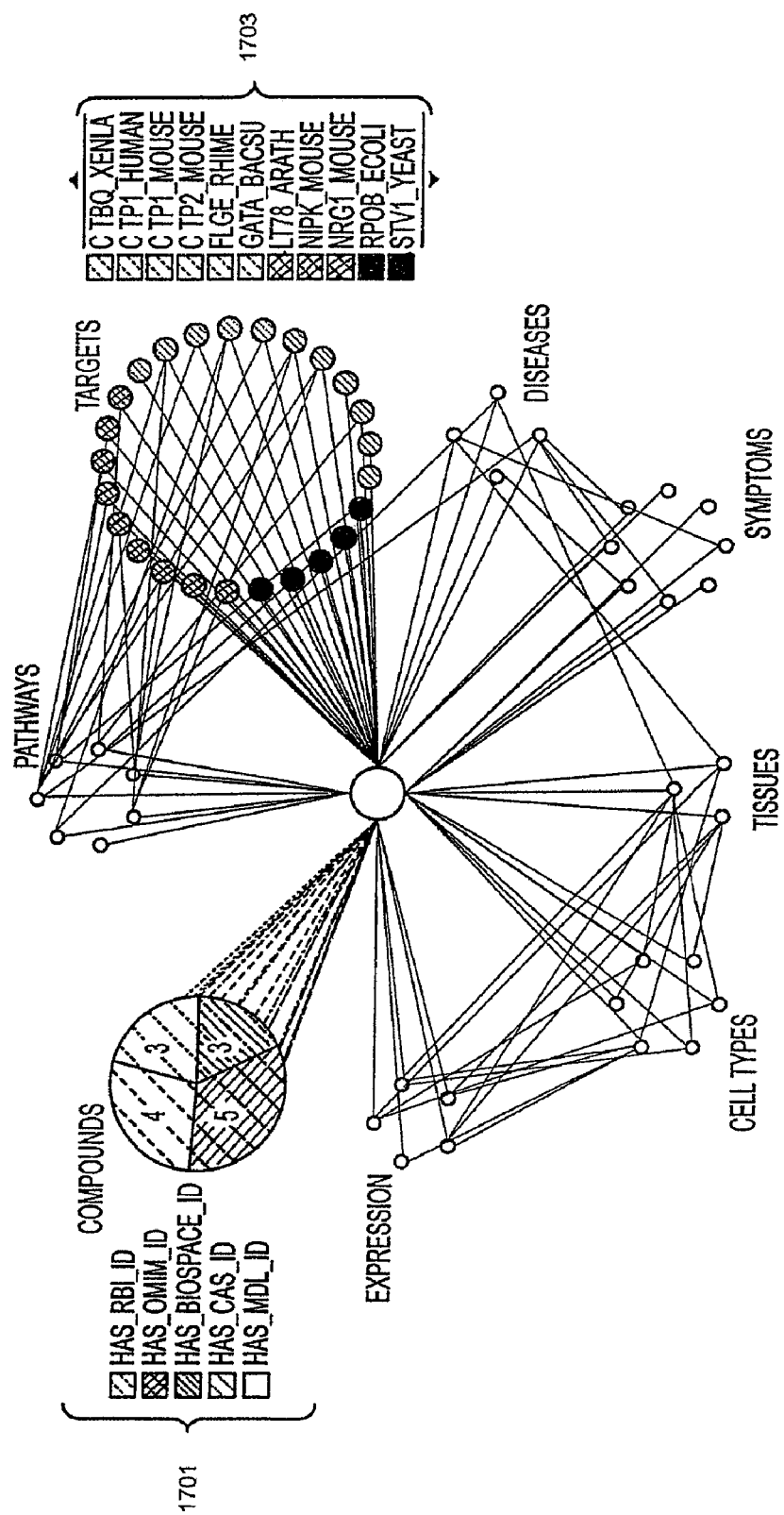
FIG. 17 is an exemplary illustration of a clustered cone graph according to an embodiment of the invention.

FIG. 17 illustrates exemplary faceted clustered groups in a clustered cone graph 1700. A cluster 1701 illustrates faceting by use of a pie graph, which in this example indicates the data sources of concepts in cluster 1701. Different colors (or other indicators) may be used to represent different data sources (or other attributes) and may be reflected in the pie graph and corresponding elements of faceting. A cluster 1703 illustrates faceting by use of a scrollable list, which in this example also indicates the source of the concepts in cluster 1703. Again, corresponding colors (or other indicators) may be used to indicate sources, or other attributes. Clustered cone graph 1700 is exemplary only. Other faceting methods may be used to indicate numerous concept attributes. Additionally, faceting may also apply to a taxonomy view (or other view) of ontology data. For example, a user may wish to reconstruct the organization of data represented in a taxonomy view such as, for example, chemical compound data. The user may reconstruct this taxonomic organization using therapeutic class, pharmacological class, molecular weight, or by other category or characteristic of the data. Other characteristics may be used to reconstruct organizations of other data.

In one embodiment, the multi-relational display pane of the graphical user interface may display information regarding a selected concept in list form (as opposed to the graphical form described above). Information regarding a selected concept may include all relationships for the selected concept, the label of each related concept, the concept type of each related concept, evidence information for each assertion of the related concepts, or other information. Evidence information for an assertion may include the number of pieces of evidence underlying the assertion or other information. Additionally, a user may select one or more assertions associated with the selected concept and aggregate all concepts related to the selected assertions as selected (or central) concepts in the multi-relational display pane. The aggregated concepts may be displayed in the multi-relational display pane in list form (wherein all assertions associated with at least one of the aggregated concepts may be displayed) or in a graph form (e.g., merged graph).

Figure 18:
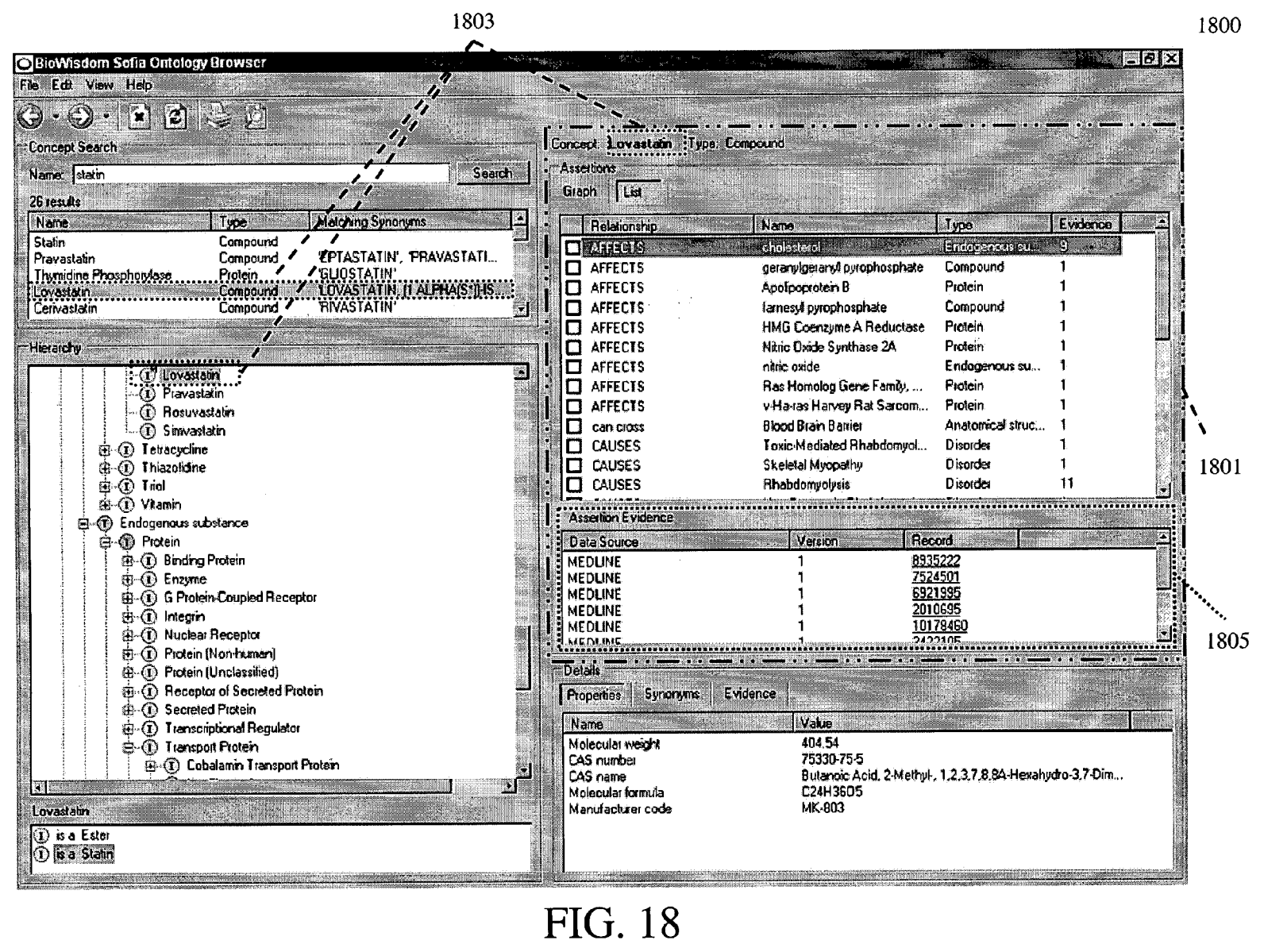

FIG. 18 illustrates an exemplary interface 1800, wherein a multi-relational pane 1801 may display ontology data in a text-based list form. For a selected concept 1803, a list form display may include a list of assertions containing select concept 1803 and certain characteristics thereof. These characteristics may include the exact relationship existing between selected concept 1803 and the related concept, the related concept label, the related concept type, the quantity of evidence supporting the assertion, or other information. Selected concept 1803 may be "selected" from a search pane, a hierarchical pane, a graph-form (e.g., a clustered cone graph), or from elsewhere in a graphical user interface.

According to an embodiment of the invention, a relationship displayed in list form may include an indication of whether that relationship is a normalized relationship (e.g., it represents many linguistically variant but conceptually similar relationships), or a non-normalized relationship (e.g., the wording represents the precise linguistic relationship displayed). For example, normalized relationships may be presented in upper case letters while non-normalized relationships may be presented in lower case letters. Other differentiating or distinguishing characteristics (e.g., text colors, fonts, etc.) may be utilized. Furthermore, a graphical user interface may enable a user to view a list of constituent relationships represented by a normalized relationship.

In some embodiments, the multi-relational display pane and the hierarchical display pane may be linked, such that one or more concepts selected from one, may become selected concepts in the other.

In interface 1800, multi-relational pane 1801 may include an evidence pane 1805. Evidence pane 1805 may indicate the names of, sources of, version information, pointers to, or other information related to evidence that underlies an assertion selected from a list form. In one embodiment, the evidence pane may include a document viewer that enables display of actual evidence-laden documents to a user. By selecting a pointer to a piece of underlying evidence, a copy of the actual document containing such evidence may be presented to the user via the document viewer. In some embodiments, a user's access control rights may dictate the user's ability to view or link to evidence underlying a concept. For instance, a user with minimal rights may be presented with a description of the data source for a piece of evidence, but may not be able to view or access the document containing that evidence. Certain documents and/or data sources may not be accessible to certain users because they may, for example, be proprietary documents/data sources.

Figure 19:
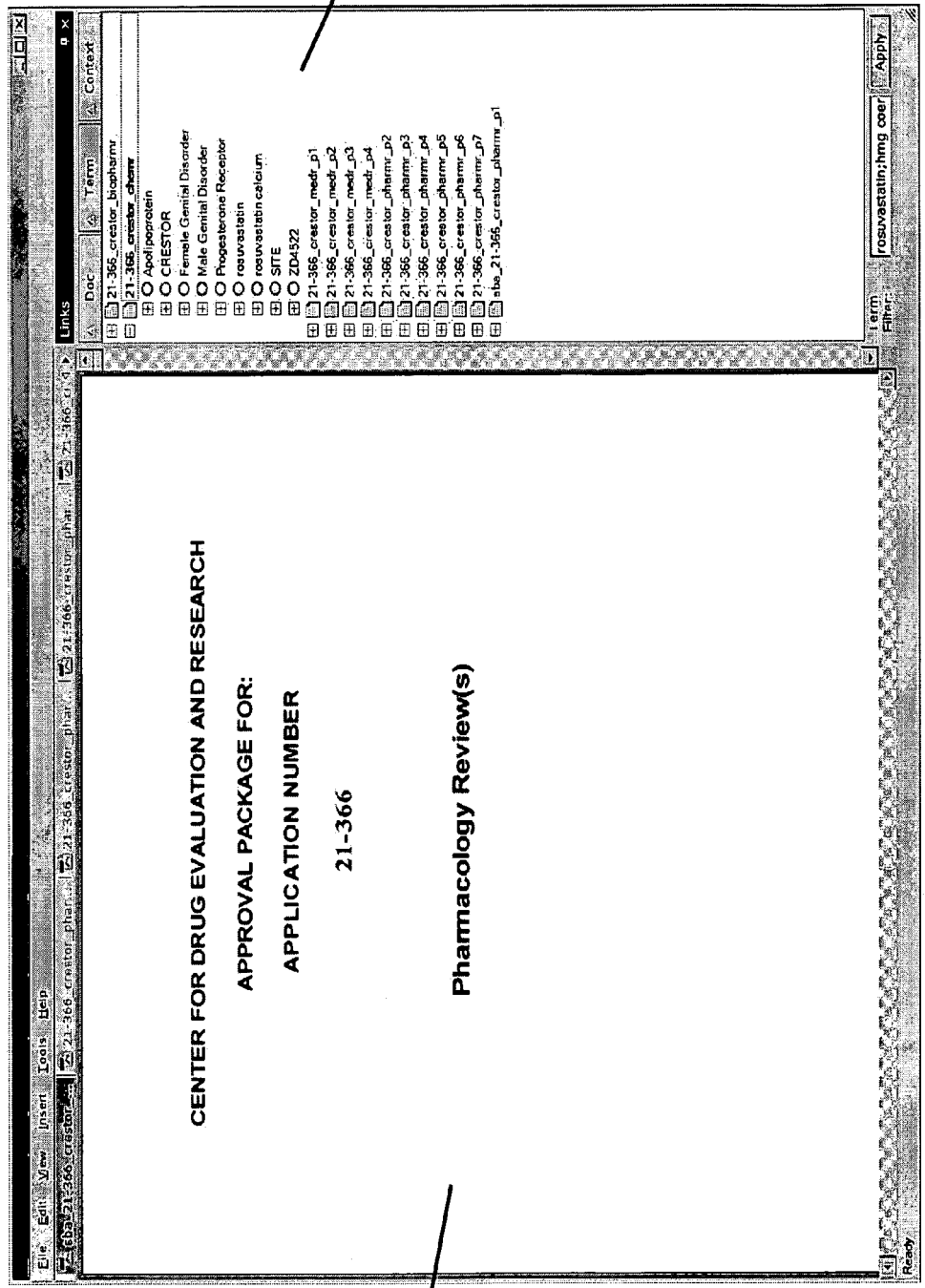
FIG. 19 illustrates an exemplary interface, according to an embodiment of the invention.

FIG. 19 illustrates an exemplary interface 1900 (e.g., Corpora's Jump!™ as applied to an ontology according to the invention) that may display a document containing a piece of evidence that underlies an assertion in a document display pane 1901. Additionally, interface 1900 may include a "links pane" 1903 which may list and include pointers to other documents, concepts within the displayed document, context associated with concepts of the displayed document, or other information. Information within links pane 1903 may be filtered by a user according to the type, quality, and properties of data sources, concepts, relationships, or assertions.

FIG. 20 is an exemplary illustration of an interface 2000 (e.g., Corpora's Jump!™ as applied to an ontology according to the invention), wherein a user may be directed to a specific segment of an underlying document containing evidence supporting a particular assertion. An underlying document may contain data tags indicating precisely where certain assertion evidence is found in the data source. These data tags may be placed during the text-mining/natural language processing/linguistic analysis phase of ontology construction or, alternatively, after initial extraction of concepts and relationships from the document. In interface 2000, a document display pane 2001 may include a highlighted document segment 2003 that contains assertion-supporting evidence. The ability to display the exact segment of an underlying data source containing assertion evidence may enable users to gain useful information from lengthy documents without having to read or scan the entire document. This may enable a user to quickly identify and view the context of the underlying evidence and make certain deductions or decisions based thereupon. Additionally, if multiple documents exist containing evidence underlying a given assertion, a second graphical user interface may enable cross-pointers, cross-referencing, and cross-linking among the various underlying data sources. Furthermore, the ability to view underlying assertion evidence in context may be bidirectional in that it may enable a user who is viewing a document with data tagged assertion evidence to link to a graphical user interface supporting an ontology in which the assertion resides.

Figure 21:
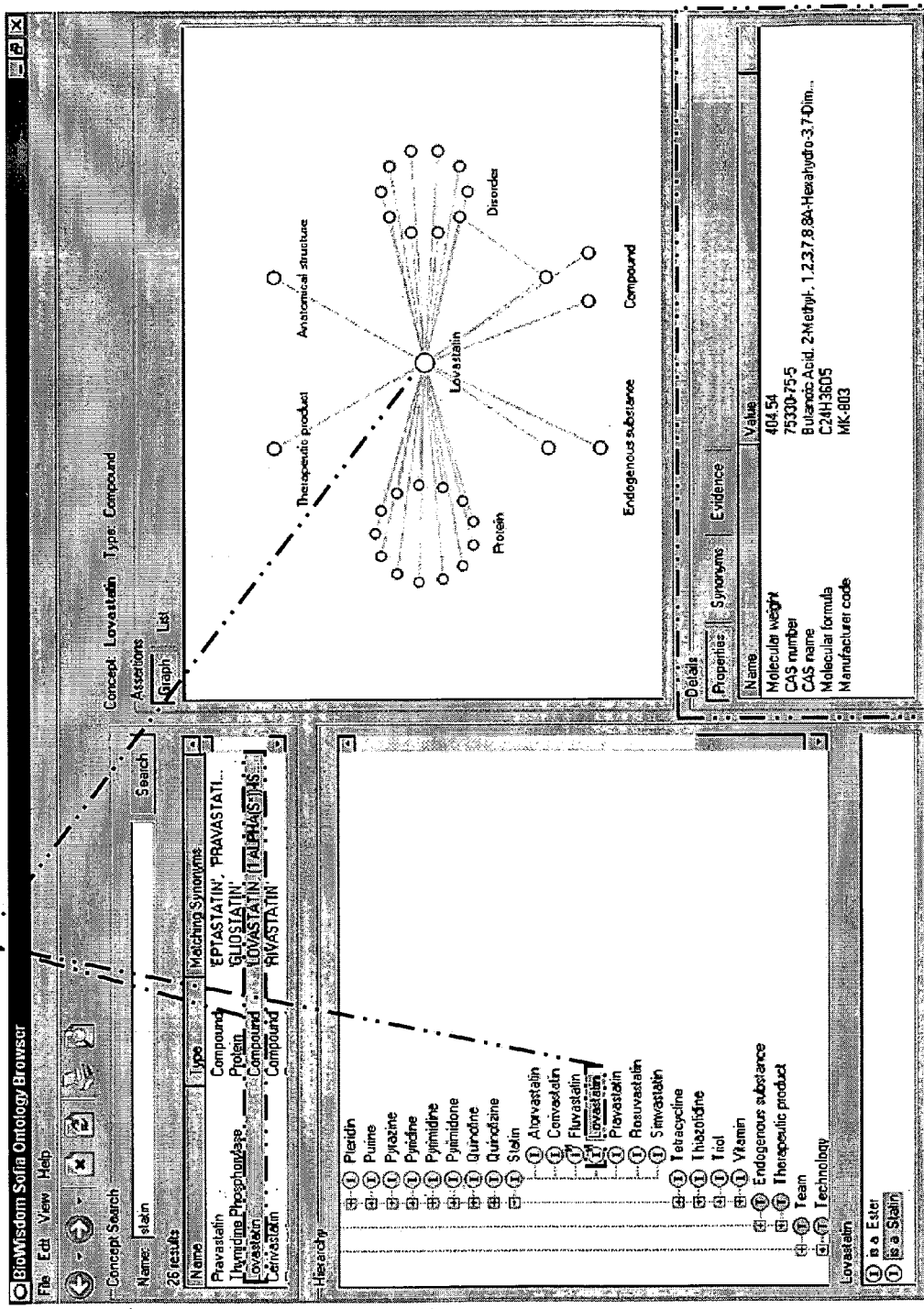
FIG. 21 illustrates an exemplary interface, according to an embodiment of the invention.

According to an embodiment of the invention illustrated in FIG. 21, exemplary interface 2100 may include a details pane 2101. Details pane 2101 may display the properties of a selected concept 2103. Details pane 2101 may show one or more of properties, synonyms, concept evidence (as opposed to assertion evidence), or other information underlying a selected concept. For example, the properties of selected concept 2103 "Lovastatin" may include its molecular weight, its Chemical Abstracts Service (CAS) number, its CAS name, its molecular formula, its manufacturer code, or any other information regarding "Lovastatin." Details pane 2101 may also display the synonyms or alternative names of a selected concept. Furthermore, details pane 2101 may include pointers to, and information concerning, the evidence underlying the existence of selected concept 2103.

In one embodiment, an administrative curator or other person with proper access rights may utilize the graphical user interface described above to view and or modify information contained within the upper ontology such as, for example, the set of concept types, relationship types, allowable relationships for each concept pair, relationship hierarchies, and/or other information.

In one embodiment, a user may find and select "paths" ("path-finding") between concepts within the ontology. Path-finding may include selecting two or more starting concepts and selecting some or all of the knowledge contained in the assertions that directly and indirectly connect them. Because multi-relational ontologies provide comprehensive knowledge networks from which a myriad of direct and indirect relationships may be gleaned, the complex but information-rich interactions between seemingly distant concepts may be tracked and extracted.

In one embodiment, a path-finding module may enable path-finding within one or more ontologies. In one embodiment, path-finding may comprise the tracking or extraction of information from paths between concepts of an ontology. A path may comprise the sequence of assertions that directly or indirectly connect two concepts in an ontology knowledge network. Assertions may comprise concept-relationship-concept (CRC) triplets. These CRC triplets may be represented graphically as two nodes (representing concepts) connected by an edge (representing the relationship connecting the concepts). Because concepts in a multi-relational ontology may be part of numerous assertions, an interconnected web of CRC triplets may include numerous paths between two or more concepts in an ontology.

In one embodiment, path-finding may utilize the graphical user interface described in greater detail herein (or other interfaces) to enable user selection of at least two concepts present within an ontology (or to enable other aspects of path-finding). The graphical user interface may then enable the display of some or all of the paths (nodes and edges) that exist between the at least two selected concepts. As an exemplary illustration, path-finding may inquire as to how rhabdomyolysis and myoglobin are related.

Figure 22:
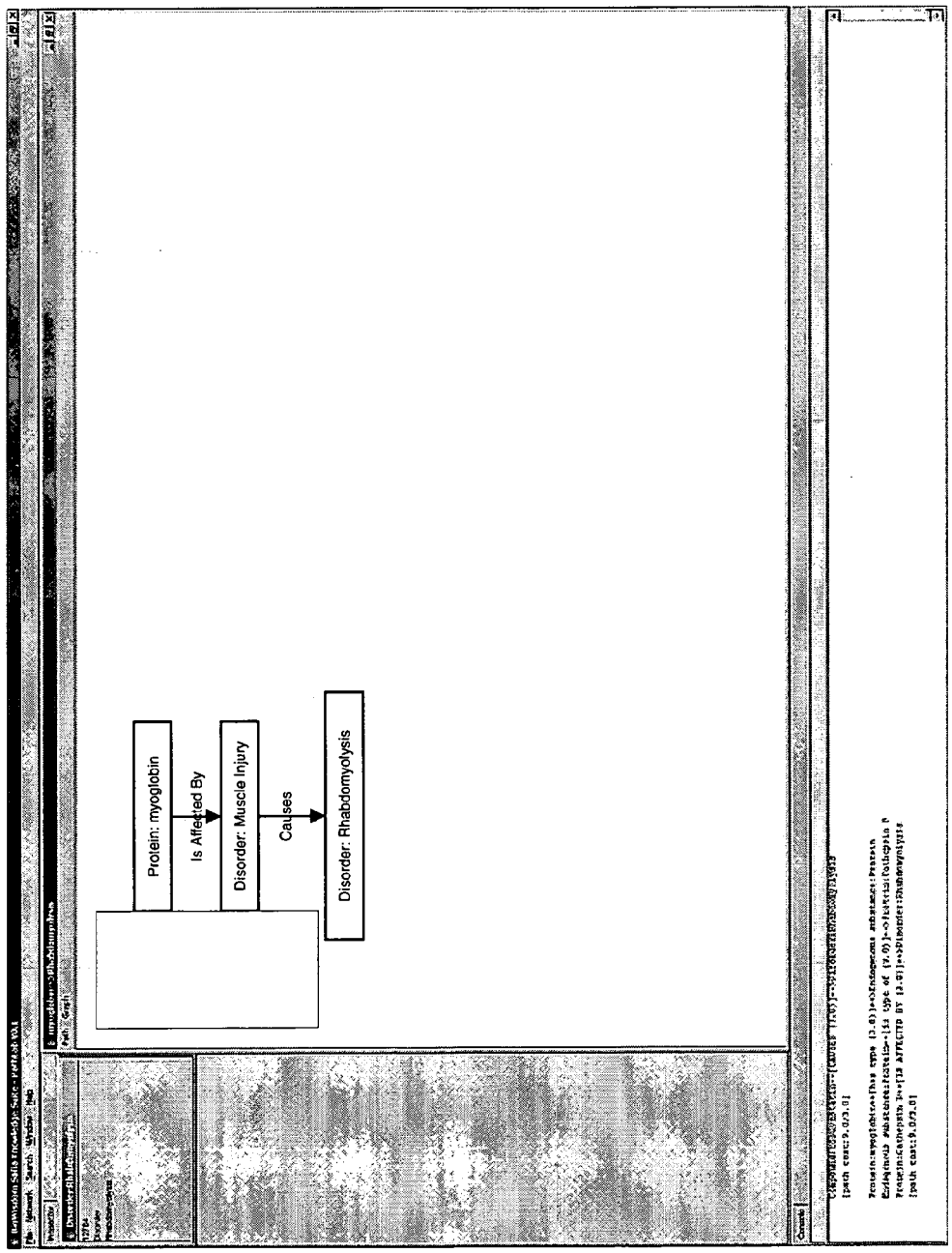
FIG. 22 illustrates an exemplary interface, according to an embodiment of the invention.
Figure 23:
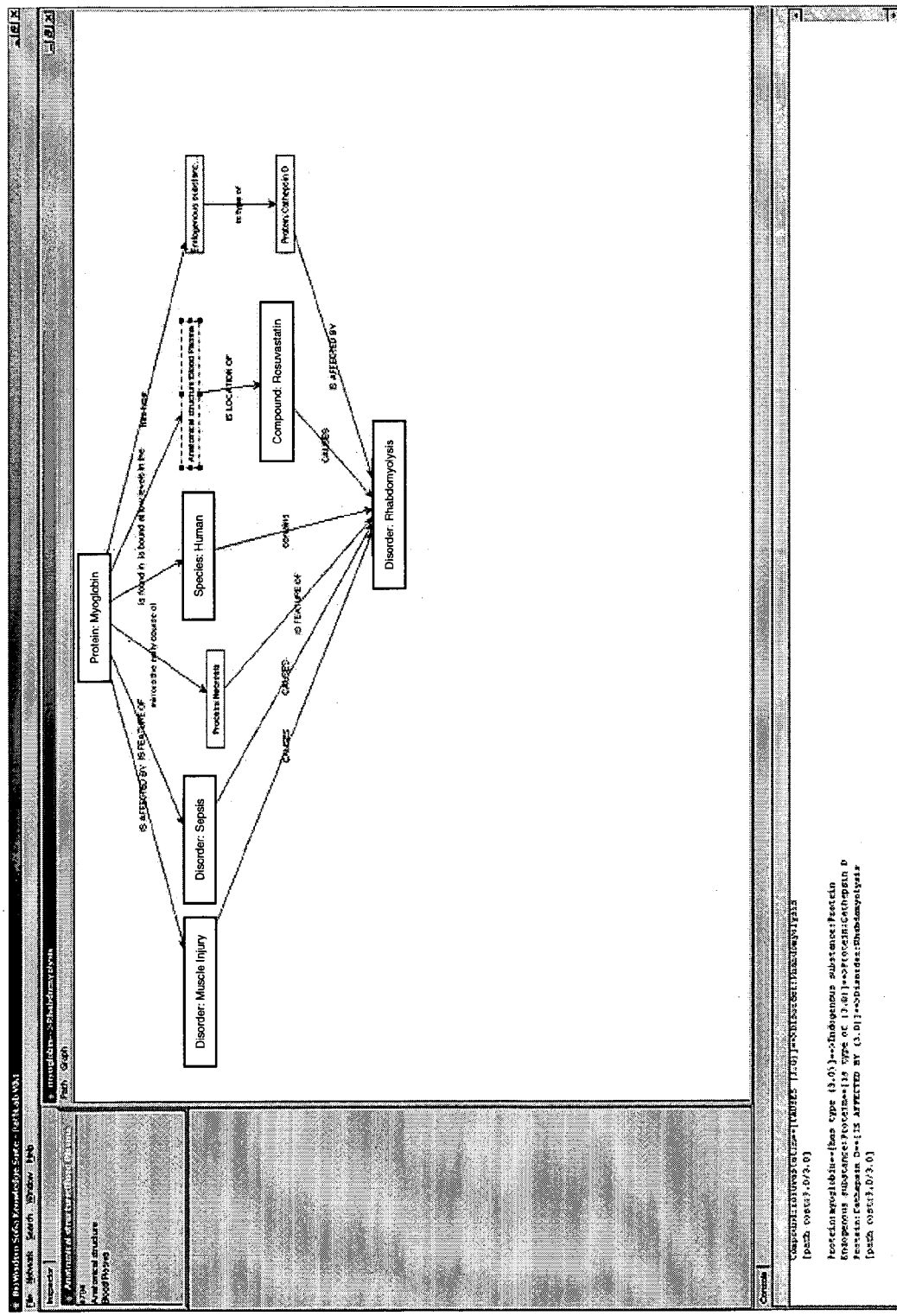
FIG. 23 illustrates an exemplary interface, according to an embodiment of the invention.

Because there are potentially millions or more paths between concepts in an ontology, paths containing certain qualities may be specified for selection and/or display. For example, the shortest path, shortest n-paths (where n equals a predetermined number of paths to be displayed), all paths up to a path length of x (where x equals the number of assertions in the path), all paths of a given path length x, or the best path (or best n-paths) may be selected as a way of reducing the number of paths returned and/or displayed. In some instances, the shortest path may not be the best path. For example, a short path containing assertions with low confidence weights may be considered inferior in some respects to a path with more assertions but higher confidence weights. FIG. 22 illustrates an exemplary graphical user interface 2200, wherein the shortest path between the concepts "myoglobin" and "rhabdomyolysis" is displayed. FIG. 23 illustrates an exemplary graphical user interface 2300, wherein numerous paths between the concepts "myoglobin" and "rhabdomyolysis" are displayed.

The selection of paths (from the totality of paths existing between two or more concepts) may be accomplished by the system imposing certain constraints on the finding of paths. These constraints may be imposed through the use of certain algorithms. For example, to determine the best path, an algorithm may be used which sums confidence weights along the edges of a graph of the ontology (or total paths between selected concepts), iteratively pruning paths where the predetermined minimum score has not been met. Another example may utilize a Dijkstra single source shortest path (SSSP) algorithm which may be used to find the shortest path from a given starting point to any other node in a graph, given a positive edge cost for any "hop" (i.e., leap from one node to another).

In some embodiments, an algorithm may be utilized in path-finding to enable "adaptive weighting. Adaptive weighting may include the varying of confidence weights on the edges depending on how they were determined. Rather than having fixed weights for edges within a graph, which may then be summed to create a score for paths within the graph (enabling shortest/best path, criteria driven path selection, or other path selection), adaptive weighting accumulates and uses knowledge regarding nodes and edges within a particular path to change or adapt the sum of the edge weights. This may enable particular paths to be weighted (e.g., "up-weighted" or "down-weighted") without affecting the individual edge weights. For example, a path between "myoglobin" and "renal tubule damage" may be "up-weighted" over another path if it includes a particular species node that the other path does not contain (when that particular species has been indicated as desirable).

In another embodiment, one or more algorithms may be used to find the "k-shortest" paths within a graph of a multi-relational ontology. For example, Iterative application of improved SSSP algorithm may be used to "prune" paths from a graph by removing the least shared node or vertex of multiple "shortest paths." Finding "k" paths may include any "smart" path-finding using knowledge of the domain to guide selection of the fittest paths. This may include finding the shortest paths between selected nodes by a constraint led procedure (e.g., iterative SSSP algorithm application). There may be many approaches to finding the k-shortest paths. Finding the k-shortest paths may be useful over finding n-paths as only a portion of the many paths between selected concepts may be relevant to a user. Finding n-paths may refer to finding n unique paths with no guidance (e.g., functions, rules, or heuristics for an algorithm to follow). Path-finding may also utilize one or more algorithms to enable selective back-tracking.

According to an embodiment of the invention, a filter may be provided so as to enable an administrator or other user to selectively display, manipulate, and navigate through data according to various constraints. Constraints may include concepts, relationships, properties, their respective types, data sources, confidence levels, or other criteria. This ability to filter ontology data may narrow or broaden the focus of a user's investigation in multifaceted ways.

Figure 24:
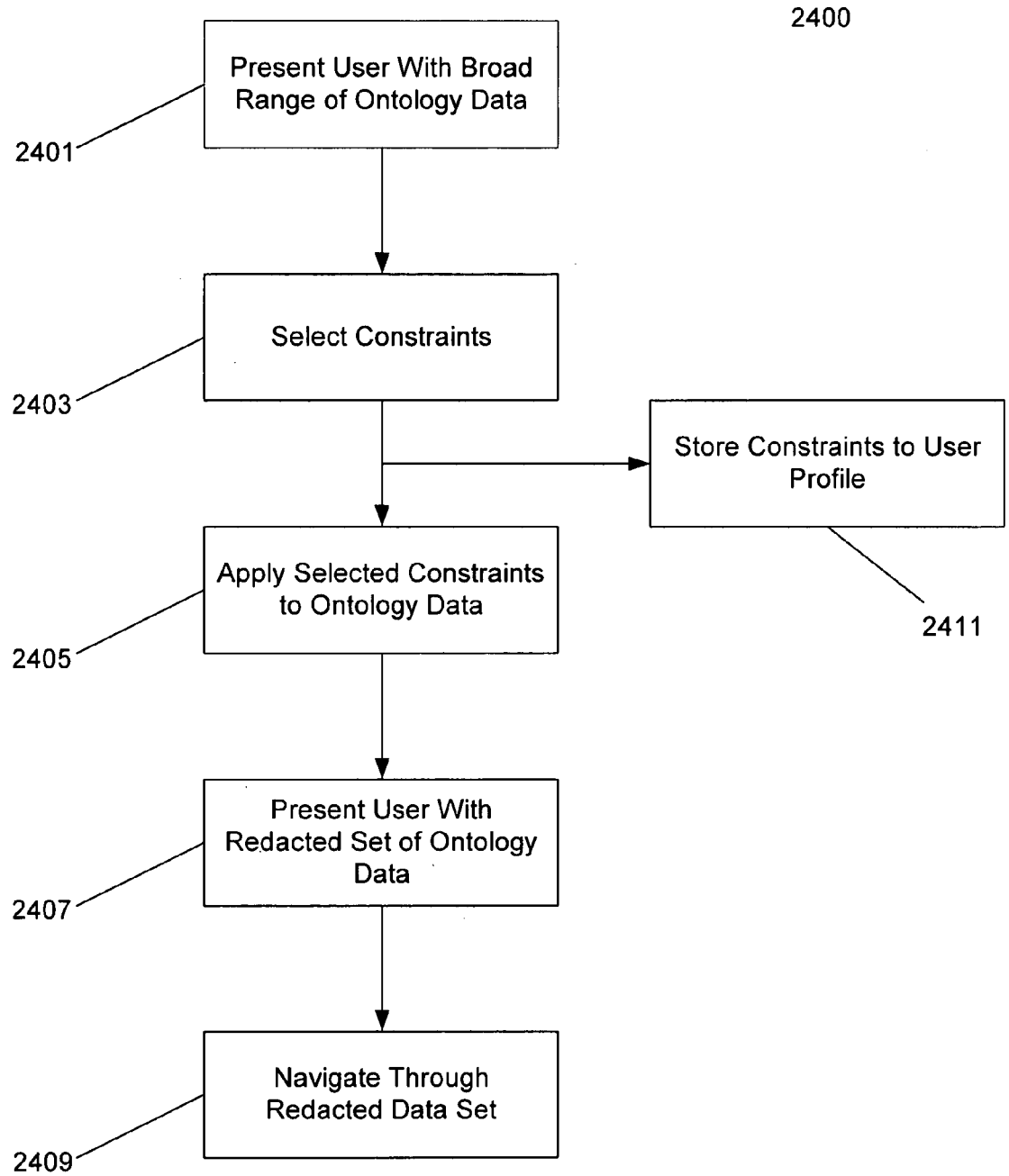
FIG. 24 illustrates a flowchart of processing for filtering ontology data, according to an embodiment of the invention.

FIG. 24 illustrates a process 2400, wherein a user may constrain or filter ontology data. In an operation 2401, a user may be presented with a broad range of ontology data. In an operation 2403, the user may then select constraints desired for a custom filter. For example, a user interested only in information filed with the Food and Drug Administration (FDA) regarding a certain chemical compound may constrain the data source (on a search for that compound) to FDA-related sources. In an operation 2405, the selected constraints may be applied to an initial set of ontology data, resulting in a redacted set of data. In an operation 2407, a user may be presented with a redacted set of ontology data that is filtered according to the constraints applied by the user. In an operation 2409, the user may then navigate through the resultant constrained set of data. At any time, if the user possesses proper access rights, the user may change the constraints on the filter and thus alter the scope of the data returned to the user. In an operation 2411, the various constraints implemented by a user may be stored, and a user profile may be created.

In one embodiment, a number of concepts may be aggregated by a user into a concept-set. A concept-set may include an aggregated list of concepts that share one or more common properties or are otherwise associated in a manner dictated by a user. These common properties or user-defined segregation of concepts and their relationships may enable a user to create custom classifications for further discovery.

The ontology tool of the invention is a technology platform that may enable an entity to perform and provide ontology services. For example, a service provider may assemble and export one or more ontologies (or portions thereof) to a client. Also, a service provider may provide custom ontologies and knowledge capture services. Furthermore, the ontology tool of the invention may allow an entity to provide alert services, independent taxonomy merging, enhanced querying, or other services.

In one embodiment, an export manager or export module may enable a service provider to export ontology data to one or more separate files, databases, alternate applications (e.g., various data-mining and display applications), or other suitable data shells for use by a client or other entity. The scope of exported ontology data may be constrained by an administrative curator or other person with appropriate access rights according to a set of export constraints. In some embodiments, however, export of ontology data may be controlled and administrated by an "end user" of ontology data.

The export constraints used to assemble data for export may include concepts, concept types, relationships, relationship types, properties, property types, data sources (e.g., data sources of particular origin), data source types, confidence levels (e.g., confidence weights), curation history (including curator information), or other criteria. In one embodiment, export constraints may also be defined by a user profile containing information regarding the user's access rights. For instance, an administrative curator may constrain the scope of exported data according to a fee paid by a user. Additionally, the administrative curator may restrict proprietary data or other confidential information from inclusion in exported data.

In some embodiments, a user profile that is used to define export constraints may include user preferences regarding themes. These themes may include a perspective that a user has regarding ontology data, which may depend on the user's job or role in an organization that is exporting the data or receiving exported data. These themes may also include the types of data sources the user considers relevant and/or high-quality, as well as the concept, relationship, and/or property types that the user desires to include in an exported data subset. In some embodiments, themes may include other criteria.

Export constraints may be imposed onto one or more master ontologies to produce a redacted ontology data subset for export. This redacted data subset may comprise assertions that have been selected by the export constraints. Additionally, evidence and properties may be included in the subset and exported along with assertion data. Exported evidence and its underlying data sources may be displayed by an export application or other data shell and may be accessed by one or more users. Exported data may be formatted according to its destination and may enable access via web services or other methods.

Figure 25:
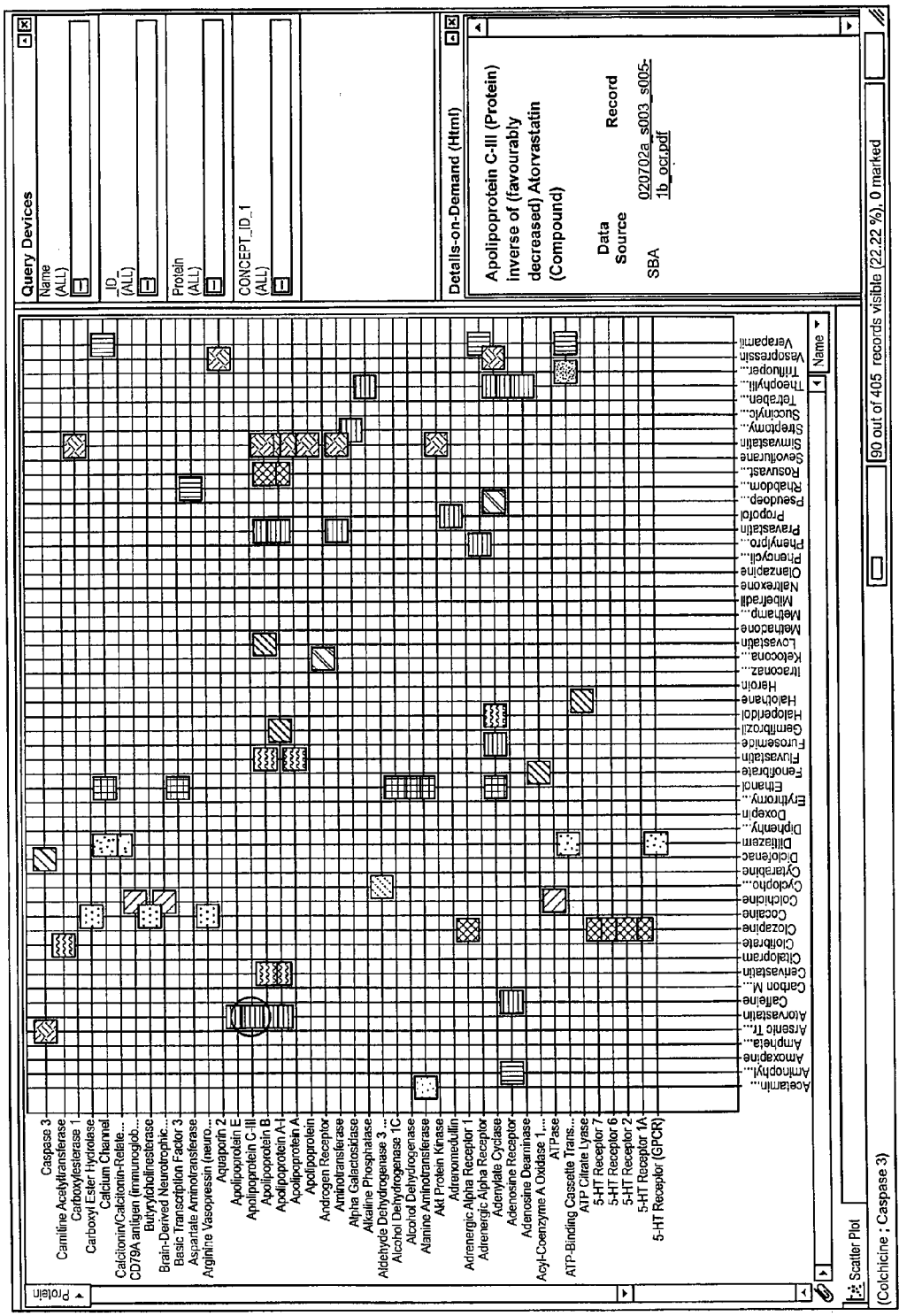
FIG. 25 illustrates an exemplary export interface, according to an embodiment of the invention.
Figure 26A:
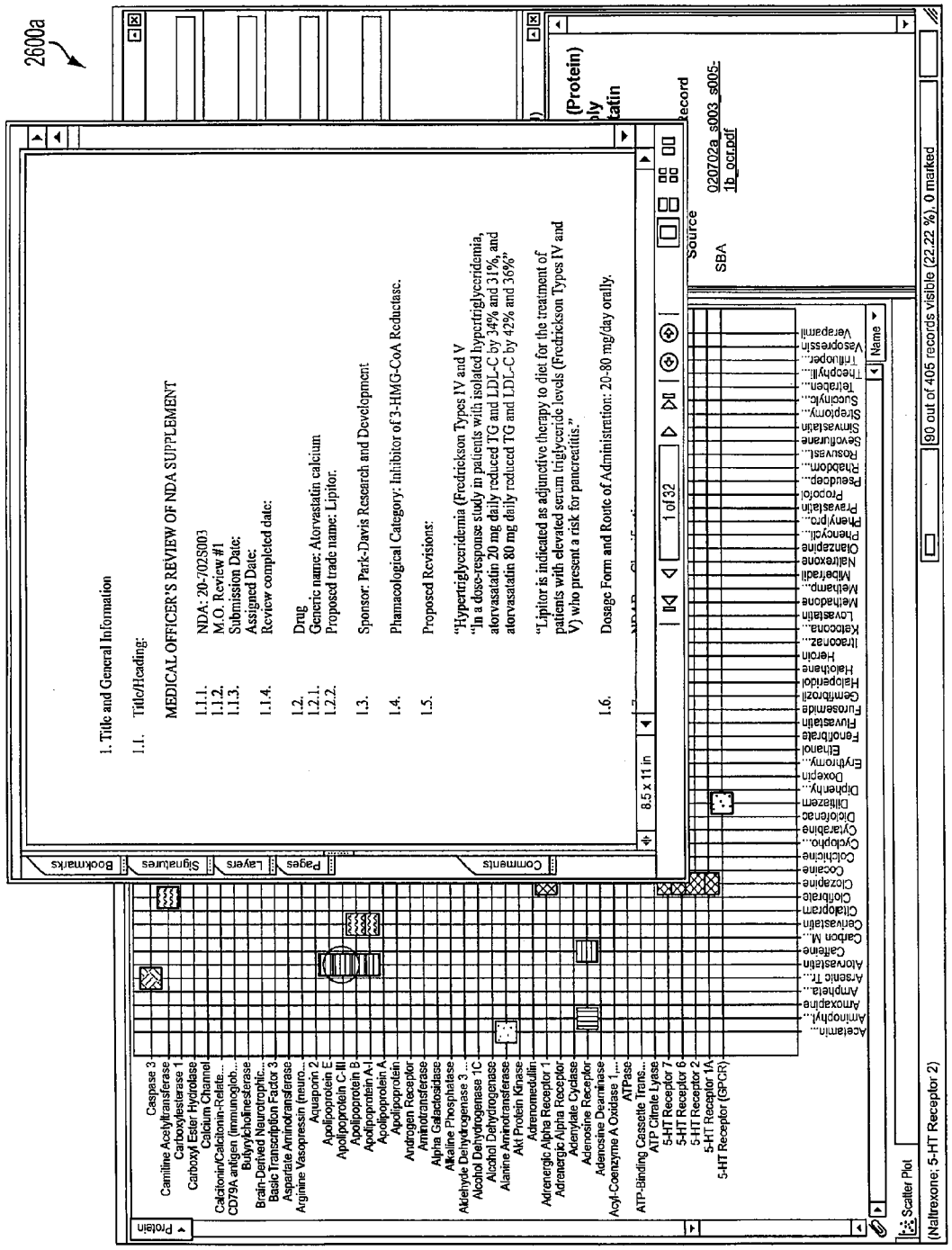
FIG. 26A illustrates an exemplary export interface, according to an embodiment of the invention.
Figure 26B:
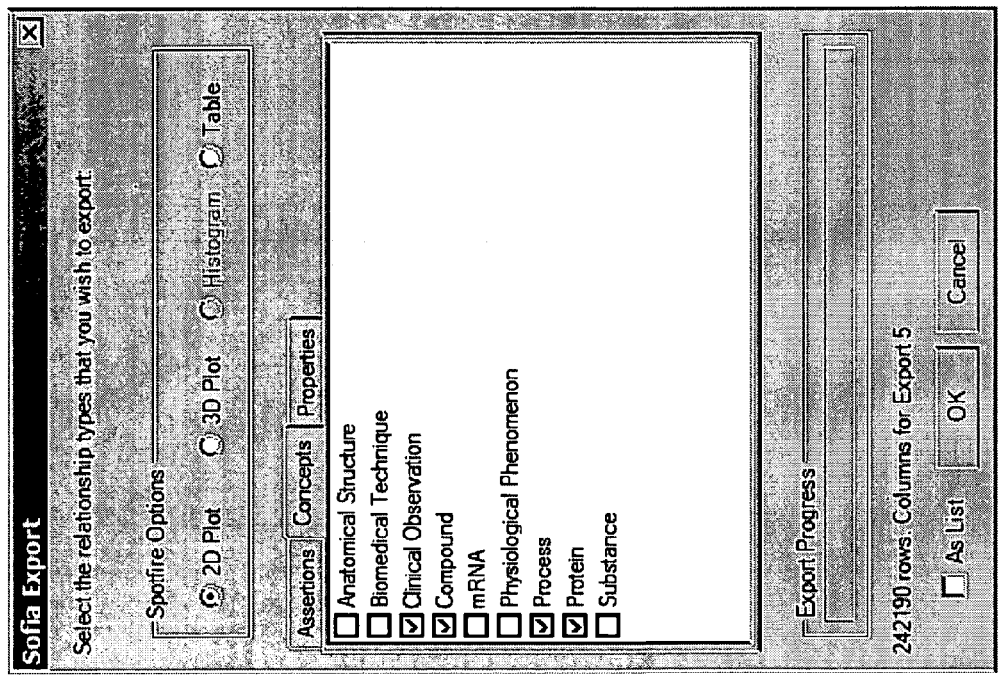
FIG. 26B illustrates an exemplary interface, according to an embodiment of the invention.

FIG. 25 illustrates an exemplary export interface 2500, which includes an application to which ontology data may be exported. In particular, interface 2500 illustrates the export of ontology data to "Spotfire"—a data-mining and display application. Interface 2500 is exemplary only, and other export applications are contemplated. FIG. 26A illustrates an exemplary export interface 2600*a*, wherein a document underlying exported assertions may be selected and displayed to a user. FIG. 26B illustrates an exemplary interface 2600*b* that may be utilized for the export of ontology to an application.

In one embodiment, use of exported data in alternative applications may be bi-directional between a graphical user interface (GUI) directed to ontology navigation, and export applications or other interfaces. For example, a user working with exported data in an export application may arrive at one or more concepts of interest and link to those concepts as they exist in one or more ontologies via an ontology GUI. In one embodiment, this bi-directionality may be accomplished by hooking into the selection event of the export application. This may provide an ID for a concept selected from the export application. This ID may then be entered into an ontology GUI and used to locate the context surrounding the selected concept. In one embodiment, a redacted data subset may be prepared for export through "path-finding."

In one embodiment, two or more ontologies or portions of ontologies may be merged and exported (or exported separately and then merged). For this merger, two or more sets of ontological data may be mapped against one another. Each of the concepts and relationships from the individual sets of data may be compared to one another for corresponding concepts and relationships. These comparisons may take into account varying linguistic forms and semantic differences in terms used in the constituent sets of data. A single merged ontology representing the total knowledge of the individual sets of data structure may result. This process may occur prior to export, or may be performed after export. An example of when two or more ontologies (or portions thereof) may be merged and/or exported may include a federated ontology environment (e.g., when more than one group contributes to the development of ontological knowledge in an area). For example, "Group A" may assemble a "kinase" ontology, while "Group B" assembles a muscle toxicity ontology, in which a number of kinases are referenced. These two ontologies may be merged and then exported as a single ontology. This single ontology may contain knowledge that was not present in the two separate ontologies by themselves.

In one embodiment, one or more custom ontologies may be created. A customized ontology may include an ontology that has been built according to a set of filtering criteria or "customizing constraints." These customizing constraints may include any discriminating or inclusive criteria applied to the one or more data sources used in the custom ontology. These customizing constraints may also include discriminating or inclusive criteria applied to the extraction of assertions (or the rules directing this process) from the one or more data sources. For example, customizing constraints may include specific types of relationships (e.g., only concepts related by the relationship "phosphorylates") and/or properties (e.g., a time frame when an assertion was added, a specific curator of an assertion, assertions having a molecular weight in a particular range, or other property) to be used in the custom ontology. Customizing constraints may also dictate the particular methods used to extract assertions. Additionally, customizing constraints may include alterations to the processes for curating or publishing a custom ontology. As such, any step in ontology creation or use may be customized.

According to one embodiment, a custom ontology may be built from a master ontology constructed via the systems and methods detailed herein. Customizing constraints used to produce a custom ontology may include the selection or de-selection of data sources from which the assertions of the custom ontology are to originate. For example, certain data sources that were used to produce the master ontology may be de-selected. Accordingly, assertions derived from those data sources may not be used in the custom ontology. Conversely, certain data sources that were not used to construct the master ontology may be used in the custom ontology. Accordingly, assertions may be extracted from these data sources, curated, and entered into the custom ontology.

In one embodiment, the data sources from which assertions included in the master ontology are derived may include tags indicating the origin of the data source. When a list of master data sources to be excluded from a custom ontology is produced, the respective tag for each excluded master data source may be included alongside each data source in the list.

In one embodiment, customization of an ontology may take place upon the first instances of ontology creation, or during any stage throughout an ontology's life cycle. For example, customizing constraints may be applied to the selection of data sources, extraction of assertions by rules, the creation or maintenance of the upper ontology, curation of rules-based assertions into reified assertions, or other stage.

In one embodiment, customizing constraints or filters may be applied to an ontology (a previously customized ontology or a master ontology) at or after the publication stage. As such, any number of characteristics of concepts, relations, or assertions may be used to "carve" a custom ontology from a greater ontology.

In one embodiment, a custom ontology may be created for a business organization or other organization. In some embodiments, such a custom ontology may be created wholly from public information or information generally available to the public (including subscription services or other information available in exchange for payment). In other embodiments, a custom ontology created for an organization may incorporate not only data from sources available to the public, but may also incorporate data and data sources proprietary to the organization (including pre-existing ontologies or taxonomies). As such, both public and private information may be subject to one or more of the customized constraints described above.

In one embodiment, a custom ontology may be created from a master ontology through "path-finding." This process may include selecting a starting concept from the master ontology and applying one or more expansion parameters. The starting concept may comprise the first node in the custom ontology and the expansion parameters may dictate "paths" within the master ontology to follow to gather additional concepts and their connecting relationships for addition to the custom ontology. The starting concept, the additional concepts, the connecting relationships, and/or other information may be saved in a database as a custom ontology. Expansion parameters may include any selectable characteristic of an element of the master ontology such as, for example, concept, concept type, relationship, relationship type, property, property type, data source, curation history, confidence weight, quantitative value, or other property or characteristic. This "path-finding" using application of expansion parameters may also be used for preparing a redacted data subset of ontology data for export.

Figure 26C:
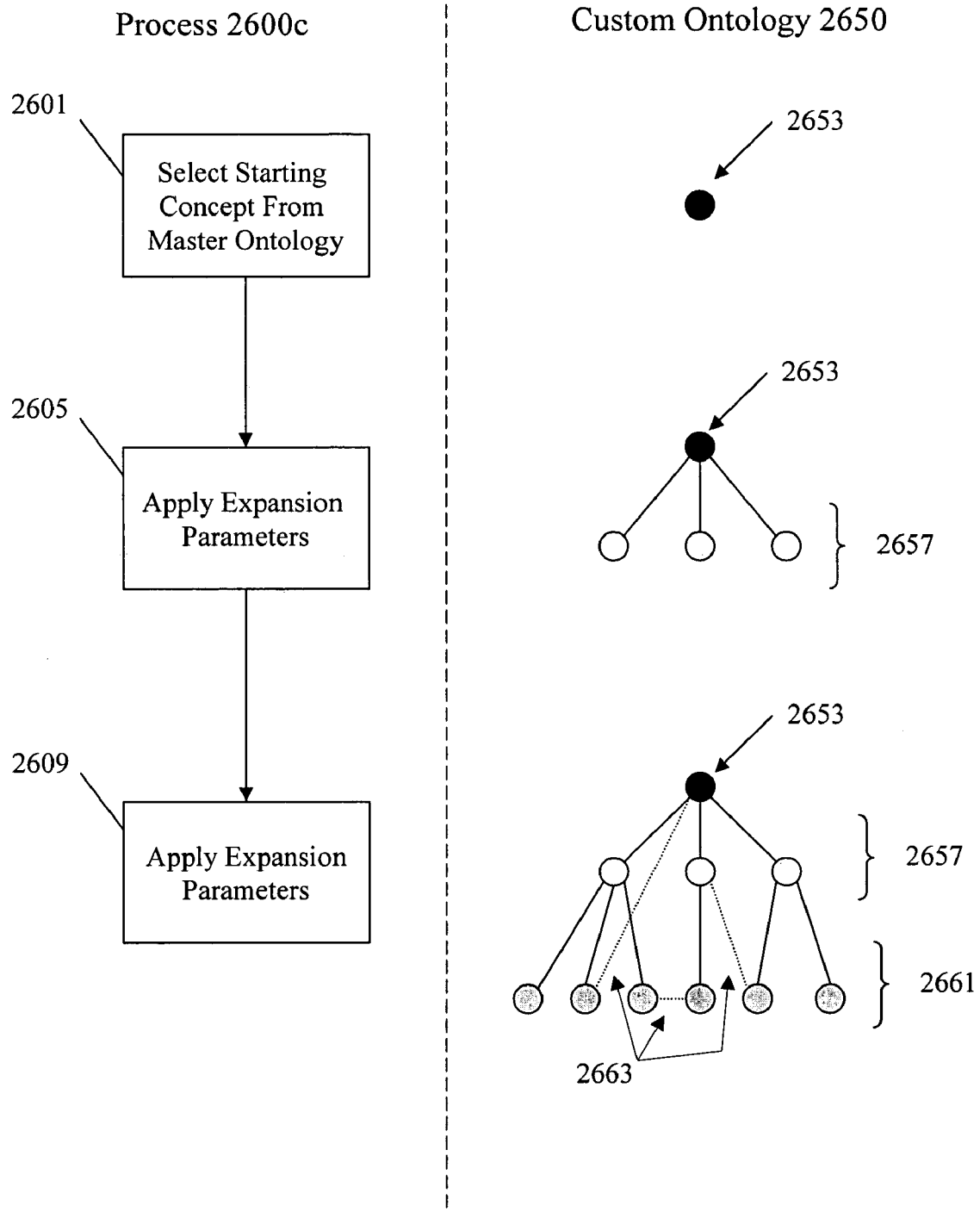
FIG. 26C illustrates an exemplary process for constructing custom ontologies according to an embodiment of the invention.

FIG. 26C illustrates an exemplary process 2600c, wherein a custom ontology 2650 may be created using "path-finding." In an operation 2601, a starting concept 2653, such as "rhabdomyolysis," may be selected from a master ontology. A first set of expansion parameters such as, for example, "all compounds which cause rhabdomyolysis" may be used to expand out from starting concept 2653. The first set of expansion parameters, when applied to the master ontology in an operation 2605, may, for example, select all concepts 2657 within the master ontology of the concept type "compound" that are related to starting concept 2653 ("rhabdomyolysis") by the relationship "causes." In an operation 2609, a second set of expansion parameters may then be applied to the master ontology. For example, the second set of expansion parameters may include "find all proteins that the aforementioned compounds interact with." When applied to the master ontology, this second set of expansion parameters may, for example, select all concepts 2661 of concept type "protein" that are related to one or more concepts 2657 by a relationship "interacts with." Additional sets of expansion parameters may be used to further expand custom ontology 2650. Results of the application of expansion parameters may be stored along with the starting concept as custom ontology 2650. As illustrated in FIG. 26B, because custom ontology 2650 is a multi-relational ontology, it may include one or more relationships 2663 between and among the multiple levels of concepts returned by process 2600c. Relationships 2663 may differ from the relationships selected for by the expansion parameters.

Figure 27A:
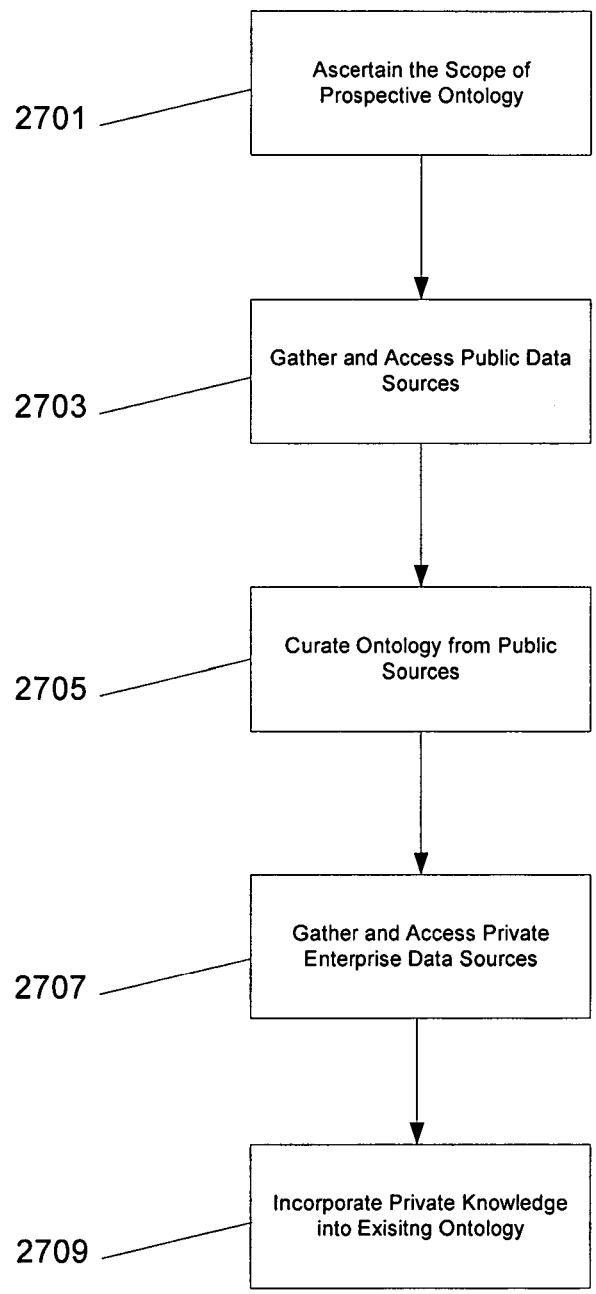
FIG. 27A illustrates a flowchart of processing for exporting ontology data, according to the invention.

According to one embodiment illustrated in FIG. 27A, an ontology administrator may utilize a process 2700a to provide a knowledge capture framework to an enterprise or other entity. In an operation 2701, an ontology service provider may ascertain the scope of one or more ontologies to be provided to a particular entity. The scope of the one or more ontologies may comprise one or more knowledge domains. In an operation 2703, the ontology service provider may then gather and access public data sources that are relevant to the ascertained knowledge domains. Public data sources may include data sources available to the public at no cost, or sources available by subscription or fee. In an operation 2705, the ontology service provider may curate one or more multi-relational master or base ontologies from the concepts and relationships extracted from public data sources.

Figure 27B:
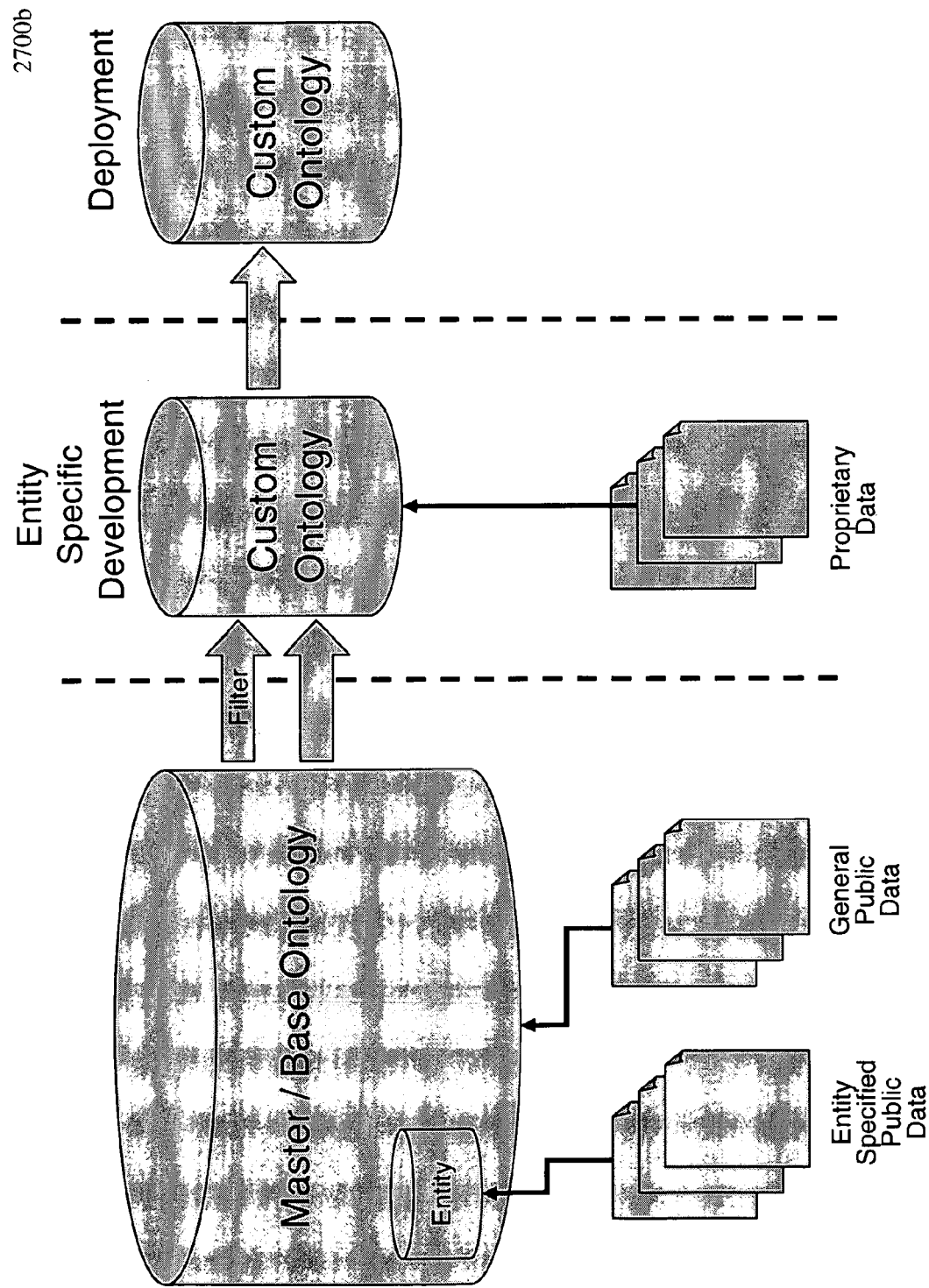
FIG. 27B is a schematic diagram depicting a system for performing knowledge capture, according to an embodiment of the invention.

In an operation 2707, an ontology service provider may gather and access private data sources from the entity that are relevant to the one or more knowledge domains. An entity's private data sources may include any document or database produced by internal or joint venture research such as, for example, proprietary data, employee publications, employee presentations, filings with regulatory agencies, internal memos, or other information. The ontology service provider may then extract assertions from the private data sources, curate these assertions, and, in an operation 2709, incorporate them into the one or more multi-relational base ontologies. The ontology service provider may also provide an ontological system for use by the entity, including a graphical user interface and other tools for navigating and using the captured knowledge. This knowledge capture process may yield one or more multi-relational custom ontologies representing a complete picture of the public knowledge in a given domain coupled with the unique and/or proprietary knowledge of a particular entity. This complete knowledge representation may add value to the combined public and private data available to the entity. FIG. 27B illustrates an exemplary system that may be used for knowledge capture and/or development of custom ontologies as described in detail above.

In one embodiment, users or other entities may receive alerts from an alerts module as data in one or more multi-relational ontologies change. For example, as data sources are scanned for new documents containing information relevant to one or more domain-specific ontologies, new assertions may be created and added to one or more ontologies. Additionally, new properties may be added to existing concepts or assertions within one or more ontologies. In some embodiments, changes to an ontology may include invalidation of assertions. Invalid assertions may be retained in an ontology as "dark nodes" (described in detail herein). Changes to an ontology may also include alteration or editing of assertions. Changes to an upper ontology used for one or more ontologies may also occur. Other changes or alterations may be made to one or more ontologies.

As one or more changes are made to one or more ontologies, one or more users may receive alerts notifying them of these changes. In some embodiments, a user may link from an alert message (e.g., an e-mail message) to a graphical user interface (the same as, or similar to, those described herein) that enables the user to navigate through one or more of the ontologies containing changed or otherwise affected information. In some embodiments, alert services may be administered and provided to a client or "end user" by a service provider as a service. In other embodiments, alerts may be administered by an end user of an ontology.

In one embodiment, the alerts module may enable individual users (or other persons) to create user profiles. The alerts module may utilize information contained in user profiles to provide alert services to users, as described in detail below. In one embodiment, a user profile may include one or more user preferences. User preferences may include content preferences, format preferences, timing preferences, or other preferences.

In one embodiment, content preferences may include criteria that specify certain elements of one or more ontologies that must be changed or affected to trigger an alert to a user. Examples of these elements may include concepts, concept types, data sources, curator information, or other elements of one or more ontologies. For example, a user working in the field of cancer research may set his or her content preferences to trigger an alert when a new assertion is added to one or more ontologies involving the concept type "colon-cancer-genes." In another example, a user may receive an alert whenever a certain data source (e.g., the New England Journal of Medicine) is used to produce an assertion in an ontology. In still another example, a user may receive an alert whenever a certain curator is involved in the curation or editing of assertions that are ultimately added to one or more ontologies. Other changes in nearly any element of one or more ontologies may be specified in a content preference that is utilized in providing alerts.

Content preferences may also include information regarding exactly which ontologies must be changed or affected to trigger an alert. For example, if a certain ontology system contains multiple ontologies, each residing in a different knowledge domain, a user may select only those ontologies related to his or her interests from which to receive alerts. In some embodiments, content preferences may be considered the "minimum requirements" that one or more changes to one or more ontologies must meet in order to trigger an alert to a user.

One aspect of the alert feature of the invention that differentiates it from existing alert systems is the ability to use the network of relationships or knowledge network of one or more multi-relational ontologies to identify when a concept directly or indirectly affecting a "main" or selected concept (or set of concepts) is modified. For example, content preferences may be selected to alert a user regarding specific relationships of a specific concept. In this example, "rhabdomyolysis" may be a selected concept within the user's content preferences and "causes" may be a selected relationship within the users content preferences. The relationship "causes" may be a normalized relationship, as such, linguistic variants such as, for example, "induces," "leads-to," or other linguistic variants may be included. Thus, the alert system of the invention enables all of the linguistic variants of a relationship to be captured in a relatively simple content preference selection. In the above example, if the ontology changes with respect to anything that "causes" rhabdomyolysis (or linguistic variants thereof), the user will be alerted.

Additionally, the alert system of the invention may enable the use of taxonomic information. For example, instead of selecting a specific "HTR2B receptor" as a concept for a content preference, a user may select the entire "HTR2B" family of receptors, and alerts may be provided for the entire family. Furthermore, the alert system of the invention may enable specific patterns of connections to be used for providing alerts. For example, a content preference may be selected to alert the user when potential targets of "rheumatoid arthritis" are modified. This could be selected directly, but indirect relationships provided by the ontologies of the invention may be used to find patterns for providing alerts. For example, content preferences may be selected to alert the user for targets that occur specifically in certain tissues, that are immediately implicated in the disease state of rheumatoid arthritis. Other patterns and/or indirect relationships may be utilized.

User preferences may also include format preferences. Format preferences may include the format of the alerts sent to users. For example, alerts may be sent to one or more users via e-mail, voice-enabled messages, text messages, or in other formats.

User preferences may also include timing preferences. Timing preferences may dictate the timing of alerts that are sent to users. Certain timing preferences may be selected that enable alerts to be sent to a user at specified time intervals. For example, timing preferences may specify that alerts are to be sent to a user daily, weekly, monthly, or on another time interval.

In one embodiment, a time interval or other timing preference may be altered according to whether changes in an ontology meet the minimum requirements of the content preferences in a user profile. For example, a user may specify timing preferences that send alerts to the user every week. If, within a particular week, changes to one or more ontologies do not occur (or changes do occur but do not meet a user's content preferences) the user may not receive an alert. Alternatively, the user may receive an alert containing no information, or containing information specifying that no changes occurred during that week (or that any changes did not meet the user's content preferences). In some embodiments, timing preferences may be selected that send alerts to a user only upon the occurrence of changes to one or more ontologies that meet the minimum requirements of the user's content preferences.

A user profile may also include contact information for a user who desires to receive alerts. Contact information may include personal data enabling the alerts module to send alerts or other communications to the user. For example, contact information for a user that desires to receive alerts via e-mail (as specified in the user's format preferences) may include the user's e-mail address. As there may be other formats by which a user may receive alerts, other types of contact information may exist such as, for example, a telephone number, IP address, or other information.

In some embodiments a user profile may contain information regarding a user's access rights. This user access information may be utilized by the alerts module to enable or restrict alerts sent to users. For example, if a user does not have access rights to information in an ontology originating from a certain data source, then the alerts module will prevent the user from receiving alerts regarding assertions in the ontology derived from that source.

Once a user has created a user profile, the alerts module may monitor one or more ontologies for one or more changes. If changes occur in one or more ontologies monitored by the alerts module, the alerts module may determine, for each user profile, if the changes meet the minimum requirements of the content preferences specified in each user profile. If the alerts module determines that the one or more changes meet the minimum requirements of the content preferences specified in a user profile, the alerts module may initiate an outbound communication (i.e., an alert) to a user associated with the profile. The outbound communication may be of a format specified in the format preferences of the user profile. The outbound communication may be directed to a destination specified by the contact information of the user profile. Furthermore, the outbound communication may contain information regarding the one or more changes to the one or more ontologies. This information may serve to notify a user of changed or alterations to one or more ontologies. Timing preferences of a user profile may dictate when the alerts module monitors for one or more changes in one or more ontologies or when outbound communications to users are initiated, or both.

Figure 28:
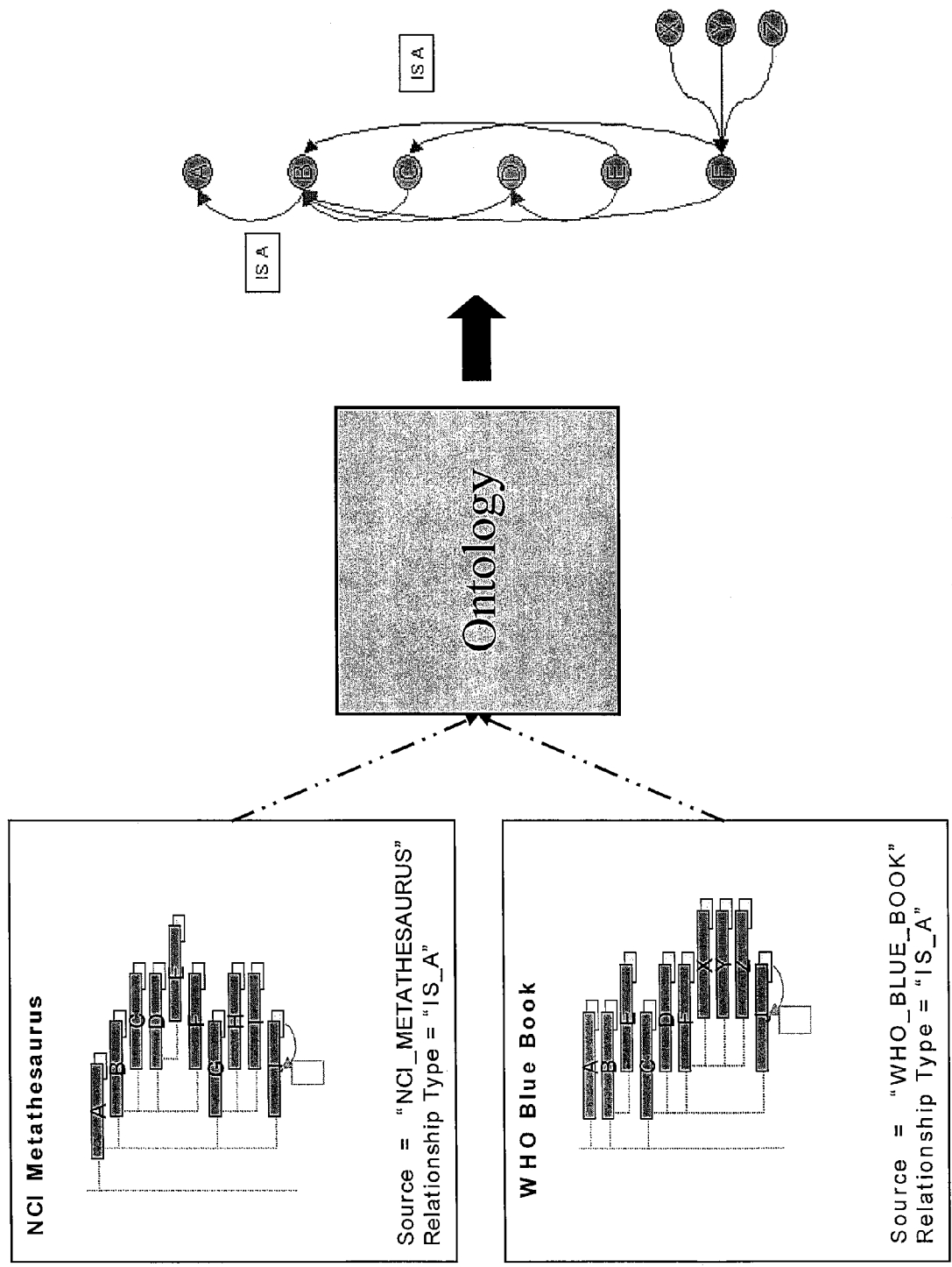
FIG. 28 is a schematic representation depicting two or more individual taxonomies merged into an independent taxonomic representation, according to an embodiment of the invention.

In an embodiment of the invention illustrated in FIG. 28, one or more ontologies may be used to merge knowledge from two or more taxonomies into an independent taxonomic representation. Two or more individual taxonomies may first be mapped against one or more ontologies. The mapping of an individual taxonomy against an ontology may include associating each of the concepts and relationships from the individual taxonomy with corresponding concepts and relationships in an ontology. The concepts and relationships from each of the individual taxonomies may then be mapped to one another taking into account varying linguistic forms and semantic differences in terms used in the constituent taxonomies. A single merged taxonomy representing the total knowledge of all constituent taxonomies in a single data structure may result. The resultant merged data structure may then be presented to a user via a graphical user interface.

In one embodiment, the original forms of the two contributing taxonomies may be reconstructed by selecting the source of the assertions. In FIG. 28, two source taxonomies are used to generate assertions that are normalized and entered into the ontology. If a user wants to reconstruct a particular organization of the data for navigation and visualization purposes, the user may select the assertions generated from one or the other source taxonomies and use them reconstruct the original taxonomy view.

In one embodiment, security filters may be applied to data that is retrieved from private or other "restricted" data sources when it is accessed through an ontology. For example, if an assertion in an ontology is based on data acquired from a private data source, a user without proper access rights (e.g., one that would not have otherwise been able to access information from a data source) may not be able to view the underlying data in the ontology. Access control rights to the underlying data sources may be managed by Lightweight Directory Access Protocol (LDAP) or other directory services. A server maintaining an ontology may use these services to set an individual user's access control rights to data in the ontology.

In one embodiment of the invention, an ontology may be used as a "seed" for the construction of a greater ontology. A seed ontology may include an ontological representation of knowledge in a given domain. For example, knowledge in the area of identified human genes may be used to as a seed ontology. Additional data sources in a related knowledge area such as gene-protein interactions, for example, may be mapped against the seed ontology to yield a comprehensive ontology representing gene protein interactions and identified human genes. The resulting ontology may be further utilized as a seed to map data sources in another areas into the ontology. Use of a seed ontology may provide a more complete knowledge representation by enabling most or all relationships between concepts in one knowledge area to be used as a base during construction of the resultant ontology. For example, if comparison of identified human genes to protein-gene interaction were to be conducted manually, or without the use of an ontology, the large number of possible relationships might be prohibitive to formation of a comprehensive knowledge representation.

Existing ontologies may be also be used as seeds or knowledge sources in conjunction with searching or querying sets of data (including ontology data), context driven text mining for complex concepts and relationships, mapping two or more independent taxonomies into a comprehensive taxonomy or ontology, the creation of new ontologies, and the expansion of existing ontologies.

In some embodiments, the invention may include or enable other uses or features. Other uses or features may include support of chemical structures within one or more multi-relational ontologies, support of documents, presentations, and/or people as concepts in one or more multi-relational ontologies, time-stamping data within one or more multi-relational ontologies, enhanced data querying, data integration, or other uses or features.

In one embodiment, one or more multi-relational ontologies may include chemical compounds as concepts. In some embodiments, the structure of a chemical compound may be considered the name of a chemical compound concept. The use of an actual structure rather than a lexical (text) name may avoid potential ambiguity over what the compound actually is, especially among compounds where the same lexical name is used for structurally distinct compounds (e.g., a salt form or a racemic form of the same compound). In some embodiments, chemical compounds have lexical names, as well as structural names.

In some embodiments, the chemical structure of a chemical compound may be stored as a simplified molecular input line entry specification (SMILES) string or other chemical structure nomenclature or representation. As used herein, a SMILES string refers to a particular comprehensive chemical nomenclature capable of representing the structure of a chemical compound using text characters. One-dimensional SMILES string or other nomenclature or representation may be used to regenerate two-dimensional drawings and three-dimensional coordinates of chemical structures, and may therefore enable a compressed representation of the structure. As mentioned throughout the specification, chemical structure nomenclatures other than SMILES strings may be used.

Because the chemical structure of a chemical compound is a concept within the ontology, it may form assertions with other concepts and/or properties within the ontology. The chemical structure, its lexical names, its properties, and other information may present a multi-dimensional description of the chemical compound within the ontology.

Figure 29:
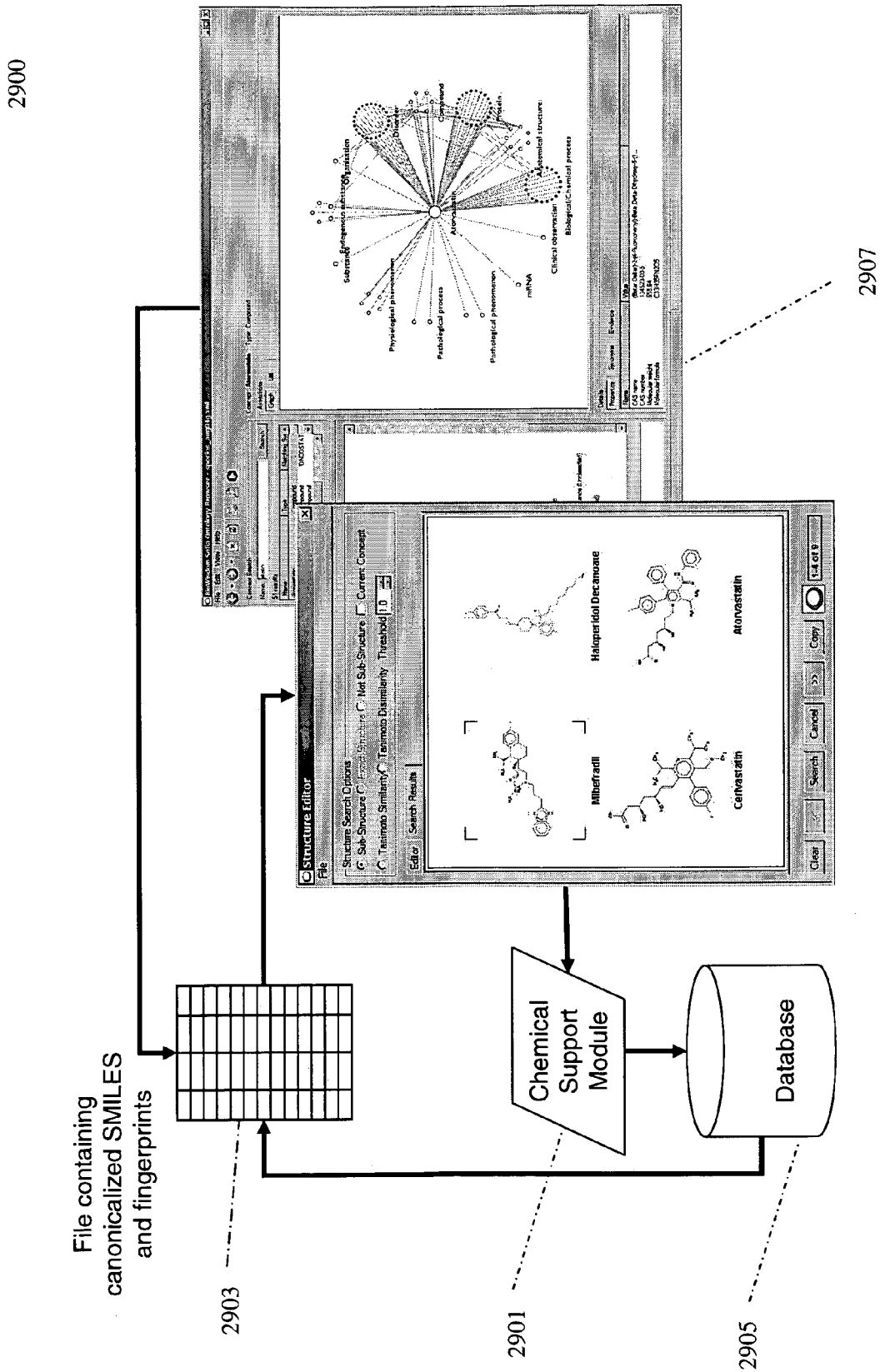
FIG. 29 is a schematic representation of a system for supporting chemical structures within an ontology according to an embodiment of the invention.

FIG. 29 is an exemplary illustration of a system 2900 wherein a chemical support module 2901 enables support of chemical structures within an ontology. Chemical support module 2901 may be associated with a file 2903 of canonicalized SMILES strings (or other chemical structure nomenclature) and fingerprints stored in a database 2905. Canonicalized SMILES strings may be obtained from a SMILES encoder (e.g., Daylight's Morgan algorithm) which is utilized to suppress variation among SMILES strings generated for the chemical support module. Canonicalization essentially semantically normalizes chemical structure concepts within an ontology. In some embodiments, the Daylight Morgan SMILES Generator is used because other SMILES generators may not produce unique or consistent SMILES strings. Fingerprints may include bit strings where each bit (1 for true, 0 for false) corresponds to the presence or absence of a chemical structure of a given chemical structural feature (the most common substructural elements may be assigned to a position along the bit string, if there is a 1 in a certain position, the corresponding substructural element exists in that position, of there is a 0, it does not). Fingerprints may enable efficient lookup of chemical composition of a given molecule in terms of the most common substructural elements.

File 2903 may be stored externally from the ontology or may be included within the ontology itself. File 2903 may include canonicalized SMILES strings and fingerprints for each chemical structure present as a concept in one or more ontologies associated with system 2900. Chemical support module 2901 may utilize the content of file 2903 to enable search, display, manipulation and/or other uses of chemical structures via a graphical user interface 2907. Graphical user interface 2907 may be part of, similar to, or interface with, the graphical user interfaces described above.

In one embodiment, a graphical user interface may utilize a chemical support module to enable a chemical search pane. The chemical search pane may be part of, or integrated with, a search pane of the graphical user interfaces described above. The chemical search pane may enable a user to search for chemical compounds and/or their chemical structures within one or more ontologies. The chemical search pane may enable a user to search the chemical compound/structure by name, chemical formula, SMILES string (or other chemical structure nomenclature or representation), two-dimensional representation, chemical similarity, chemical substructure, or other identifier or quality.

Figure 30A:
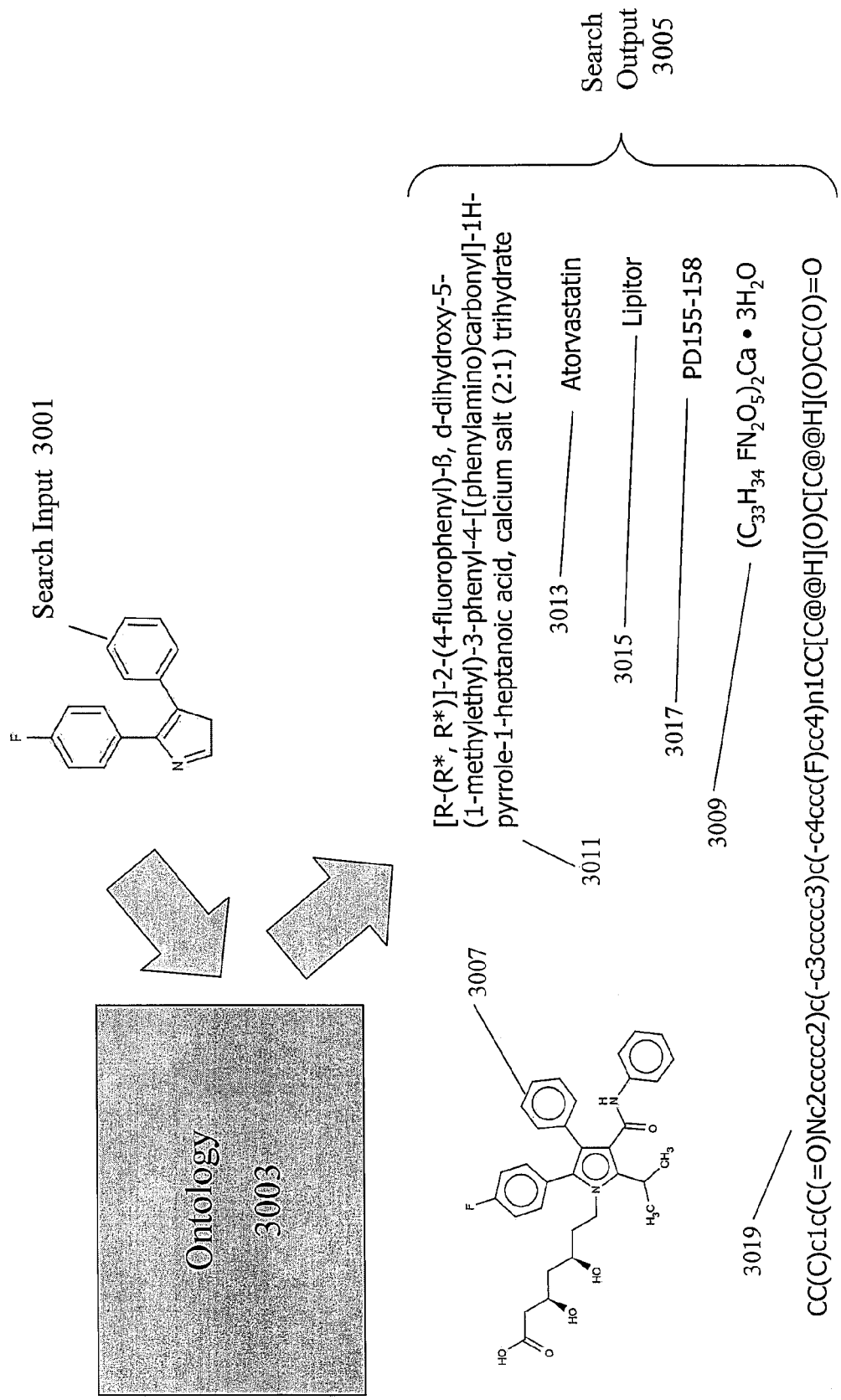
FIG. 30A is an exemplary illustration of chemical structure search results according to an embodiment of the invention.

FIG. 30A is an exemplary illustration of a two-dimensional chemical structure representation search input 3001, which may be utilized by the chemical support module to search one or more ontologies 3003 and return one or more search outputs 3005. Search outputs 3005 may include chemical structure 3007, chemical formula 3009, chemical nomenclature 3011, common name 3013, trade name 3015, Chemical Abstract Service (CAS) number 3017, SMILES string 3019, or other search output. The chemical search pane may include one or more of the above described set of search outputs 3005 for matches to search input 3001. The chemical search pane may enable a user to search using entire chemical structures as search input, or by using portions of chemical structures as search input (as illustrated in FIG. 30A).

Figure 30B:
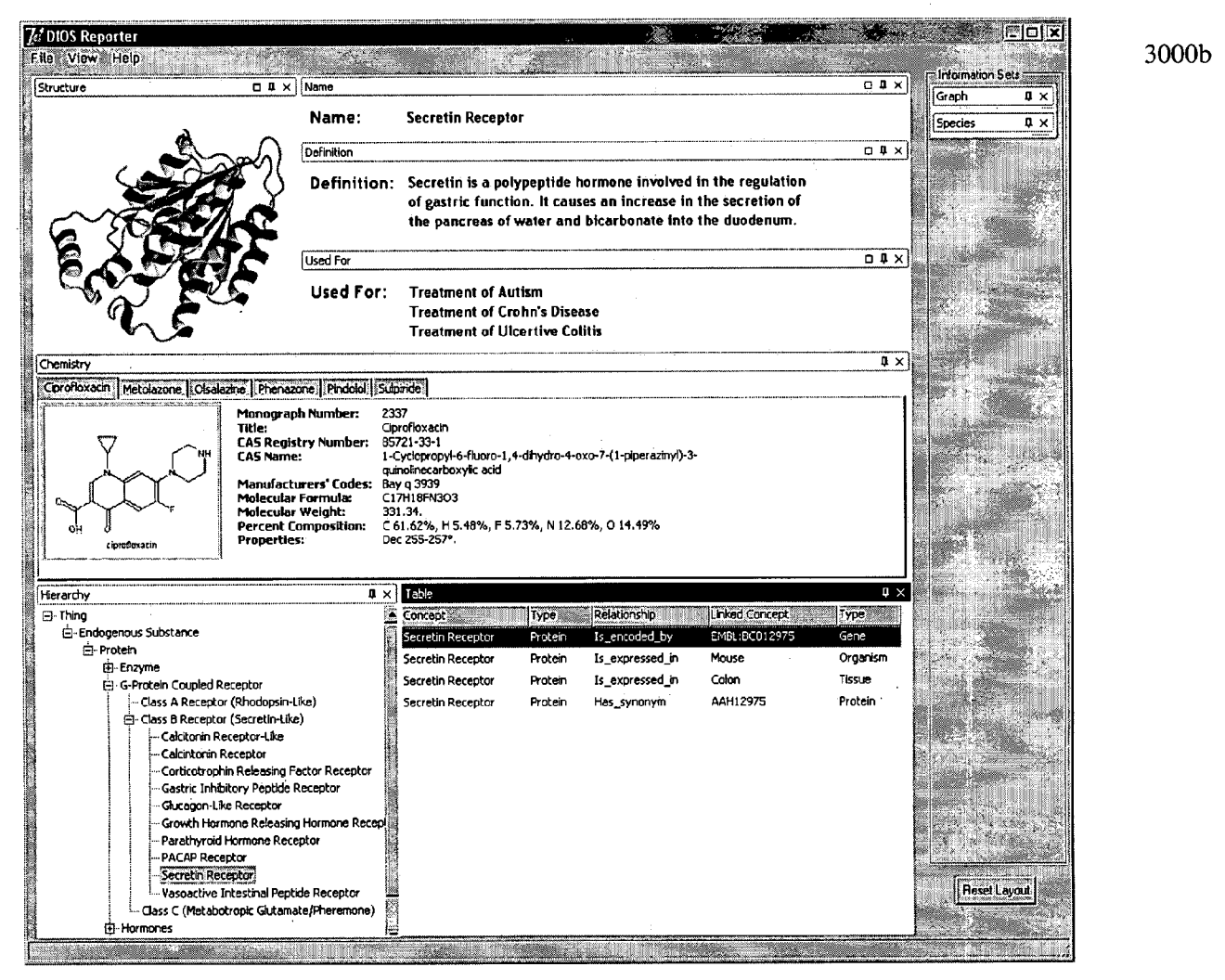

FIG. 30B is an exemplary illustration of a graphical user interface 3000b, wherein various pieces of information regarding one or more selected chemical compounds may be displayed. For example, interface 3000b illustrates the three dimensional structure of a protein (Secretin Receptor), the identification of the chemical structures that are associated with it (e.g., Ciprofloxacin, and others), its place in a hierarchical representation of ontology data, assertions it is associated with, and other information. Interface 3000b is exemplary only, other information regarding a chemical substance or any other concept may be displayed in a similar interface. The use of interface 3000b need not be restricted to chemical compound concepts and may be customized to include any combination of information related to one or more selected concepts of any type. In one embodiment, interface 3000b may be presented to a user in conjunction with an alert feature of the invention (e.g., when a user receives an alert he or she may be presented with the interface or a link thereto).

Figure 31:
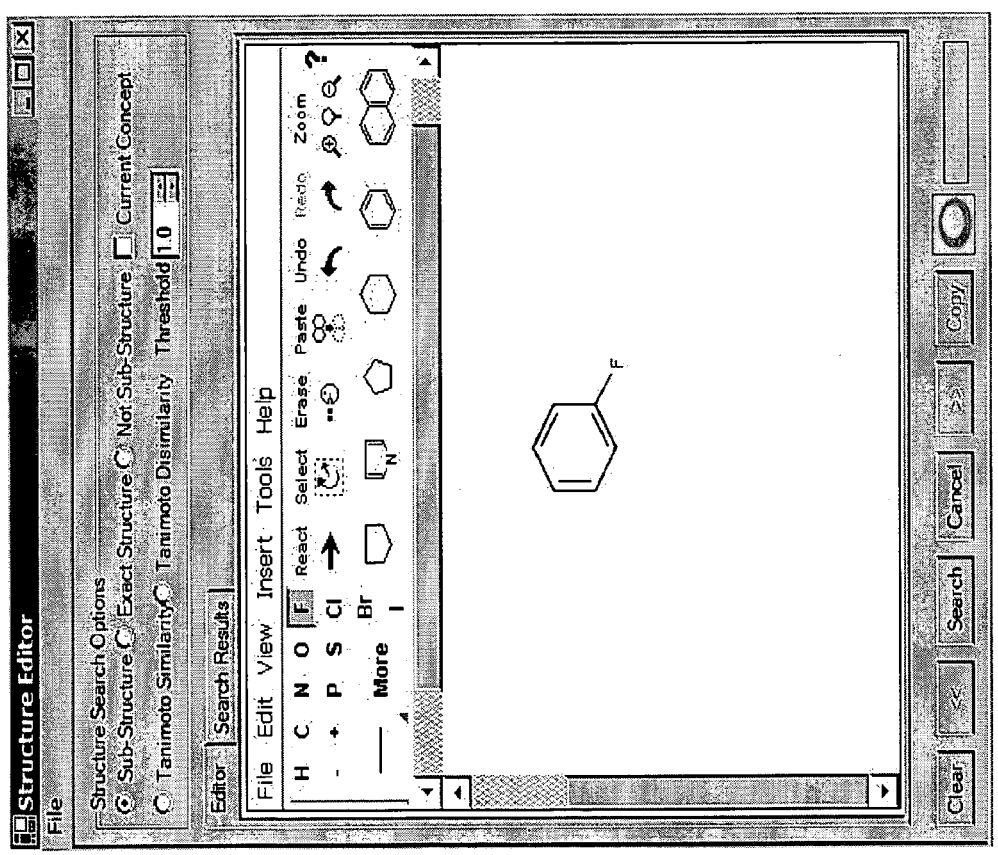
FIG. 31 illustrates an exemplary chemical structure editing interface, according to an embodiment of the invention.

In one embodiment, the chemical support module may enable a chemical structure editor. FIG. 31 is an exemplary illustration of a chemical structure editor 3100. Chemical structure editor 3100 may enable a user to select, create, edit, or manipulate chemical structures within one or more ontologies. For example, if the user desires to search for chemical structures by inputting a two-dimensional representation of a chemical structure into a chemical search pane, the user may construct the two-dimensional representation (or modify an existing representation) in chemical structure editor 3100. Chemical structure editor 3100 may enable a user to select constituent atoms and chemical bonds existing therebetween to construct, from scratch, a two-dimensional representation of the chemical structure of interest.

In one embodiment, a user may search one or more ontologies for chemical structures contained therein. The chemical support module may return a list or spreadsheet of compounds similar to a searched (or otherwise selected) chemical structure (to the extent that the similar compounds exist within the searched ontologies). The user may then select a compound from the list. The selected compound may be displayed by its lexical label, as any other selected concept would be displayed by the graphical user interface in the various embodiments described herein (e.g., in a hierarchical pane, multi-relational pane, etc.). The user may then utilize the totality of tools enabled by the invention as described herein to access and navigate through the knowledge directly or indirectly associated with the selected compound.

Figure 32:
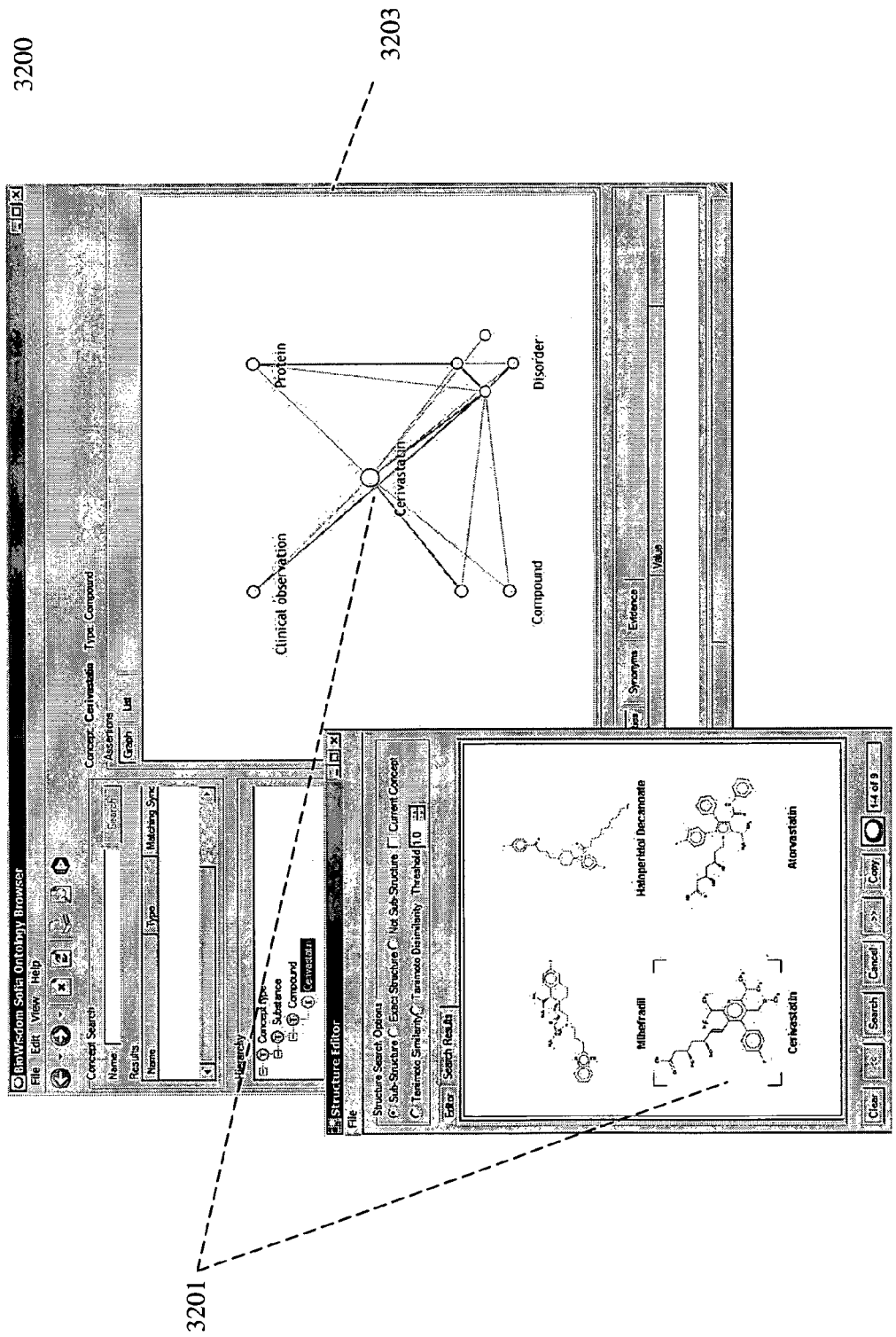
FIG. 32 illustrates exemplary chemical structure interfaces, according to an embodiment of the invention.

FIG. 32 illustrates exemplary interface 3200 wherein a selected compound 3201, "cerivastatin," is found as the central concept of a clustered cone graph in a multi-relational pane 3203. Furthermore, a two-dimensional chemical structure representation of selected compound 3201 is displayed alongside two-dimensional chemical structure representations for similar and/or related compounds.

In one embodiment, the chemical support module may enable a user to select a group of chemical compounds. The compounds may be grouped by a common characteristic, or may be grouped manually by the user. The chemical support module may then enable the user to visualize the structure and analyze the similarities and differences (structural or otherwise) between the compounds in the group. This functionality, along with the ability to access a knowledge network containing direct and indirect relationships about each compound in the group, may enable further knowledge discovery between and among the compounds in the group.

In one embodiment, the chemical support module may enable a user to select a chemical compound from within one or more ontologies and use a cheminformatics software application (e.g., an application provided by Daylight Chemical Information Systems, Inc.) in conjunction with the collective data of the one or more ontologies to assess a broader set of related information. This related information may include, for example, contextually-related annotation information or other information from the structure of the class of compounds. This related information may also include biological information such as, for example, receptors that a selected compound binds to. Related information may also include legal, business, and/or other information regarding a selected compound such as, for example, patent information (e.g., rights holders, issue date, or other information) or licensing information regarding the compound. This biological, legal, business, or other information may be stored within the ontology as properties of the selected compound.

In some embodiments, cheminformatics software may also enable the generation of a number of different physiochemical properties for a chemical or substructure of interest such as, for example, cLogP (a measure of hydrophobicity), hydrogen bond donor/receiver potential, surface area, volume, size/shape parameters, or other properties. These properties may be utilized to cluster compounds or substructures on the basis of similarities or differences in these properties. In some embodiments, these properties may be analyzed by exporting ontology data, including chemical data, to analysis applications. This clustering may be utilized to, for example, differentiate active/non-active or toxic/non-toxic compounds by their physiochemical properties. The chemical support module may also utilize the properties and contextually related information (e.g., biology, business, patent, or other information) of chemical structure concepts to cluster chemical structures based on biological, legal, business, or other criteria, rather than simply on physiochemical properties.

In one embodiment, one or more selected chemical compounds, their associated chemical structure, and other information may be assembled into a subset and exported to a remote location, to cheminfomatics software, or to other software or applications for use.

In one embodiment, the chemical support module may enable chemical structures existing as concepts within one or more ontologies to be displayed to a user as a two-dimensional representation of the chemical structure. Three-dimensional representations may also be enabled by the chemical support module.

In one embodiment, a chemical support module may enable the chemical structure (or a part thereof) of a chemical compound to be subject to a similarity search. The similarity search may enable a user to apply search constraints such as, for example, "return only compounds directly related to rhabdomyolysis." The similarity search may also enable the user to select appropriate similarity or dissimilarity criteria such as, for example, Tanimoto similarity or dissimilarity, cLogP value, hydrogen bond donor/receiver potential, surface area, size/shape parameters, and/or other criteria. The user may then be presented with compounds existing within the ontology meeting the specified search constraints (if any), and similarity criteria. The user may then view the structure of any of the returned compounds and utilize the system's chemical support functionality as desired.

In some embodiments, the chemical support module may sit alongside any existing or subsequently developed chemistry infrastructure/applications. In one embodiment, a set of canonical SMILES strings are generated for each chemical structure in an ontology. An existing chemistry application may then be used to search, analyze, or otherwise browse or manipulate the chemical data to elucidate compounds of interest. These may then be compared to the SMILES strings in the ontology's structure lookup lists and all contextual information from the ontology can be associated with the compounds of interest. This feature may provide independence from the specific chemistry application and allows issues of scalability to be deferred to the existing chemistry application.

According to an embodiment of the invention, documents, sections of documents, and presentations or other data items may be included as concepts within an ontology. This may enable, among other things, individual sections of a document to be referenced when appropriate. Additionally, in one implementation, the representation of documents as concepts may be tracked via an index (e.g., an Oracle Text index) or other key to those documents, such that the exact concepts contained within a text document that is itself a concept in the ontology can be determined. As such, if an edge of an ontology is reached, one may have the capability of finding a list of the documents in which that concept occurs, and viewing other contexts in which it is relevant. One may also view the evidence for an assertion, and then access a list of the concepts contained in the document (where the evidence is found), such that the ontology may continue to be explored in a different, related direction.

In one embodiment, concepts and properties contained in an ontology may include human beings. For example, if a particular researcher is an expert on the concept "heart disease," an ontology may contain the assertion "John Doe is-anexpert-on heart disease." Furthermore, an ontology may contain other assertions connected with a human being that may enable the use of that person's expertise and/or communication with that person. Concepts in an ontology that are persons may be associated with various characteristics of that person such as, for example, the person's name, telephone number, business address, education history, employment history, or other characteristics. Assertions containing pointers to a person's publications may also be contained in an ontology. As with all of the functionality associated with the invention, this facet of an ontological data system may be used in any domain, and is not constrained to the biomedical or scientific field.

According to an embodiment of the invention, temporal tags may be associated with some or all assertions contained within an ontology. These tags or "timestamps" may indicate various temporal qualities of an assertion. For example, these qualities may include the date the knowledge underlying an assertion came into being (e.g., when was this fact discovered), the date the knowledge stopped being true (e.g., when was this knowledge discredited or disproved), and/or the date when an assertion was entered into a particular ontology. Other temporal indicators may also be devised and included, as necessary.

Time stamping of assertions within an ontology may provide, among other things, the ability to extract data sets from different periods in time for comparison. For example, changes in the state of knowledge or trends in a particular subfield field may be gleaned by such a comparison. In one embodiment, if a particular assertion contained within an ontology is discredited or disproved, it may be retained in the ontology data store but not displayed to users. A node that has been discredited, disproved, or deleted and is contained in an ontology data store, but not displayed, may be termed a "dark node." As recited above, dark nodes may serve as evidence for other assertions, or may be reestablished or re-credited over time and thus may still may provide useful information. Furthermore, dark nodes may serve as connecting nodes in the paths between certain concepts. Dark nodes may also function to highlight the existence of a related concept without providing any further information. This functionality may be useful, for instance, when third-party information is incorporated into the ontology. If a user does not have a subscription or other access rights to the third-party information (e.g., to a private database), the dark node may serve as an advertisement for the third-party's information. As an example, a user may learn that there is a gene that is up-regulated when a specific compound is applied, yet be denied access to the specifics of that information. In one embodiment, the user may be able to purchase a subscription or license to access the underlying proprietary data.

In one embodiment, one or more multi-relational ontologies may be utilized to improve searching or querying of databases or other data structures. This searching or querying may include keyword searches, information retrieval (IR) tools, sophisticated natural language processing, or other searching or querying. As a multi-relational ontology according to the invention includes structured knowledge describing the family relationships and synonyms for a given term, a multi-relational ontology may be used to extend and refine searches.

Search recall (e.g., the number of relevant results returned out of the total number of relevant results in the searched repository) may be improved by including known synonyms of a searched term. For example, a search for the term "heart attack" may be extended by the use of an ontology to include the terms "myocardial infarction" or "myocardial necrosis" to return relevant search results that do not use consistent terminology. Furthermore, the taxonomic arrangement in the ontology enables a search for a class of concepts such as, for example, "g-protein coupled receptors," to return an inclusive set of results without first knowing the names of the results within the set.

Search precision (e.g., the number of relevant documents retrieved out of the total number of documents retrieved) may be improved by adding contextual information contained within the ontology to the search. Knowledge of the types of relationships and concepts that are associated with searched concepts supplies information relevant to the exact goals of the search and help remove ambiguous or irrelevant results. For example, knowing that hypothermia is induced by cold, the environmental factor rather than the respiratory infection, may help remove any potentially inaccurate results retrieved from the dual meaning of the term "cold."

In one embodiment, one or more multi-relational ontologies may be used to semantically integrate isolated silos of data created by the increasing use of automated technologies in information gathering. Initial attempts at data integration using other methodologies often fail, leaving super-silos of inaccessible data. An understanding of the semantics of data in a domain and the details of the relationships between them (as provided by domain-specific multi-relational ontologies) enables a richer knowledge map of data in a domain.

Other uses of the contextualized knowledge networks provided by one or more multi-relational, domain specific, ontologies may exist.

Figure 33A:
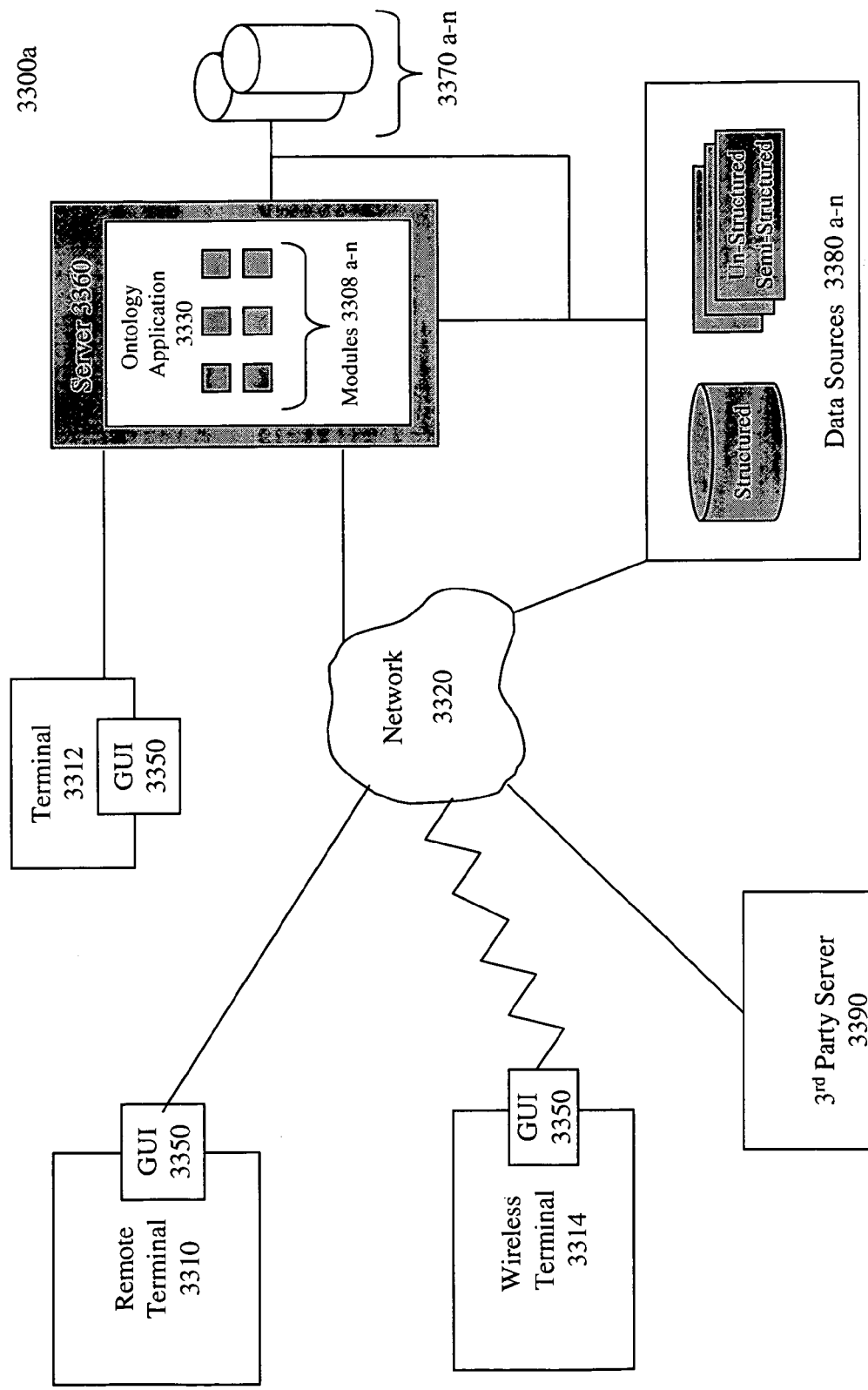
FIG. 33A illustrates a schematic diagram of a system for creating, maintaining, and providing access to one or more ontologies, according to an embodiment of the invention.

According to an embodiment of the invention illustrated in FIG. 33A, a computer-implemented system 3300a is provided for creating, maintaining, and providing access to one or more ontologies. System 3300a may comprise and/or enable any or all of the various elements, features, functions, and/or processes described above. System 3300a may include one or more servers such as, for example, a server 3360 which may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

According to an embodiment of the invention, server 3360 may host an ontology application 3330. Ontology application 3330 may comprise an Internet web site, an intranet site, or other host site or application maintained by an ontology administrator, service provider, or other entity.

According to an embodiment of the invention, ontology application 3330 may comprise one or more software modules 3308a-3308n for loading information from one or more data sources 3380 (described below), storing information to one or more associated databases 3370a-3370n, creating or modifying an ontology from data stored in associated databases 3370a-3370n, enabling querying of an ontology stored in the one or more associated databases 3370a-3370n, enabling a user or administrator to present and manipulate data, or for performing any of the other various operations previously described in detail herein.

In particular, ontology application 3330 may comprise an extraction module 3308a, a rules engine 3308b, an editor module 3308c, a chemical support module 3308d, a user interface module 3308e, quality assurance module 3308f, a publishing module 3308g, a path-finding module 3308h, an alerts module 3308i, an export manager 3308j, and other modules 3308n as described in greater detail herein. One or more of the modules comprising application 3330 may be combined. For some purposes, not all modules may be necessary.

In one embodiment, one or more curators, users, or other persons may access server 3360 and ontology application 3330 through an interface. By way of example, server 3360 may comprise a web server and the interface may comprise a web browser. Those having skill in the art will recognize that other client/server and network configurations may be used.

According to an embodiment, the interface may comprise a graphical user interface (GUI) 3350. GUI 3350 may include or be the same as or similar to the interfaces described in detail above. The GUI 3350 may be displayed via a terminal 3312, such as a personal computer, workstation, dumb terminal, or other user terminal networked to the server 3360. A user may also access server 3360 through GUI 3350 displayed on a remote terminal 3310. Remote terminal 3310 may be connected to server 3360 over a network 3320, via a communications link.

Network 3320 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection. One or more security technologies may be used to ensure the security of information across all parts of the system, where necessary. For example Secure Socket Layer (SSL) protocol and bank level SSL may be utilized to ensure the authenticity and security of messages passed across the network.

In addition, users may also access server 3360 through GUI 3350 displayed on a wireless terminal 3314, such as a portable computer, personal digital assistant (PDA), wireless phone, web-enabled mobile phone, WAP device, web-to-voice device, or other wireless device.

According to an embodiment of the invention, the one or more associated databases 3370a-3370n may be operatively connected to server 3360. Databases 3370a-3370n may be, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Language Query), a SAN (storage area network), Microsoft Access™ or others may also be used, incorporated, or accessed into the invention. Databases 3370a-3370n may include any combination of databases or other data storage devices, and may receive and store information constituting the content of one or more ontologies. This may include information regarding concepts, relationships, properties, and assertions within an ontology, as well as any other information needed to create, maintain, and use an ontology according to the embodiments described herein.

According to an embodiment, databases 3370a-3370n may store data provided by one or more data sources 3380a-3380n. As described above, data sources 3380a-3380n may include structured data sources such as databases with defined, recognizable data fields (e.g., SwissProt, EMBL, etc.), semi-structured data sources (e.g., Medline), or unstructured data sources such as, for example, books and scientific journals. Websites and other data sources may also be used. According to various embodiments of the invention, data sources 3380a-3380n may be directly networked to server 3360, or operatively connected to server 3360 through network 3320. In addition, data sources 3380a-3380n may also be directly connected to databases 3370a-3370n.

According to an embodiment of the invention, server 3360 (and ontology application 3330) may be accessible by one or more third-party servers 3390 (or applications or platforms), via application program interfaces (APIs) or web services interfaces, so as to enable ontology content to be supplied to third-parties on a subscription basis. As an example, an information publisher may maintain one or more applications or platforms on server 3390 and may wish to access taxonomies or other ontology content from ontology application 3330 to classify their primary content using an information retrieval (IR) tool on their server(s) 3390. In one implementation, the information publisher may utilize taxonomies (or other ontology content) provided by ontology application 3330, via a web services interface, with appropriate security settings in place so as to prevent the data from being copied or otherwise distributed.

System 3300a is an exemplary system configuration. Other configurations may exist. For example, one or more servers may be used, with different servers being used to handle different sets of tasks. For example, according to an embodiment of the invention as illustrated in FIG. 3300B, a server 3363 may be provided in system 3300b. Server 3363 may operate to host presentation of ontology data and other information to a terminal 3312, a wireless terminal 3314, a remote terminal 3310, a third party server 3390 or other users via a network 3320. Server 3363 may be associated with one or more databases 3373a-3373n which may house a browse schema. A server 3360 may operate to perform those tasks necessary for the generation of ontologies or other tasks not performed by server 3363. Server 3360 may be associated with one or more databases 3370a-3370n which may house an edit schema.

Figure 33B:
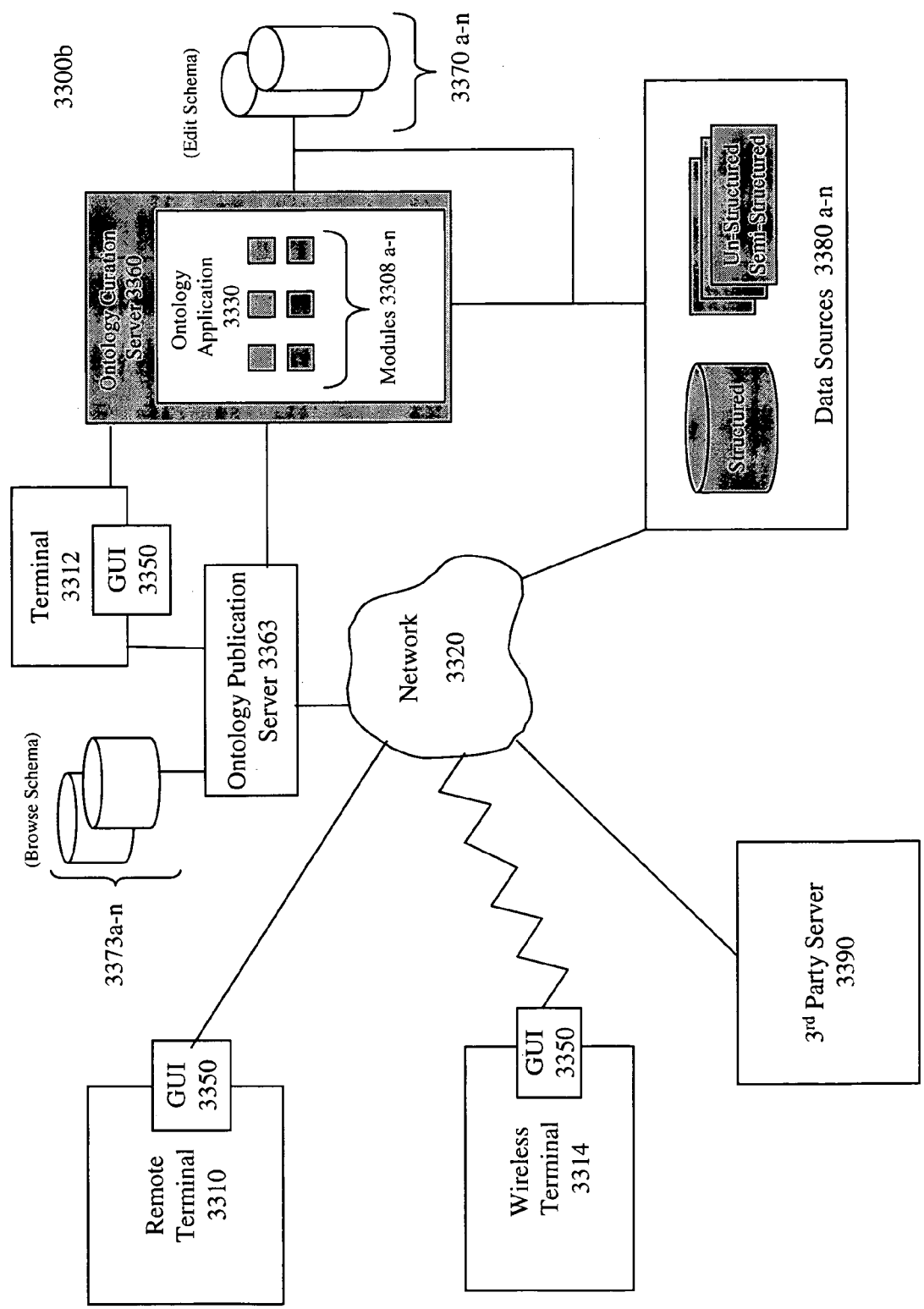
FIG. 33B illustrates a schematic diagram of a system for creating, maintaining, and providing access to one or more ontologies, according to an embodiment of the invention.
Figure 34:
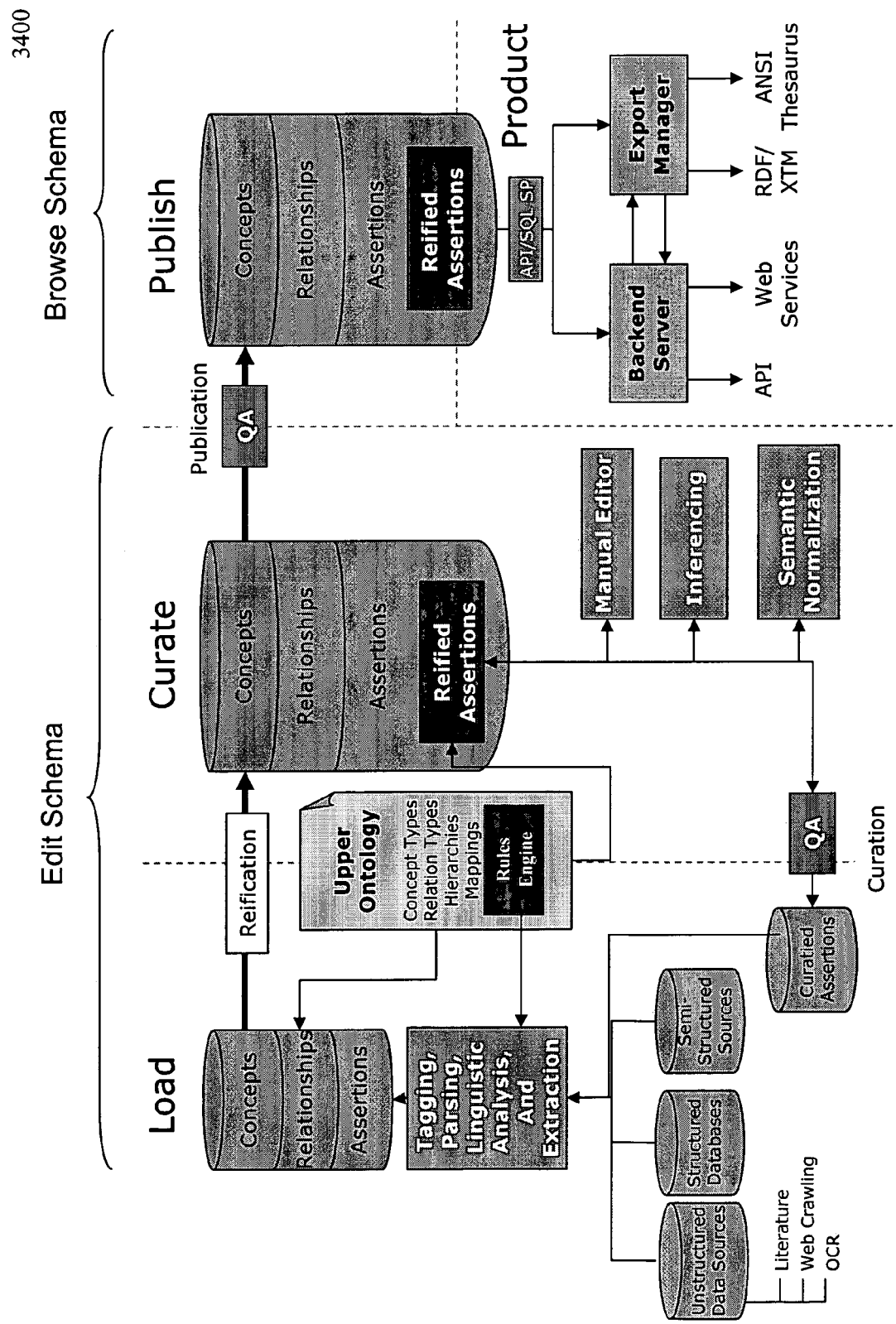
FIG. 34 is a schematic diagram depicting an overview of the loading, curating, and publication processes, according to an embodiment of the invention.

Those having skill in the art will appreciate that the invention described herein may work with various system configurations. Accordingly, more or less of the aforementioned system components may be used and/or combined in various embodiments. It should also be understood that various software modules 3308a-3308n of FIG. 33A and FIG. 33B and ontology application 3330 of FIG. 33A and FIG. 33B that are utilized to accomplish the functionalities described herein may be maintained on one or more of terminals (3310, 3312, 3314), third-party server 3390, server 3363 or other components of system 3300a or system 3300b, as necessary. In other embodiments, as would be appreciated, the functionalities described herein may be implemented in various combinations of hardware and/or firmware, in addition to, or instead of, FIG. 34 illustrates an exemplary embodiment of the invention, system 3400, wherein one or more multi-relational ontologies may be created, curated, published, edited, and/or maintained. System 3400 may include various components, some or all of which are similar to or the same as components described above. System 3400 may support and/or perform "loading" operations. Loading operations may include processing of documents and extraction and loading of rules-based assertions and their constituent concepts and relationships. Loading operations may also include extraction and/or loading of properties and/or other information.

System 3400 may also support and/or perform curation operations. Curation operations may include reification of rules-based assertions, semantic normalization, inferencing, or other processes or operations. Both loading and curation operations may utilize data stored in an edit schema.

System 3400 may also support and/or perform publication operations. Publication operations may include providing one or more ontologies to one or more users and enabling interaction therewith. Publication operations may support any of the uses, features, or ontology services described in detail above. Publication processes may utilize data stored in a browse schema. Publication processes may utilize web services, application program interfaces (APIs), or flat file output in formats such as RDF, XTM, and ANSI Thesaurus to share ontology data and enable functional aspects of the system. Publication processes may support any format required, from existing and emerging formats to bespoke formats required for use with existing legacy structures. This may be achieved through a set of export modules enabling the selected content to be generated in the required structure. Example of common formats in which ontology content may be delivered include XML (Extensible Markup language); XTM (XML Topic Maps); RDF (Resource Description Framework); OIL (Ontology Inference Layer); DAML (DARPA Agent Markup language); DAML+OIL; or OWL (Ontology Web Language). Other formats may be used.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

We claim:

1. A computer-implemented system for parsing and exporting data from one or more multi-relational ontologies, the system comprising:

one or more master multi-relational ontologies including a plurality of individual assertions, wherein an individual assertion comprises a first concept, a second concept, and a relationship between the first concept and the second concept, wherein at least one concept in a first assertion of the plurality of individual assertions is a concept in at least a second assertion of the plurality of assertions, wherein one or more relationships in the plurality of individual assertions comprise relationships unconstrained by any hierarchical arrangement of concepts, and wherein each of individual assertions of the one or more master multi-relational ontologies is associated with a confidence weight that is an indication of the confidence in the truth of the assertion;

an export module that;

receives a selection of two or more concepts from the plurality of assertions of the one of the one or more master multi-relational ontologies, applies one or more path-finding constraints to the two or more concepts to yield a subset of individual assertions from the plurality of assertions, wherein the path finding constraints identify one or more individual assertions from the plurality of individual assertions of the one or more master multi-relational ontologies that connect, directly or indirectly, the two or more concepts, receives a selection of a starting concept from the subset of individual assertions, and applies one or more expansion parameters to the starting concept to yield a redacted subset of assertions from the subset of individual assertions, wherein the one or more expansion parameters include one or more selectable characteristics of the subset of individual assertions, and wherein the redacted subset of assertions includes at least one assertion that includes the starting concept; and a storage device that stores the redacted subset of assertions as individual assertions, wherein the export module outputs the redacted subset of assertions to a predetermined location in a predetermined format.

2. The system of claim 1, wherein one or more of the path-finding constraints or the expansion parameters are derived from a user profile associated with a specific user, wherein the user profile identifies one or more characteristics of assertions to be included in one or more of the subset of individual assertions or the redacted subset of assertions.

3. The system of claim 2, wherein the user profile includes information regarding access rights of the specific user, such that at least one of the one or more characteristics of the assertions to be included in one or more of the subset of individual assertions or the redacted subset of assertions is the specific user's right to access any given assertion.

4. The system of claim 2, wherein the user profile includes information regarding one or more personal themes of the specific user, wherein a personal theme defines the one or more characteristics of the assertions to be included in one or more of the subset of assertions or the redacted subset of assertions according to a specific goal defined by the user.

5. The system of claim 1, wherein one or more of the path-finding constraints or the expansion parameters include information regarding one or more of identified concepts or identified relationships from the plurality of individual assertions of the master multi-relational ontologies.

6. The system of claim 1, wherein one or more of the path-finding constraints or the expansion parameters include information regarding one or more of: concept types of one or more concepts from the plurality of individual assertions of the one or more master multi-relational ontologies or relationship types of one or more relationships from the plurality of individual assertions of the one or more master multi-relational ontologies.

7. The system of claim 1, wherein one or more of the path-finding constraints or expansion parameters include information regarding one or more data sources from which one or more of the plurality of individual assertions of the one or more master multi-relational ontologies were derived.

8. The system of claim 1, wherein one or more of the path-finding constraints or expansion parameters include information regarding one or more data source types from which one or more of the plurality of individual assertions of the one or more master multi-relational ontologies were derived.

9. The system of claim 1, wherein each of the assertions of the plurality of individual assertions of the one or more master multi-relational ontologies is associated with a curator that is a person or routine that operated on each assertion prior to inclusion into the one or more master multi-relational ontologies, wherein one or more of the path-finding constraints or expansion parameters specify at least one curator, such that one or more of the assertions of one or more of the subset of individual assertions or the redacted subset of assertions are associated with the at least one curator.

10. The system of claim 1, wherein one or more of the path-finding constraints or expansion parameters include information regarding confidence weights, such that one or more assertions in one or more of the subset of individual assertions or redacted subset of assertions is selected based at least in part on its associated confidence weight.

11. The system of claim 1, wherein the path-finding constraints include assertions from the plurality of individual assertions of the one or more master multi-relational ontologies that form a predetermined number of best paths between the two or more selected concepts.

12. The system of claim 1, wherein one or more of the path-finding constraints or the expansion parameters includes user access rights, such that one or more of the subset of individual assertions or the redacted subset of assertions include only assertions to which a particular user is permitted access.

13. The system of claim 12, wherein the user access rights include the particular user's data source permissions, such that one or more of the subset of individual assertions or the redacted subset of assertions include only assertions derived from data sources to which the particular user is permitted access.

14. The system of claim 1, wherein the storage device stores evidence information underlying each assertion of the redacted subset of assertions along with the redacted subset of assertions.

15. The system of claim 14, wherein the evidence information includes one or more documents containing information supporting the validity of each assertion of the redacted subset of assertions.

16. The system of claim 1, wherein the export module outputs the redacted subset of assertions to a remote database.

17. The system of claim 1, wherein the export module outputs the redacted subset of individual assertions to one or more computer applications.

18. The system of claim 1, wherein the export module outputs the redacted subset of individual assertions to one or more computer applications, and wherein a user interacts with the redacted subset of individual assertions through the one or more computer applications.

19. The system of claim 18, wherein the one or more computer applications bi-directionally link the user to an ontology navigation application.

20. The system of claim 1, wherein each of the assertions of the plurality of individual assertions of the one or more master multi-relational ontologies is associated with one or more pieces of evidence underlying the plurality of assertions, each piece of evidence being associated with a data source from a plurality of data sources, wherein each of one or more users are associated with access rights to the plurality of data sources, and wherein one or more of the path-finding constraints or the expansion parameters include the access rights of at least one of the one or more users, such that one or more of the subset of individual assertions or the redacted subset of assertions includes only assertions supported by evidence associated with data sources to which the at least one of the one or more users has access rights.

21. The system of claim 20, wherein the export module further outputs at least one of the one or more pieces of evidence associated with the redacted subset of assertions, wherein only the pieces of evidence associated with the data sources to which the user has access rights is output.

22. The system of claim 9, wherein curator operation on an assertion includes approval of inclusion of the assertion in the one or more master multi-relational ontologies.

23. A computer-implemented method for parsing and exporting data from one or more multi-relational ontologies, the method comprising:
selecting two or more concepts from one or more master multi-relational ontologies, wherein the one or more master ontologies include a plurality of individual assertions, wherein an individual assertion comprises a first concept, a second concept, and a relationship between the first concept and the second concept, wherein at least one concept in a first assertion of the plurality of individual assertions is a concept in at least a second assertion of the plurality of individual assertions, wherein one or more relationships in the plurality of individual assertions comprise relationships unconstrained by any hierarchical arrangement of concepts, and wherein each of the individual assertions of the one or more master multi-relational ontologies is associated with a confidence weight that is an indication of the confidence in the truth of the assertion;
applying one or more path-finding constraints to the two or more concepts to produce a subset of individual assertions from the plurality of individual assertions of the one or more master multi-relational ontologies, wherein the path finding constraints identify one or more individual assertions from the plurality of individual assertions of the one or more master multi-relational ontologies that connect, directly or indirectly, the two or more concepts; and
selecting a starting concept from the subset of individual assertions;
applying one or more expansion parameters to the starting concept to yield a redacted subset of individual assertions from the subset of individual assertions, wherein the one or more expansion parameters include one or more selectable characteristics of the subset of individual assertions, and wherein the redacted subset of individual assertions includes at least one assertion that includes the starting concept;
outputting the redacted subset of individual assertions to a predetermined location in a predetermined format.

24. The method of claim 23, wherein one or more of the path-finding constraints or expansion parameters include a user profile associated with a specific user, wherein the user profile identifies one or more characteristics of assertions to be included in one or more of the subset of individual assertions or the redacted subset of individual assertions.

25. The method of claim 24, wherein the user profile includes information regarding access rights of the specific user, such that at least one of the one or more characteristics of the assertions to be included in one of the subset of individual assertions or the redacted subset of individual assertions is the specific user's right to access any given assertion.

26. The method of claim 24, wherein the user profile includes information regarding one or more personal themes of the specific user, wherein a personal theme defines the one or more characteristics of the assertions to be included in one of the subset of assertions or the redacted subset of individual assertions according to a specific goal defined by the user.

27. The method of claim 23, wherein one or more of the path-finding constraints or the expansion parameters include information regarding one or more of identified concepts or identified relationships from the plurality of individual assertions of the master multi-relational ontologies.

28. The method of claim 23, wherein one or more of the path-finding constraints or the expansion parameters include information regarding one or more of: concept types of one or more concepts from the plurality of individual assertions of the one or more master multi-relational ontologies or relationship types of one or more relationships from the plurality of individual assertions of the one or more master multi-relational ontologies.

29. The method of claim 23, wherein one or more of the path-finding constraints or the expansion parameters include information regarding one or more data sources from which one or more of the plurality of individual assertions of the one or more master multi-relational ontologies were derived.

30. The method of claim 23, wherein one or more of the path-finding constraints or the expansion parameters include information regarding one or more data source types from which one or more of the plurality of individual assertions of the one or more master multi-relational ontologies were derived.

31. The method of claim 23, wherein each of the assertions of the plurality of individual assertions of the one or more master multi-relational ontologies is associated with a curator that is a person or routine that operated on each assertion prior to inclusion into the one or more master multi-relational ontologies, wherein one or more of the path-finding constraints or the expansion parameters specify at least one curator, such that one or more of the assertions of one of the subset of individual assertions or the redacted subset of individual assertions are associated with the at least one curator.

32. The method of claim 31, wherein curator operation on an assertion includes approval of inclusion of the assertion in the one or more master multi-relational ontologies.

33. The method of claim 23, wherein one or more of the path-finding constraints or the expansion parameters include information regarding confidence weights, such that one or more assertions in one or more of the subset of individual assertions or the redacted subset of individual assertions is selected based at least in part on its associated confidence weight.

34. The method of claim 23, wherein the path-finding constraints include assertions from the plurality of individual assertions of the one or more master multi-relational ontologies that form a predetermined number of best paths between the two or more selected concepts.

35. The method of claim 23, wherein one or more of the path-finding constraints or the expansion parameters include user access rights, such that one or more of the subset of individual assertions or the redacted subset of individual assertions include only assertions to which a particular user is permitted access.

36. The method of claim 35, wherein the user access rights include the particular user's data source permissions, such that one or more of the subset of individual assertions or the redacted subset of individual assertions include only assertions derived from data sources to which the particular user is permitted access.

37. The method of claim 23, wherein outputting the redacted subset of individual assertions includes outputting evidence information underlying each assertion of the redacted subset of individual assertions along with the redacted subset of individual assertions.

38. The method of claim 37, wherein the evidence information includes one or more documents containing information supporting the validity of each assertion of the redacted subset of individual assertions.

39. The method of claim 23, wherein outputting the redacted subset of individual assertions further comprises outputting the redacted subset of individual assertions to a remote database.

40. The method of claim 23, wherein outputting the redacted subset of individual assertions further comprises outputting the redacted subset of individual assertions to one or more computer applications.

41. The method of claim 23, wherein outputting the redacted subset of individual assertions further comprises outputting the redacted subset of individual assertions to one or more computer applications, and wherein a user interacts with the redacted subset of individual assertions through the one or more computer applications.

42. The method of claim 41, wherein the one or more computer applications bi-directionally link the user to an ontology navigation application.

43. The method of claim 23, wherein each of the assertions of the plurality of individual assertions of the one or more master multi-relational ontologies is associated with one or more pieces of evidence underlying the plurality of assertions, each piece of evidence being associated with a data source from a plurality of data sources, wherein each of one or more users are associated with access rights to the plurality of data sources, and wherein one or more of the path finding constraints or the expansion parameters include the access rights of at least one of the one or more users, such that one or more of the subset of individual assertions or the redacted subset of individual assertions includes only assertions supported by evidence associated with data sources to which the at least one of the one or more users has access rights.

44. The method of claim 43, wherein outputting the redacted subset of individual assertions further comprises outputting at least one of the one or more pieces of evidence associated with the redacted subset of individual assertions, wherein only the pieces of evidence associated with the data sources to which the user has access rights is output.

45. A computer-implemented system for parsing and exporting data from one or more multi-relational ontologies, the system comprising:
one or more master multi-relational ontologies including a plurality of individual assertions, wherein an individual assertion comprises a first concept, a second concept, and a relationship between the first concept and the second concept, wherein at least one concept in a first of the plurality of individual assertions is a concept in at least a second assertion of the plurality of individual assertions, wherein one or more relationships in the plurality of individual assertions comprise relationships unconstrained by any hierarchical arrangement of concepts, and wherein each of the individual assertions of the one or more master multi-relational ontologies is associated with a confidence weight that is an indication of the confidence in the truth of the assertion;
means for selecting two or more concepts from the plurality of assertions of the one of the one or more master multi-relational ontologies;
means for applying one or more path-finding constraints to the two or more concepts to yield a subset of individual assertions from the plurality of individual assertions, wherein the path finding constraints identify one or more individual assertions from the plurality of individual assertions of the one or more master multi-relational ontologies that connect, directly or indirectly, the two or more concepts;
means for selecting a starting concept from the subset of individual assertions;
means for applying one or more expansion parameters to the starting concept to yield a redacted subset of assertions from the subset of individual assertions, wherein the one or more expansion parameters include one or more selectable characteristics of the subset of individual assertions, and wherein the redacted subset of assertions includes at least one assertion that includes the starting concept;
means for storing the redacted subset of assertions as individual assertions; and
means for outputting the redacted subset of individually stored assertions to a predetermined location in a predetermined format.

* * * * *